(12) United States Patent
Ichino et al.

(10) Patent No.: US 10,829,632 B2
(45) Date of Patent: Nov. 10, 2020

(54) HYDROGENATED BLOCK COPOLYMER, POLYPROPYLENE RESIN COMPOSITION, AND MOLDED BODY

(71) Applicant: Asahi Kasei Kabushiki Kaisha, Tokyo (JP)

(72) Inventors: Hiroyuki Ichino, Tokyo (JP); Yasuhiro Kusanose, Tokyo (JP); Masashi Yamamoto, Tokyo (JP); Masahiro Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 84 days.

(21) Appl. No.: 16/094,320

(22) PCT Filed: Apr. 24, 2017

(86) PCT No.: PCT/JP2017/016231
§ 371 (c)(1),
(2) Date: Oct. 17, 2018

(87) PCT Pub. No.: WO2017/188190
PCT Pub. Date: Nov. 2, 2017

(65) Prior Publication Data
US 2019/0136040 A1  May 9, 2019

(30) Foreign Application Priority Data

Apr. 25, 2016 (JP) .................... 2016-087391

(51) Int. Cl.
| | | |
|---|---|---|
| *B32B 1/08* | (2006.01) | |
| *B32B 27/30* | (2006.01) | |
| *C08F 297/04* | (2006.01) | |
| *C08F 8/04* | (2006.01) | |
| *C08L 23/12* | (2006.01) | |
| *C08L 53/02* | (2006.01) | |
| *B32B 27/00* | (2006.01) | |
| *B32B 27/32* | (2006.01) | |
| *C09J 7/38* | (2018.01) | |
| *C08L 23/14* | (2006.01) | |
| *C09J 123/14* | (2006.01) | |
| *C09J 153/02* | (2006.01) | |

(52) U.S. Cl.
CPC ............... *C08L 53/02* (2013.01); *B32B 1/08* (2013.01); *B32B 27/00* (2013.01); *B32B 27/302* (2013.01); *B32B 27/32* (2013.01); *C08F 8/04* (2013.01); *C08F 297/04* (2013.01); *C08L 23/12* (2013.01); *C08L 23/14* (2013.01); *C08L 53/025* (2013.01); *C09J 7/387* (2018.01); *C09J 123/14* (2013.01); *C09J 153/025* (2013.01); *C08F 2800/10* (2013.01); *C08L 2203/16* (2013.01)

(58) Field of Classification Search
CPC ...... C08F 8/04; C08F 297/04; C08F 294/046; C08F 2800/10; C08L 53/02; C08L 23/12; C08L 23/14; C08L 53/025; C08L 2203/16; C09J 7/387; C09J 123/14; C09J 153/025; B32B 27/302; B32B 27/32; B32B 1/08; B32B 27/00
See application file for complete search history.

(56) References Cited

U.S. PATENT DOCUMENTS

| | | | | |
|---|---|---|---|---|
| 4,107,236 | A  * | 8/1978 | Naylor ................ | C08G 81/021 |
| | | | | 525/122 |
| 5,206,301 | A | 4/1993 | Hattori et al. | |
| 6,703,449 | B1 * | 3/2004 | Hoxmeier ............ | C08F 297/04 |
| | | | | 524/575 |
| 2004/0167292 | A1 | 8/2004 | Willis | |
| 2005/0107521 | A1 | 5/2005 | Sasagawa et al. | |
| 2015/0344684 | A1 | 12/2015 | Kusanose et al. | |
| 2017/0042766 | A1 | 2/2017 | Nojima et al. | |
| 2018/0251589 | A1 | 9/2018 | Kusanose et al. | |

FOREIGN PATENT DOCUMENTS

| | | |
|---|---|---|
| EP | 0683206 A1 | 11/1995 |
| EP | 1702951 A1 | 9/2006 |
| EP | 3348591 A1 | 7/2018 |
| EP | 3450496 A1 | 3/2019 |
| JP | H02-133406 A | 5/1990 |
| JP | H05-093125 A | 4/1993 |
| JP | H05-098086 A | 4/1993 |
| JP | H05-170844 A | 7/1993 |
| JP | H06-306127 A | 11/1994 |
| JP | H08-109288 A | 4/1996 |
| JP | H08-245844 A | 9/1996 |

(Continued)

OTHER PUBLICATIONS

International Search Report issued in corresponding International Patent Application No. PCT/JP2017/016231 dated Jul. 18, 2017.
Supplementary European Search Report issued in corresponding European Patent Application No. 17789472.2 dated Jul. 18, 2019.
International Preliminary Report on Patentability issued in corresponding International Patent Application No. PCT/JP2017/016231 dated Oct. 30, 2018.
European Search Report issued in counterpart European Patent Application No. 19184294.7 dated Oct. 24, 2019.

(Continued)

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

The hydrogenated block copolymer according to the present invention is a hydrogenated block copolymer containing, in the molecule, a polymer block (C) having a conjugated diene compound as a main component, a polymer block (B) having a conjugated diene compound as a main component, and a polymer block (S) having a vinyl aromatic compound as a main component.

16 Claims, 2 Drawing Sheets

(56) References Cited

FOREIGN PATENT DOCUMENTS

| | | |
|---|---|---|
| JP | H08-269264 A | 10/1996 |
| JP | H10-001574 A | 1/1998 |
| JP | H11-216810 A | 8/1999 |
| JP | H11-320765 A | 11/1999 |
| JP | 2001-240636 A | 9/2001 |
| JP | 2005-255857 A | 9/2005 |
| JP | 2006-517984 A | 8/2006 |
| JP | 2012-236901 A | 12/2012 |
| JP | 2016-196583 A | 11/2016 |
| WO | 2014/002984 A1 | 1/2014 |
| WO | 2016/039257 A1 | 3/2016 |
| WO | 2017/043542 A1 | 3/2017 |

OTHER PUBLICATIONS

Supplemental European Search Report issued in corresponding European Patent Application No. 17789472.2 dated Apr. 15, 2019.

\* cited by examiner

US 10,829,632 B2

HYDROGENATED BLOCK COPOLYMER, POLYPROPYLENE RESIN COMPOSITION, AND MOLDED BODY

TECHNICAL FIELD

The present invention relates to a hydrogenated block copolymer, a polypropylene resin composition, and a molded body.

BACKGROUND ART

Polypropylene resin compositions are generally excellent in chemical resistance and mechanical properties and are therefore used in a wide range including packaging materials, machine parts, automobile parts, and the like. Because of environmental necessity, the development of non-halogenated transparent polymer materials has been underway recently. Particularly, in the fields of tubes, sheets, and films, polypropylene resins are used, and there has arisen a demand for, for example, softening the polypropylene resins or rendering the polypropylene resins transparent, according to applications.

In response to the demand described above, for example, Patent Literature 1 proposes a polypropylene resin composition containing a blend of a polypropylene, an ethylene copolymer obtained with a specific polymerization catalyst, and a hydrogenated diene polymer having a specific structure, and teaches that such a polypropylene resin composition is excellent in the balance among flowability, rigidity, impact resistance, and molding appearance.

CITATION LIST

Patent Literature

Patent Literature 1: Japanese Patent Laid-Open No. 8-269264

SUMMARY OF INVENTION

Technical Problem

Molded bodies formed of polypropylene resin compositions for use in the packaging field for food, the packaging field for apparel, and the medical field including infusion tubes and infusion bags, etc. are required to have a good balance among properties such as low temperature impact resistance, flexibility, transparency, and low stickiness. However, the hydrogenated diene polymer as described in Patent Literature 1 and the polypropylene resin composition obtained using this polymer have room for improvement in the balance among properties such as low temperature impact resistance, flexibility, transparency, and low stickiness. Particularly, flexibility and low temperature impact resistance are in a so-called trade-off relationship in which improvement in one of the physical properties reduces the other physical property. Thus, conventional techniques cannot achieve both of these physical properties at a high level.

The present invention has been made in light of the problems of the conventional techniques described above. An object of the present invention is to provide a hydrogenated block copolymer excellent in the balance among the low temperature impact resistance, flexibility, transparency, and low stickiness of a molded body when applied to a polypropylene resin composition.

Solution to Problem

The present inventors have conducted diligent studies and experiments to solve the problems of the conventional techniques and consequently completed the present invention by finding that the problems can be solved by a hydrogenated block copolymer having a predetermined configuration.

The present invention is as follows:

[1]

A hydrogenated block copolymer comprising, in its molecule, a polymer block (C) having a conjugated diene compound as a main component, a polymer block (B) having a conjugated diene compound as a main component, and a polymer block (S) having a vinyl aromatic compound as a main component, wherein:

the polymer block (B) comprises polymer blocks (B1) and (B2);

in the hydrogenated block copolymer, a content of the polymer block (C) is 1 to 20 mass %, a content of the polymer block (B) is 73 to 97 mass %, and a content of the polymer block (S) is 1 to 15 mass %;

an amount of vinyl bond before hydrogenation of the polymer block (C) is 1 to 25 mol %, an amount of vinyl bond before hydrogenation of the polymer block (B1) is 40 mol % or more and 60 mol % or less, and an amount of vinyl bond before hydrogenation of the polymer block (B2) is more than 60 mol % and 100 mol % or less; and a degree of hydrogenation is 80 mol % or more.

[2]

The hydrogenated block copolymer according to [1], wherein a total content of the polymer block (C) and the polymer block (S) is 3 to 27 mass % based on 100 mass % of the hydrogenated block copolymer.

[3]

The hydrogenated block copolymer according to [1] or [2], wherein a content of the polymer block (B1) is 10 to 60 mass %, and a content of the polymer block (B2) is 30 to 80 mass %, based on 100 mass % of the hydrogenated block copolymer.

[4]

The hydrogenated block copolymer according to any one of [1] to [3], wherein the polymer block (B) further comprises a polymer block (B3) present at an end of the hydrogenated block copolymer, and a content of the polymer block (B3) in the hydrogenated block copolymer is 1 to 10 mass %.

[5]

A hydrogenated block copolymer comprising, in its molecule, a vinyl aromatic compound unit and a conjugated diene compound unit, wherein:

a content of the vinyl aromatic compound unit is 1 to 15 mass %;

a degree of hydrogenation of the hydrogenated block copolymer is 80 mol % or more;

a butylene content and/or a propylene content is 42 to 80 mol % based on 100 mol % in total of the conjugated diene compound unit;

the hydrogenated block copolymer has a crystallization peak at −20 to 80° C. and has a heat of crystallization of 0.1 to 10 J/g;

an elution volume peak obtained by a temperature gradient interaction chromatography measurement of the hydrogenated block copolymer is in a range of 0° C. or higher and 150° C. or lower, and a width at half height of the elution volume peak is in a range of 20 to 40° C.;

a tan δ peak (Tg1), which is observed in a temperature-loss tangent (tan δ) curve obtained by the solid viscoelasticity measurement (1 Hz) of the hydrogenated block copolymer and indicates the glass transition of the hydrogenated block copolymer, is in a range of −45° C. or higher and 0° C. or lower, and a height of the tan δ peak is less than 1.60; and a Shore A hardness of the hydrogenated block copolymer is 15 to 60.

[6]

The hydrogenated block copolymer according to any of [1] to [5], wherein a microphase separated structure comprises a spherical structure.

[7]

The hydrogenated block copolymer according to any of [1] to [6], wherein the tan δ peak (Tg1), which is observed in the temperature-loss tangent (tan δ) curve obtained by the solid viscoelasticity measurement (1 Hz) of the hydrogenated block copolymer and indicates the glass transition of the hydrogenated block copolymer, is in a range of higher than −45° C. and −30° C. or lower, and difference ΔTg between the Tg1 and a tan δ peak (Tg2) observed by an addition of 30 mass % of the hydrogenated block copolymer to homopolypropylene, Tg1-Tg2, is 3 to 12° C.

[8]

The hydrogenated block copolymer according to any of [1] to [7], wherein in 13C-NMR measurement, a ratio of an integrated value of 29.4 to 30.0 ppm to an integrated value of 9.0 to 14.0 ppm, integrated value of 29.4 to 30.0 ppm/integrated value of 9.0 to 14.0 ppm, is in the range of an integrated value ratio determined according to the following formula (1) to an integrated value ratio determined according to the following formula (2), and the butylene content is 50 to 80 mol %:

$$\text{Integrated value ratio} = ((1.23 + ((100 - \text{Butylene content} \times 0.97 - 0.3)/0.97)^3/10000 \times 0.97)/0.97)/(\text{Butylene content}/4) \quad \text{Formula (1), and}$$

$$\text{Integrated value ratio} = ((12.28 + ((100 - \text{Butylene content} \times 0.97 - 0.3)/0.97)^3/10000 \times 0.97)/0.97)/(\text{Butylene content}/4) \quad \text{Formula (2).}$$

[9]

A polypropylene resin composition comprising 1 to 99 mass % of the hydrogenated block copolymer according to any of [1] to [8] and 1 to 99 mass % of a polypropylene resin.

[10]

The polypropylene resin composition according to [9], wherein in wide angle X ray diffractometry, an intensity ratio of diffraction peak intensity (I(14)) at a scattering angle (2θ) of 14° to diffraction peak intensity (I(15)) at a scattering angle (2θ) of 15°, I(14)/I(15), is 0.1 or more and less than 1.4.

[11]

The polypropylene resin composition according to [9] or [10], wherein in measurement by cross fractionation chromatography, an integral elution volume at −20° C. or lower is 0.1% or more and less than 10% of a total volume, an integral elution volume in a range of higher than −20° C. and lower than 60° C. is 1% or more and less than 99% of the total volume, and an integral elution volume in a range of 60° C. or higher and 150° C. or lower is 1% or more and less than 99% of the total volume.

[12]

The polypropylene resin composition according to any of [9] to [11], wherein the polypropylene resin is a random polypropylene.

[13]

A molded body comprising the hydrogenated block copolymer according to any of [1] to [8].

[14]

A molded body comprising the polypropylene resin composition according to any of [9] to [12].

[15]

A multi-layer film comprising a layer, the layer comprising a polypropylene resin and the hydrogenated block copolymer according to any of [1] to [8].

[16]

The multi-layer film according to [15], wherein:

the multi-layer film comprises an outer layer, an intermediate layer, and an inner layer;

the outer layer comprises polypropylene resin P1;

the intermediate layer comprises polypropylene resin P2 and the hydrogenated block copolymer; and the inner layer comprises polypropylene resin P3 and/or a polyethylene resin.

[17]

The multi-layer film according to [16], wherein a thickness of the outer layer is 5 to 50 μm, a thickness of the intermediate layer is 100 to 200 μm, and a thickness of the inner layer is 5 to 50 μm.

[18]

The multi-layer film according to any of [15] to [17], wherein in measurement by cross fractionation chromatography (CFC), an integral elution volume at −20° C. or lower is 0.1% or more and less than 75% of a total volume, an integral elution volume in a range of higher than −20° C. and lower than 60° C. is 5% or more and less than 80% of the total volume, and an integral elution volume in a range of 60° C. or higher and 150° C. or lower is 20% or more and less than 95% of the total volume.

[19]

A tube comprising a layer, the layer comprising a polypropylene resin and the hydrogenated block copolymer according to any of [1] to [8].

[20]

The tube according to [19], wherein a content of the hydrogenated block copolymer is 40 to 95 mass %, and a content of the polypropylene resin is 5 to 60 mass %.

[21]

The tube according to [19] or [20], further comprising a hydrogenated block copolymer (a2) other than the hydrogenated block copolymer, wherein:

the hydrogenated block copolymer (a2) comprises a polymer block (C-2) having a conjugated diene compound as a main component, a polymer block (B-2) having a conjugated diene compound as a main component, and a polymer block (S-2) having a vinyl aromatic compound as a main component;

in the hydrogenated block copolymer (a2), a content of the polymer block (C-2) is 0 to 15 mass %, a content of the polymer block (B-2) is 75 to 97 mass %, and a content of the polymer block (S-2) is 3 to 25 mass %;

an amount of vinyl bond before hydrogenation of the polymer block (C-2) is 1 to 25 mol %, and an amount of vinyl bond before hydrogenation of the polymer block (B-2) is 40 to 100 mol %; and a degree of hydrogenation of the hydrogenated block copolymer (a2) is 80 mol % or more.

[22]

The tube according to [21], wherein a total content of the hydrogenated block copolymer and the hydrogenated block copolymer (a2) is 40 to 95 mass %, and a content of the polypropylene resin is 5 to 60 mass %.

[23]
The tube according to any of [19] to [22], wherein:
the tube comprises an outer layer and an inner layer;
the inner layer comprises the hydrogenated block copolymer;
a thickness of the outer layer is 5 to 1000 μm; and
a thickness of the inner layer is 10 to 3000 μm.

[24]
The tube according to [23], wherein a content of the polypropylene resin in the outer layer is 60 to 95 mass %, and a content of the hydrogenated block copolymer in the outer layer is 5 to 40 mass %.

[25]
The tube according to any of [19] to [24], wherein:
the tube comprises an outer layer and an inner layer;
the outer layer comprises the hydrogenated block copolymer;
a thickness of the outer layer is 5 to 1000 μm; and
a thickness of the inner layer is 10 to 3000 μm.

[26]
The tube according to [25], wherein a content of the polypropylene resin in the inner layer is 5 to 60 mass %, and a content of the hydrogenated block copolymer in the inner layer is 40 to 95 mass %.

[27]
The tube according to any of [19] to [26], wherein in measurement by cross fractionation chromatography (CFC), an integral elution volume at −20° C. or lower is 0.1% or more and less than 40% of a total volume, an integral elution volume in a range of higher than −20° C. and lower than 60° C. is 40% or more and less than 95% of the total volume, and an integral elution volume in a range of 60° C. or higher and 150° C. or lower is 5% or more and less than 60% of the total volume.

[28]
A tacky film comprising:
a substrate film; and
a tacky layer comprising the hydrogenated block copolymer according to any of [1] to [8], the tacky layer being disposed on the substrate film.

[29]
The tacky film according to [28], wherein:
the tacky layer further comprises 5 to 95 mass % of a hydrogenated block copolymer (b) and/or a hydrogenated block copolymer (c);
the hydrogenated block copolymer (b) comprises, in its molecule, a polymer block (B-1) having a conjugated diene compound as a main component, and a polymer block (S1) having a vinyl aromatic compound as a main component;
in the hydrogenated block copolymer (b), a content of the polymer block (B-1) is 95 to 70 mass %, and a content of the polymer block (S1) is 5 to 30 mass %;
an amount of vinyl bond before hydrogenation of the polymer block (B-1) is 30 to 100 mol %;
a degree of hydrogenation of the hydrogenated block copolymer (b) is 80 mol % or more;
the hydrogenated block copolymer (c) comprises, in its molecule, a polymer block (B-2) comprising a conjugated diene compound and a vinyl aromatic compound, and a polymer block (S2) having a vinyl aromatic compound as a main component;
in the hydrogenated block copolymer (c), a content of the polymer block (B-2) is 95 to 70 mass %, and a content of the polymer block (S2) is 5 to 30 mass %; and
a degree of hydrogenation of the hydrogenated block copolymer (c) is 80 mol % or more.

[30]
The tacky film according to [28] or [29], further comprises 0.5 to 50 mass % of a tackifier.

[31]
The tacky film according to [30], wherein the tackifier is at least one selected from the group consisting of a hydrogenated terpene resin, an aromatic modified hydrogenated terpene resin, a hydrogenated terpene phenol resin, and a terpene phenol resin.

Advantageous Effects of Invention

The hydrogenated block copolymer according to the present invention is capable of imparting a good balance among low temperature impact resistance, flexibility, transparency, and low stickiness to a molded body when applied to a polypropylene resin composition.

DESCRIPTION OF EMBODIMENTS

Figure 1:
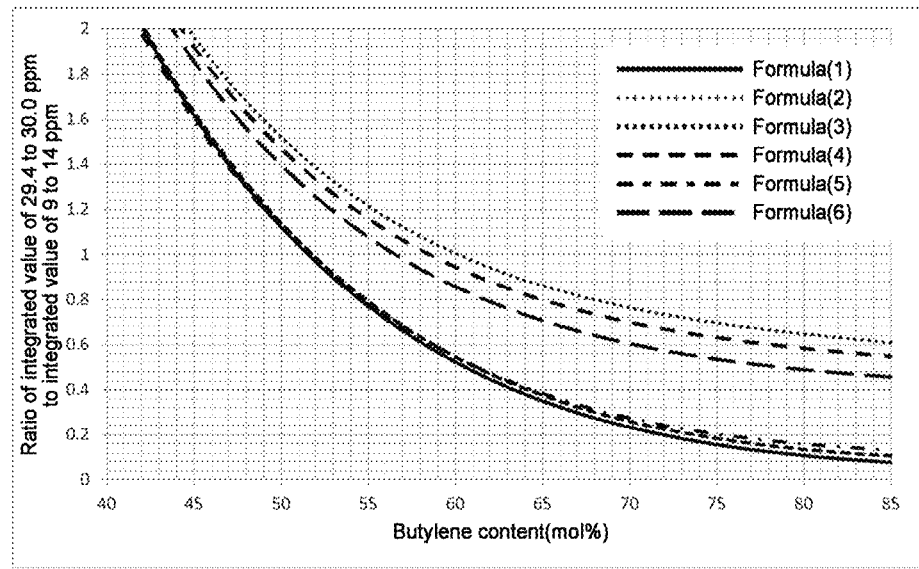
FIG. 1 shows a graph showing the relationship between a butylene content and a ratio represented by integrated value of 29.4 to 30.0 ppm/integrated value of 9.0 to 14.0 ppm in the hydrogenated block copolymer according to the present embodiment.

Hereinafter, an embodiment for carrying out the present invention (hereinafter, simply referred to as the "present embodiment") will be described in detail. The present embodiment is given for illustrating the present invention and is not intended to limit the present invention to the contents described below. The present invention can be carried out by making various changes or modifications without departing from the scope of the present invention.

<Hydrogenated Block Copolymer>

The hydrogenated block copolymer of the present embodiment comprises, in its molecule, a polymer block (C) having a conjugated diene compound as a main component, a polymer block (B) having a conjugated diene compound as a main component, and a polymer block (S) having a vinyl aromatic compound as a main component, wherein: the polymer block (B) comprises polymer blocks (B1) and (B2); in the hydrogenated block copolymer, a content of the polymer block (C) is 1 to 20 mass %, a content of the polymer block (B) is 73 to 97 mass %, and a content of the polymer block (S) is 1 to 15 mass %; an amount of vinyl bond before hydrogenation of the polymer block (C) is 1 to 25 mol %, an amount of vinyl bond before hydrogenation of the polymer block (B1) is 40 mol % or more and 60 mol % or less, and an amount of vinyl bond before hydrogenation of the polymer block (B2) is more than 60 mol % and 100 mol % or less; and a degree of hydrogenation is 80 mol % or more.

Also, the hydrogenated block copolymer of the present embodiment mentioned above can be defined as follows: the hydrogenated block copolymer of the present embodiment comprises, in its molecule, a vinyl aromatic compound unit and a conjugated diene compound unit, wherein: a content of the vinyl aromatic compound unit is 1 to 15 mass %; a degree of hydrogenation of the hydrogenated block copolymer is 80 mol % or more; a butylene content and/or a propylene content is 42 to 80 mol % based on 100 mol % in total of the conjugated diene compound unit; the hydrogenated block copolymer has a crystallization peak at −20 to 80° C. and has a heat of crystallization of 0.1 to 10 J/g;

in the temperature gradient interaction chromatography (hereinafter, referred to as "TGIC") measurement of the hydrogenated block copolymer (a1), an elution volume peak is in the range of 0° C. or higher and 150° C. or lower, and a width at half height of the elution peak is in the range of 20 to 40° C.; a tan δ peak (Tg1) which is observed in a temperature-loss tangent (tan δ) curve obtained by the solid viscoelasticity measurement (1 Hz) of the hydrogenated block copolymer and indicates the glass transition of the hydrogenated block copolymer is in the range of −45° C. or higher and 0° C. or lower, and a height of the tan δ peak is less than 1.60; and a Shore A hardness of the hydrogenated block copolymer (a1) is 15 to 60.

The hydrogenated block copolymer according to the present embodiment configured as described above is capable of imparting a good balance among low temperature impact resistance (hereinafter, also simply referred to as "impact resistance"), flexibility, transparency, and low stickiness to a molded body when applied to a polypropylene resin composition.

(Hydrogenated Block Copolymer)

The hydrogenated block copolymer according to the present embodiment (hereinafter, also simply referred to as a "hydrogenated block copolymer (a)") comprises, in its molecule, a polymer block (C) having a conjugated diene compound as a main component (hereinafter, also simply referred to as a "polymer block (C)"), a polymer block (B) having a conjugated diene compound as a main component (hereinafter, also simply referred to as a "polymer block (B)"), and a polymer block (S) having a vinyl aromatic compound as a main component (hereinafter, also simply referred to as a "polymer block (S)").

In this respect, the phrase "having . . . as a main component" means containing 60 mass % or more of the monomer unit in the polymer block.

The contents of the conjugated diene compounds in the polymer block (C) and the polymer block (B) each having a conjugated diene compound as a main component are each independently preferably 70 mass % or more, more preferably 80 mass % or more, further preferably 90 mass % or more, from the viewpoint of the impact resistance, flexibility, transparency, and low stickiness of a molded body of the resulting polypropylene resin composition. The content of the vinyl aromatic compound in the polymer block (S) having a vinyl aromatic compound as a main component is preferably 70 mass % or more, more preferably 80 mass % or more, further preferably 90 mass % or more, from the viewpoint of the low stickiness of a molded body of the resulting polypropylene resin composition.

The content of the conjugated diene compound and the content of the vinyl aromatic compound can be measured by nuclear magnetic resonance spectrometry (NMR).

The conjugated diene compound unit is a unit forming the hydrogenated block copolymer (a) and refers to a unit derived from a monomer of a conjugated diene compound. Also, the vinyl aromatic compound unit is a unit forming the hydrogenated block copolymer (a) and refers to a unit derived from a monomer of a vinyl aromatic compound.

The "amount of vinyl bond before hydrogenation" in the polymer blocks (C) and (B) means the percentage (mol %) of pre-hydrogenated conjugated dienes attached by 1,2 bonds and 3,4-bonds relative to those attached by 1,2-bonds, 3,4-bonds, and 1,4-bonds.

The amount of vinyl bond can be measured by nuclear magnetic resonance spectrometry (NMR).

In the present embodiment, the conjugated diene for use in the polymer block (C) or (B) in the hydrogenated block copolymer (a) is a diolefin having a pair of conjugated double bonds. Examples of the diolefin include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene. Particularly, general examples of the diolefin include 1,3-butadiene and isoprene. These conjugated dienes may be used alone or in combination of two or more.

In the present embodiment, preferably, the polymer block (C) contains butadiene, and the polymer block (B) contains butadiene or isoprene, from the viewpoint of the transparency and flexibility of a molded body of the resulting polypropylene resin composition.

In the present embodiment, examples of the vinyl aromatic compound for use in the polymer block (S) in the hydrogenated block copolymer (a) include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. Among them, styrene, α-methylstyrene, or 4-methylstyrene is preferably used from the viewpoint of availability and productivity. Styrene is particularly preferred. The polymer block (S) may be constituted by one vinyl aromatic compound unit or may be constituted by two or more vinyl aromatic compound units.

The content of the polymer block (C) in the hydrogenated block copolymer (a) is 1 to 20 mass % from the viewpoint of the flexibility, transparency, and low stickiness of a molded body of the resulting polypropylene resin composition. From similar viewpoints, the content of the polymer block (C) in the hydrogenated block copolymer (a) is preferably 2 to 15 mass %, more preferably 3 to 10 mass %. The content of the polymer block (C) can be measured by a method described in Examples mentioned later.

The amount of vinyl bond (hereinafter, also simply referred to as a "vinyl content") before hydrogenation of the polymer block (C) is 1 to 25 mol % from the viewpoint of dispersibility in a polypropylene resin and from the viewpoint of the flexibility, transparency, and low stickiness of a molded body of the resulting polypropylene resin composition. From similar viewpoints, the amount of vinyl bond before hydrogenation of the polymer block (C) is preferably 3 to 22 mol %, more preferably 5 to 20 mol %.

The amount of vinyl bond before hydrogenation of the polymer block (C) having a conjugated diene compound as a main component can be specifically measured by a method described in Examples mentioned later.

The amount of vinyl bond can be controlled by use of a vinylating agent such as a polar compound or a Lewis base (e.g., ether or amine).

The content of the polymer block (B) in the hydrogenated block copolymer (a) is 73 to 97 mass % from the viewpoint of the flexibility and transparency of a molded body of the resulting polypropylene resin composition. From similar viewpoints, the content of the polymer block (B) is preferably 75 to 95 mass %, more preferably 82 to 93 mass %. The content of the polymer block (B) can be measured by a method described in Examples mentioned later.

In the present embodiment, the amount of vinyl bond before hydrogenation of the polymer block (B) is defined for each of the polymer block (B1) and the polymer block (B2) contained in the block. Specifically, the amount of vinyl bond before hydrogenation of the polymer block (B1) is 40 mol % or more and 60 mol % or less from the viewpoint of the impact resistance of a molded body of the resulting polypropylene resin composition. From similar viewpoints, the amount of vinyl bond before hydrogenation of the polymer block (B1) is preferably 42 to 58 mol %, more preferably 45 to 55 mol %. The amount of vinyl bond before hydrogenation of the polymer block (B2) is more than 60 mol % and 100 mol % or less from the viewpoint of the flexibility, transparency, and low stickiness of a molded body of the resulting polypropylene resin composition. From similar viewpoints, the amount of vinyl bond before hydrogenation of the polymer block (B2) is preferably 65 to 95 mol %, more preferably 70 to 90 mol %.

The amount of vinyl bond before hydrogenation of the polymer block (B) having a conjugated diene compound as a main component can be specifically measured by a method described in Examples mentioned later.

The amount of vinyl bond can be controlled by use of a vinylating agent such as a polar compound or a Lewis base (e.g., ether or amine).

As described above, the hydrogenated block copolymer (a) of the present embodiment has the polymer block (C) and the polymer block (B) and thereby comprises at least three polymer blocks differing in vinyl content. Specifically, the hydrogenated block copolymer (a) of the present embodiment has: the polymer block (C) which has a low vinyl content of 1 to 25 mol % and contributes to low stickiness; the polymer block (B1) which has a moderate vinyl content of 40 mol % or more and 60 mol % or less and contributes to impact resistance; and the polymer block (B2) which has a high vinyl content of more than 60 mol % and 100 mol % or less and contributes to flexibility and transparency, and is thereby excellent, particularly, in the balance among impact resistance, flexibility, and transparency through the cooperation of the properties of these polymer blocks. Specifically, the hydrogenated block copolymer (a) of the present embodiment can particularly improve the balance between impact resistance and flexibility and transparency which have heretofore been considered to be in a trade-off relationship.

In the present embodiment, the content of the polymer block (B1) is preferably 10 to 60 mass %, and the content of the polymer block (B2) is preferably 30 to 80 mass %, in 100 mass % of the polymer block copolymer (a) from the viewpoint of the performance balance among the impact resistance, flexibility, and transparency of a molded body of the resulting polypropylene resin composition. From similar viewpoints, the content of the polymer block (B1) is more preferably 15 to 55 mass %, and the content of the polymer block (B2) is more preferably 40 to 75 mass %. The content of the polymer block (B1) is further preferably 20 to 50 mass %, and the content of the polymer block (B2) is further preferably 50 to 70 mass %. These contents can be measured by a method described in Examples mentioned later.

The content of the polymer block (S) in the hydrogenated block copolymer (a) is 1 to 15 mass % from the viewpoint of the flexibility and transparency of a molded body of the resulting polypropylene resin composition. From similar viewpoints, the content of the polymer block (S) is preferably 2 to 12 mass %, more preferably 3 to 9 mass %. The content of the polymer block (S) and the content of the vinyl aromatic compound unit in the hydrogenated block copolymer can each be measured by a method described in Examples mentioned later.

The butylene content and/or propylene content of the hydrogenated block copolymer (a) is 42 to 80 mol % and is preferably 45 to 80 mol %, more preferably 55 to 70 mol %, based on 100 mol % in total of the conjugated diene compound unit from the viewpoint of the performance balance among the impact resistance, flexibility, and transparency of a molded body of the resulting polypropylene resin composition. The butylene content and/or propylene content can be measured by a method described in Examples mentioned later. The butylene content and/or propylene content can be controlled by use of a vinylating agent such as a polar compound or a Lewis base (e.g., ether or amine) or by the degree of hydrogenation.

In the present embodiment, the total content of the polymer block (C) and the polymer block (S) in the hydrogenated block copolymer (a) is preferably 3 to 27 mass %, more preferably 5 to 25 mass %, further preferably 7 to 18 mass %, from the viewpoint of the flexibility, transparency, and low stickiness of a molded body of the resulting polypropylene resin composition.

Examples of the structure of the hydrogenated block copolymer (a) of the present embodiment include, but are not particularly limited to, structures represented by the following formulas:

(C-B)n-S,

(C-B-S)n,

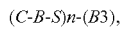
(C-B-S)n-(B3),

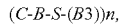
(C-B-S-(B3))n,

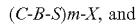
(C-B-S)m-X, and (C-B-S-(B3))m-X, wherein C, B, S, and B3 represent polymer blocks (C), (B), (S), and (B3) mentioned later, respectively, and when there are a plurality of polymer blocks (C), (B), (S), or (B3), these polymer blocks may be different from or the same as each other; one B is at least one polymer block (B1) and polymer block (B2) and may consist of a plurality of polymer blocks (B1) and polymer blocks (B2); and when there is only one B, this B consist of at least one polymer block (B1) and at least one polymer block (B2).; n represents an integer of 1 or larger, preferably 1 to 3; m represents an integer of 2 or larger, preferably 2 to 6; and X represents a residue of a coupling agent or a residue of a polyfunctional initiator.

A polymer represented by the structural formula C-B-S or C-B-S-(B3) is particularly preferred.

In the present embodiment, preferably, the polymer block (B) further comprises a polymer block (B3) present at the end of the hydrogenated block copolymer, and the content of the polymer block (B3) in the hydrogenated block copolymer is 1 to 10 mass %, from the viewpoint of the flexibility and transparency of a molded body of the resulting polypropylene resin composition. From similar viewpoints, the content of the polymer block (B3) is more preferably 1.5 to 7 mass %, further preferably 2 to 5 mass %, in the hydrogenated block copolymer.

The content of the polymer block (B3) present at the end of the hydrogenated block copolymer (a) can be controlled by the feed composition of polymerization monomers.

The degree of hydrogenation of the hydrogenated block copolymer (a), i.e., the degree of hydrogenation of all the conjugated diene compound units contained in the hydrogenated block copolymer (a), is 80 mol % or more and is preferably 85 mol % or more, more preferably 90 mol % or more, further preferably 95 mol % or more.

The degree of hydrogenation of all unsaturated group units contained in the conjugated diene monomer units of the hydrogenated block copolymer (a) can be measured by a method described in Examples mentioned later.

The degree of hydrogenation is set to 80 mol % or more to thereby enhance the crystallization of the polymer block (C) and to thereby improve the blocking resistance of the hydrogenated block copolymer, and the workability and low stickiness of a molded body of the resulting polypropylene resin composition. In addition, the polymer block (B) and a polypropylene resin have closer solubility parameters so that the hydrogenated block copolymer (a) has good dispersibility. Therefore, a molded body of the resulting polypropylene resin composition has good flexibility and transparency.

The degree of hydrogenation can be controlled by, for example, the amount of a hydrogenation catalyst. The hydrogenation rate can be controlled by, for example, the amount of a hydrogenation catalyst, the amount of hydrogen fed, pressure, or temperature.

In the temperature gradient interaction chromatography (hereinafter, also referred to as "TGIC") measurement of a dry sample of Soxhlet extracts from the hydrogenated block copolymer (a) of the present embodiment, a polypropylene resin composition mentioned later, or a molded body mentioned later, an elution volume peak temperature is in the range of 0° C. or higher and 150° C. or lower, and the width at half height of the elution volume peak is in the range of 20 to 40° C.

When the behavior described above is observed, the balance among the low temperature impact resistance, flexibility, transparency, and low stickiness of a molded body of the resulting polypropylene resin composition tends to be better.

From similar viewpoints, the elution peak temperature in the range of 0° C. or higher and 150° C. or lower is more preferably 30° C. or higher and 140° C. or lower, further preferably 45° C. or higher and 130° C. or lower, and the width at half height of the peak is more preferably 21 to 37° C., further preferably 22 to 34° C.

The width at half height of the TGIC elution volume peak can be controlled by, for example, the ratio of the polymer block (C), (B1), or (B2) mentioned above. The TGIC elution volume can be measured by a method described in Examples mentioned later.

The width at half height is ascribable to the structure of the hydrogenated block copolymer (a). Under the same measurement conditions, the width at half height of the elution volume peak does not vary between the case of using the hydrogenated block copolymer (a) as a measurement sample and the case of using, as a measurement sample, a resin composition comprising the hydrogenated block copolymer (a) or a film, a tube, or the like (irrespective of molding conditions) obtained by molding thereof.

The hydrogenated block copolymer (a) has a crystallization peak at −20 to 80° C. and has a heat of crystallization of 0.1 to 10 J/g, from the viewpoint of the blocking resistance of the hydrogenated block copolymer and the flexibility, transparency, and low stickiness of the resulting polypropylene resin composition. From similar viewpoints, the temperature range involving the crystallization peak is preferably −10 to 70° C., more preferably 0 to 60° C. The heat of crystallization is preferably 1.0 to 7.5 J/g, more preferably 1.5 to 5.0 J/g.

The temperature range involving the crystallization peak and the heat of crystallization can be measured by a method described in Examples mentioned later.

The crystallization peak temperature range and the heat of crystallization of the hydrogenated block copolymer (a) can be controlled by, for example, the content of the polymer block (C), by use of a vinylating agent such as a polar compound or a Lewis base (e.g., ether or amine), or by the degree of hydrogenation.

In the present embodiment, the microphase separated structure of the hydrogenated block copolymer preferably comprises a spherical structure and more preferably comprises a spherical structure having a size of 5 to 20 nm, from the viewpoint of the flexibility, transparency, and low stickiness of a molded body of the resulting polypropylene resin composition. The spherical structure is a unique structure that is observed when the polymer block (S) according to the present embodiment is present at one end of the hydrogenated block copolymer. In addition, the size mentioned above is attained when the content of the polymer block (S) falls within a predetermined range. The spherical structure can be confirmed by a method described in Examples mentioned later.

The melt flow rate (MFR; conforming to ISO 1133) of the hydrogenated block copolymer (a) is preferably in the range of 0.1 to 12 g/10 minutes, more preferably 0.5 to 10 g/10 minutes, further preferably 1.0 to 8 g/10 minutes, still further preferably 1.5 to 5.0 g/10 minutes, from the viewpoint of the workability, flexibility, transparency, and low stickiness, etc. of a molded body of the resulting polypropylene resin composition.

In the present embodiment, the tan δ peak (Tg1) which is observed in a temperature-loss tangent (tan δ) curve obtained by the solid viscoelasticity measurement (1 Hz) of the hydrogenated block copolymer (a) and indicates the glass transition of the hydrogenated block copolymer (a) is in the range of −45° C. or higher and 0° C. or lower from the viewpoint of the balance among the low temperature impact resistance, low stickiness, flexibility, and transparency of a molded body of the resulting polypropylene resin composition. Tg1 is more preferably −45° C. or higher and −15° C. or lower, further preferably −45° C. or higher and −30° C. or lower. The height of the tan δ peak is less than 1.60. The tan δ peak height is preferably less than 1.50, more preferably less than 1.40. Particularly, the balance among low temperature impact resistance, low stickiness, flexibility, and transparency is excellent by controlling the temperature and the peak temperature of tan δ in these ranges. Difference ΔTg between the Tg1 and a tan δ peak (Tg2) observed by the addition of 30 mass % of the hydrogenated block copolymer (a) to homopolypropylene (propylene unit content: 99% or more and MFR (230° C., conforming to ISO1133)=1 to 10 g/10 minutes), Tg1-Tg2, is preferably in the range of 3 to 12° C.

From similar viewpoints, the difference (Tg1-Tg2) is preferably 4 to 10° C., more preferably 5 to 9° C.

The (Tg1), the (Tg2), and the ΔTg can be measured by a method described in Examples mentioned later.

The ΔTg can be controlled by, for example, the ratio of the polymer block (B1) or (B2).

The Shore A hardness of the hydrogenated block copolymer (a) is preferably in the range of 15 to 60. When the Shore A hardness is 15 to 60, the effect of improving the flexibility and transparency of a molded body of the resulting polypropylene resin composition is obtained.

The range of the Shore A hardness is more preferably 25 to 55, further preferably 30 to 50.

The Shore A hardness of the hydrogenated block copolymer (a) can be controlled, for example, by the presence of a polymer block having a conjugated diene compound as a main component and having an amount of vinyl bond before hydrogenation of 1 to 25 mol % and a polymer block having a vinyl aromatic compound as a main component, by adjusting the contents of these polymer blocks, by use of a vinylating agent such as a polar compound or a Lewis base (e.g., ether or amine), or by adjusting the degree of hydrogenation.

In this context, the Shore A hardness can be measured by a method described in Examples mentioned later.

The weight average molecular weight (Mw) (hereinafter, also referred to as "Mw") of the hydrogenated block copolymer (a) is preferably 100,000 to 300,000, more preferably 130,000 to 280,000, further preferably 150,000 to 260,000, from the viewpoint of the blocking resistance of the hydrogenated block copolymer and from the viewpoint of the workability, flexibility, transparency, and low stickiness of a molded body of the resulting polypropylene resin composition.

The weight average molecular weight (Mw) of the hydrogenated block copolymer (a) is a weight average molecular weight (Mw) determined as the molecular weight of the chromatogram peak in GPC measurement on the basis of a calibration curve obtained from the measurement of commercially available standard polystyrene (created by using the peak molecular weight of standard polystyrene). The molecular weight distribution of the hydrogenated block copolymer can also be determined from similar measurement by GPC. The molecular weight distribution is the ratio of the weight average molecular weight (Mw) to a number average molecular weight (Mn).

In the gel permeation chromatography (hereinafter, also referred to as, "GPC") measurement of the hydrogenated block copolymer (a), the molecular weight distribution of a single peak is preferably 1.30 or less, more preferably 1.20 or less, further preferably 1.15 or less, still further preferably 1.10 or less.

Preferably, in the 13C-NMR measurement of a dry sample of Soxhlet extracts from the hydrogenated block copolymer (a) mentioned above or a resin composition comprising the hydrogenated block copolymer (a), the ratio of an integrated value of 29.4 to 30.0 ppm to an integrated value of 9.0 to 14.0 ppm (integrated value of 29.4 to 30.0 ppm/integrated value of 9.0 to 14.0 ppm) is in the range of an integrated value ratio determined according to the following formula (1) to an integrated value ratio determined according to the following formula (2), and the butylene content is 50 to 80 mol %:

$$\text{Integrated value ratio} = ((1.23 + ((100 - \text{Butylene content} \times 0.97 - 0.3)/0.97)^3/10000 \times 0.97)/0.97)/(\text{Butylene content}/4) \quad \text{Formula (1), and}$$

$$\text{Integrated value ratio} = ((12.28 + ((100 - \text{Butylene content} \times 0.97 - 0.3)/0.97)^3/10000 \times 0.97)/0.97)/(\text{Butylene content}/4) \quad \text{Formula (2).}$$

Within the range described above, the resulting film is excellent in the property balance among flexibility, transparency, low stickiness, and impact resistance.

From similar viewpoints, the butylene content is preferably 52 to 76 mol %, more preferably 55 to 70 mol %.

The integrated value ratio represented by formulas described above is preferably in the range of the following formulas (3) to (4), more preferably in the range of the following formulas (5) to (6):

$$\text{Integrated value ratio} = ((1.84 + ((100 - \text{Butylene content} \times 0.97 - 0.3)/0.97)^3/10000 \times 0.97)/0.97)/(\text{Butylene content}/4) \quad \text{Formula (3),}$$

$$\text{Integrated value ratio} = ((11.05 + ((100 - \text{Butylene content} \times 0.97 - 0.3)/0.97)^3/10000 \times 0.97)/0.97)/(\text{Butylene content}/4) \quad \text{Formula (4),}$$

$$\text{Integrated value ratio} = ((2.46 + ((100 - \text{Butylene content} \times 0.97 - 0.3)/0.97)^3/10000 \times 0.97)/0.97)/(\text{Butylene content}/4) \quad \text{Formula (5), and}$$

$$\text{Integrated value ratio} = ((9.21 + ((100 - \text{Butylene content} \times 0.97 - 0.3)/0.97)^3/10000 \times 0.97)/0.97)/(\text{Butylene content}/4) \quad \text{Formula (6).}$$

The integrated value ratio can be controlled by the amount of the polymer block (C), (B1), (B2), or (S) and the butylene content in the ranges mentioned above.

The integrated value ratio is ascribable to the structure of the hydrogenated block copolymer (a). Under the same measurement conditions, the integrated value does not vary between the case of using the hydrogenated block copolymer (a) as a measurement sample and the case of using, as a measurement sample, a resin composition comprising the hydrogenated block copolymer (a). FIG. 1 shows the relationship between the butylene content of the hydrogenated block copolymer and the integrated value ratio (integrated value of 29.4 to 30.0 ppm/integrated value of 9.0 to 14.0 ppm) calculated from the butylene content according to the formulas (1) to (6).

<Method for Producing Hydrogenated Block Copolymer>

The method for producing the hydrogenated block copolymer is not particularly limited. The hydrogenated block copolymer can be produced, for example, by performing polymerization in an organic solvent with an organic alkali metal compound as a polymerization initiator to obtain a block copolymer, followed by hydrogenation reaction. The mode of polymerization may be batch polymerization, continuous polymerization, or a combination thereof. A batch polymerization method is preferred from the viewpoint of obtaining a block copolymer having a narrow molecular weight distribution and high strength.

The polymerization temperature is generally 0 to 150° C., preferably 20 to 120° C., more preferably 40 to 100° C., further preferably 55 to 65° C. The polymerization time differs depending on the polymer of interest and is usually 24 hours or shorter, preferably 0.1 to 10 hours. The polymerization time is more preferably 0.5 to 3 hours from the viewpoint of obtaining a block copolymer having a narrow molecular weight distribution and high strength. The atmosphere of the polymerization system is not particularly limited and can have any pressure range sufficient for maintaining nitrogen and a solvent in a liquid phase. It is preferred that impurities, for example, water, oxygen, and carbon dioxide, which inactivate an initiator and living polymers should be absent in the polymerization system.

Examples of the organic solvent include, but are not particularly limited to: aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

The organic alkali metal compound serving as a polymerization initiator is preferably an organolithium compound. An organic monolithium compound, an organic dilithium compound, or an organic polylithium compound is used as the organolithium compound. Specific examples of the organolithium compound include, but are not limited to, ethyl lithium, n-propyl lithium, isopropyl lithium, n-butyl lithium, sec-butyl lithium, t-butyl lithium, phenyl lithium, hexamethylene dilithium, butadienyl lithium, and isopropenyl dilithium. Among them, n-butyl lithium or sec-butyl lithium is preferred from the viewpoint of polymerization activity.

The amount of the organic alkali metal compound used as a polymerization initiator depends on the molecular weight of the block copolymer of interest and is generally preferably in the range of 0.01 to 0.5 phm (parts by mass based on 100 parts by mass of monomers), more preferably in the range of 0.03 to 0.3 phm, still more preferably in the range of 0.05 to 0.15 phm.

The amount of vinyl bond of the hydrogenated block copolymer can be adjusted by using a compound such as a Lewis base, for example, ether or amine, as a vinylating agent. The amount of the vinylating agent used can be adjusted according to the amount of vinyl bond of interest. Also, polymer blocks differing in amount of vinyl bond can be produced in polymer blocks each having a conjugated diene compound as a main component, by adding the vinylating agent and a metal alkoxide mentioned later under two or more divided conditions.

Examples of the vinylating agent include, but are not limited to, ether compounds, ether-containing compounds having two or more oxygen atoms, and tertiary amine compounds.

Examples of the tertiary amine compounds include, but are not limited to, pyridine, N,N,N',N'-tetramethylethylenediamine, tributylamine, tetramethylpropanediamine, 1,2-dipiperidinoethane, and bis[2-(N,N-dimethylamino)ethyl] ether. These compounds may be used alone or may be used in combination of two or more. The tertiary amine compound is preferably a compound having two amines. Among others, a compound having a structure that exhibits symmetry in the molecule is more preferred, and N,N,N',N'-tetramethylethylenediamine, bis[2-(N,N-dimethylamino)ethyl] ether, or 1,2-dipiperidinoethane is further preferred.

In the present embodiment, the copolymerization for the hydrogenated block copolymer may be performed in the presence of the coexisting vinylating agent mentioned above, organolithium compound, and alkali metal alkoxide. In this context, the alkali metal alkoxide is a compound represented by the general formula MOR (wherein M is an alkali metal, and R is an alkyl group).

The alkali metal of the alkali metal alkoxide is preferably sodium or potassium from the viewpoint of a high amount of vinyl bond, a narrow molecular weight distribution, a high polymerization rate, and a high block content. The alkali metal alkoxide is not limited and is preferably sodium alkoxide, lithium alkoxide, or potassium alkoxide having an alkyl group having 2 to 12 carbon atoms, more preferably sodium alkoxide or potassium alkoxide having an alkyl group having 3 to 6 carbon atoms, further preferably sodium t-butoxide, sodium t-pentoxide, potassium t-butoxide, or potassium t-pentoxide. Among them, sodium t-butoxide or sodium t-pentoxide which is sodium alkoxide is still further preferred.

In the case of polymerizing in the presence of the coexisting vinylating agent, organolithium compound, and alkali metal alkoxide in the polymerization step for the hydrogenated block copolymer according to the present embodiment, the molar ratio of the vinylating agent to the organolithium compound (vinylating agent/organolithium compound) and the molar ratio of the alkali metal alkoxide to the organolithium compound (alkali metal alkoxide/organolithium compound) are preferably the following molar ratios for the coexistence:

vinylating agent/organolithium compound of 0.2 to 3.0, and alkali metal alkoxide/organolithium compound of 0.01 to 0.3.

The vinylating agent/organolithium compound molar ratio is preferably 0.2 or more from the viewpoint of a high amount of vinyl bond and a high polymerization rate and is preferably less than 3.0 from the viewpoint of obtaining a narrow molecular weight distribution and high hydrogenation activity. The alkali metal alkoxide/organolithium compound molar ratio is preferably 0.01 or more from the viewpoint of a high amount of vinyl bond, a high polymerization rate, and a high block content and is preferably 0.3 or less from the viewpoint of obtaining a narrow molecular weight distribution and high hydrogenation activity. This achieves improvement in polymerization rate and can increase the amount of vinyl bond of the hydrogenated block copolymer of interest. In addition, this can narrow a molecular weight distribution and further tends to improve a block content. As a result, performance to be imparted to a polypropylene resin composition, i.e., impact resistance, flexibility, transparency, and low stickiness tend to be further improved.

The vinylating agent/organolithium compound molar ratio in the polymerization step is preferably 0.8 or more from the viewpoint of a high amount of vinyl bond and a high polymerization rate, preferably 2.5 or less from the viewpoint of a narrow molecular weight distribution and high hydrogenation activity, and more preferably in the range of 1.0 or more and 2.0 or less.

The alkali metal alkoxide/organolithium compound molar ratio is preferably 0.02 or more from the viewpoint of a high amount of vinyl bond, a high polymerization rate, and a high block content, preferably 0.2 or less from the viewpoint of a narrow molecular weight distribution and high hydrogenation activity, more preferably 0.03 or more and 0.1 or less, further preferably 0.03 or more and 0.08 or less.

The alkali metal alkoxide/vinylating agent molar ratio is preferably 0.010 or more from the viewpoint of a high amount of vinyl bond, a high polymerization rate, and a high block content and is preferably 0.100 or less from the viewpoint of achieving a narrow molecular weight distribution and obtaining high hydrogenation activity. The alkali metal alkoxide/vinylating agent molar ratio is more preferably 0.012 or more and 0.080 or less, further preferably 0.015 or more and 0.06 or less, still further preferably 0.015 or more and 0.05 or less.

An inactivating agent for the vinylating agent can also be used as an approach of producing blocks differing in amount of vinyl bond in polymer blocks each having a conjugated diene compound as a main component. Examples of the inactivating agent include alkyl metal compounds. The inactivating agent is selected from alkyl aluminum, alkyl zinc, and alkyl magnesium having 1 to 20 carbon atoms per alkyl substituent, and mixtures thereof.

In the present embodiment, the hydrogenation method is not particularly limited. For example, the block copolymer obtained as described above can be hydrogenated by the supply of hydrogen in the presence of a hydrogenation catalyst to obtain a hydrogenated block copolymer having the hydrogenated double bond residues of conjugated diene compound units.

The hydrogenated block copolymer can be pelletized to produce pellets of the hydrogenated block copolymer. Examples of the pelletizing method include: a method of extruding the hydrogenated block copolymer into strands from a single-screw or twin-screw extruder, and cutting the strands in water using a rotating blade fitted in front of a die; a method of extruding the hydrogenated block copolymer into strands from a single-screw or twin-screw extruder, cooling the strands in water or in air, and then cutting the strands using a strand cutter; and a method of melt-mixing the hydrogenated block copolymer with an open roll or a Banbury mixer, then molding the hydrogenated block copolymer into a sheet using a roll, further cutting the sheet into strips, and then cutting the strips into cube-shaped pellets using a pelletizer. The molded body of the hydrogenated block copolymer pellets is not particularly limited by its size or shape.

The hydrogenated block copolymer, preferably, the pellets thereof, can be blended, if necessary, with a pellet blocking prevention agent for the purpose of preventing pellet blocking. Examples of the pellet blocking prevention agent include, but are not particularly limited to, calcium stearate, magnesium stearate, zinc stearate, polyethylene, polypropylene, ethylenebisstearamide, talc, and amorphous silica. Calcium stearate, polyethylene, or polypropylene is preferred from the viewpoint of the transparency of the resulting random polypropylene composition and a tube-shaped molded body or a sheet-shaped molded body comprising the same. The preferred amount thereof is 500 to 6000 ppm based on the hydrogenated block copolymer. The more preferred amount thereof is 1000 to 5000 ppm based on the hydrogenated block copolymer. The pellet blocking prevention agent is preferably blended in a state attached to pellet surface and may be contained to some extent in the inside of the pellets.

<Polypropylene Resin Composition>

The polypropylene resin composition of the present embodiment comprises 1 to 99 mass % of the hydrogenated block copolymer of the present embodiment and 1 to 99 mass % of a polypropylene resin.

The content of the hydrogenated block copolymer in the polypropylene resin composition is 99 mass % or less from the viewpoint of the impact resistance and low stickiness of a molded body of the resulting polypropylene resin composition and is 1 mass % or more from the viewpoint of the impact resistance, flexibility, and transparency of a molded body of the resulting polypropylene resin composition.

The content of the hydrogenated block copolymer in the polypropylene resin composition of the present embodiment is preferably 10 to 90 mass %, more preferably 20 to 80 mass %, further preferably 30 to 70 mass %, and the content of the polypropylene resin is preferably 10 to 90 mass %, more preferably 20 to 80 mass %, further preferably 30 to 70 mass %, from the viewpoint of the performance balance among the impact resistance, flexibility, and transparency of a molded body of the resulting polypropylene resin composition.

In the polypropylene resin composition of the present embodiment, the intensity ratio of diffraction peak intensity (I(14)) at a scattering angle (2θ) of 14° to diffraction peak intensity (I(15)) at a scattering angle (2θ) of 15°, I(14)/I(15), in wide angle X ray diffractometry is preferably 0.1 or more and less than 1.4, from the viewpoint of the flexibility and transparency of a molded body of the resulting polypropylene resin composition. From similar viewpoints, the intensity ratio is more preferably 0.1 to 1.35, further preferably 0.1 to 1.30. The intensity ratio can be measured by a method described in Examples mentioned later.

In this context, the peak intensity ratio is a value ascribable to the crystallinity of the polypropylene resin composition and can be controlled by, for example, the content of the polymer block (C) or the polymer block (S) in the hydrogenated block copolymer. As the contents of these polymer blocks are increased, the peak intensity ratio tends to be larger.

In the measurement of the polypropylene resin composition of the present embodiment or a molded body thereof by cross fractionation chromatography (hereinafter, also referred to as "CFC"), preferably, an integral elution volume at −20° C. or lower is 0.1% or more and less than 10% of the total volume, an integral elution volume in the range of higher than −20° C. and lower than 60° C. is 1% or more and less than 99% of the total volume, and an integral elution volume in the range of 60° C. or higher and 150° C. or lower is 1% or more and less than 99% of the total volume. The "total volume" means the total volume of the polypropylene resin composition or the molded body subjected to CFC measurement.

When the behavior described above is observed, the balance among the low temperature impact resistance, flexibility, transparency, and low stickiness of a molded body of the resulting polypropylene resin composition tends to be better.

From similar viewpoints, the integral elution volume of the components soluble at −20° C. or lower is more preferably 0.1% or more and less than 8%, further preferably 0.1% or more and less than 5%, of the total volume. The integral elution volume in the range of higher than −20° C. and lower than 60° C. is more preferably 5% or more and less than 95%, further preferably 10% or more and less than 90%, of the total volume. The integral elution volume in the range of 60° C. or higher and 150° C. or lower is more preferably 5% or more and less than 95%, further preferably 10% or more and less than 90%, of the total volume.

The CFC elution volumes can be controlled by, for example, the ratio of the polymer block (C), (B1), (B2), the blending ratio of the hydrogenated block copolymer (a), or the type of the polypropylene resin. The CFC elution volumes can be measured by a method described in Examples mentioned later.

Examples of the polypropylene resin include random polypropylene resins, homopolypropylene resins, and block polypropylene resins. The polypropylene resin is preferably a random polypropylene resin from the viewpoint of the flexibility and transparency of a molded body of the resulting polypropylene resin composition.

In this context, the term "random" for the random polypropylene means that propylene and monomers other than propylene are copolymerized so that the monomers other than propylene are randomly incorporated into the propylene chain so as not to substantially form a chain of the monomers other than propylene.

The random polypropylene is not particularly limited as long as the content of the propylene unit is less than 99 mass %. Preferred examples of the random polypropylene include random copolymers of propylene and ethylene, and random copolymers of propylene and α-olefins having 4 to 20 carbon atoms. In the case of using a random copolymer of propylene and ethylene or a random copolymer of propylene and an α-olefin having 4 to 20 carbon atoms as the random polypropylene, flexibility and transparency tend to be better.

Examples of the α-olefin include, but are not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. An α-olefin having 2 to 8 carbon atoms is preferred. Examples thereof include ethylene, 1-butene, 3-methyl-1-butene, 1-hexene, and 4-methyl-1-pentene. These α-olefins can be used alone or in combination of two or more. Also, the random polypropylene can also be used alone or in combination of two or more.

Among the random polypropylenes, at least one selected from the group consisting of a propylene-ethylene random copolymer, a propylene-1-butene random copolymer, and a propylene-ethylene-1-butene ternary random copolymer is more preferably used from the viewpoint of the flexibility, transparency, and impact resistance of the resulting random polypropylene composition and a sheet-shaped molded body comprising the same.

The random polypropylene is a random copolymer of propylene and ethylene or a random copolymer of propylene and an α-olefin having 4 to 12 carbon atoms, wherein the content of the ethylene or α-olefin unit in the random polypropylene is preferably more than 1 mass % and less than 40 mass %, and the content of the propylene unit is preferably 60 mass % or more and less than 99 mass %, from the viewpoint of flexibility, transparency, low stickiness, and impact resistance. From similar viewpoints, the content of the ethylene or α-olefin unit is more preferably more than 2 mass % and less than 30 mass %, further preferably 2.5 mass % or more and less than 25 mass %, still further preferably 3 mass % or more and less than 20 mass %. The content of the propylene unit is more preferably 70 mass % or more and less than 98 mass %, further preferably 75 mass % or more and less than 97.5 mass %, still further preferably 80 mass % or more and less than 97 mass %.

The melt flow rate (MFR; conforming to ISO 1133, 230° C.) of the random polypropylene is preferably 1 to 30 g/10 minutes, more preferably 1 to 25 g/10 minutes, further preferably 2 to 20 g/10 minutes, still further preferably 3 to 15 g/10 minutes, from the viewpoint of the workability, flexibility, transparency, and low stickiness of the resulting random polypropylene composition.

The catalyst for use in producing the random polypropylene is not particularly limited. For example, a polymerization method using a stereoregular catalyst is preferred. Examples of the stereoregular catalyst include, but are not limited to, Ziegler catalysts and metallocene catalysts. Among these catalysts, a metallocene catalyst is preferred from the viewpoint of the impact resistance, flexibility, transparency, and low stickiness of the resulting random polypropylene composition and a sheet-shaped molded body comprising the same.

The molecular weight distribution (Mw/Mn) of the random polypropylene is preferably 3.5 or less from the viewpoint of the impact resistance, flexibility, transparency, and low stickiness of the resulting random polypropylene composition and a sheet-shaped molded body comprising the same. The Mw/Mn is more preferably 3.0 or less, further preferably 2.8 or less. The lower limit is not particularly limited and is preferably 1.5 or more. Particularly preferably, the random polypropylene is obtained by polymerization using a metallocene catalyst, and its molecular weight distribution (Mw/Mn) is 1.5 or more and 3.5 or less. The molecular weight distribution of the random polypropylene is determined from the ratio of a weight average molecular weight (Mw) to a number average molecular weight (Mn) obtained by GPC measurement.

The polypropylene resin composition of the present embodiment may additionally contain other additives according to the required performance. Examples of the additives include, but are not particularly limited to, flame retardants, stabilizers, coloring agents, pigments, antioxidants, antistatic agents, dispersing agents, flow enhancing agents, mold release agents such as stearic acid metal salts, silicone oils, mineral oil softening agents, synthetic resin softening agents, copper inhibitors, cross-linking agents, and nucleating agents.

<Method for Producing Polypropylene Resin Composition>

The polypropylene resin composition of the present embodiment can be produced by, for example, a method of dry-blending the hydrogenated block copolymer of the present embodiment, polypropylene, and other components to be optionally added according to the compositional ratio of each component, or a preparation method using an apparatus that is subjected to the usual mixing of polymer materials, though the production method is not limited thereto.

In this respect, examples of the mixing apparatus that may be used include, but are not particularly limited to, kneading apparatuses such as Banbury mixers, Labo Plastomill, single-screw extruders, and twin-screw extruders. Production by a melt mixing method using an extruder is preferred from productivity and good kneadability. The melting temperature for kneading can be appropriately set and is usually in the range of 130 to 300° C., preferably in the range of 150 to 250° C.

<Molded Body>

The molded body of the present embodiment comprises the hydrogenated block copolymer of the present embodiment or the polypropylene resin composition of the present embodiment. Examples of the molded body can include, but are not limited to, sheets, films, bags, tubes, medical molded bodies, for example, medical tubes, medical films, and medical infusion bags, and packaging materials, for example, food packaging materials and apparel packaging materials. The molded body mentioned above may be configured as a single layer or may be configured as multiple layers.

Medical plastic containers can be broadly classified according to production methods into two types: (I) bottle type which is prepared by vacuum molding or blow molding; and (II) bag type which is prepared by the heat sealing of flexible films obtained by an inflation or T-die casting method.

The bag type is a four-sided seal bag, and, usually, an accessory such as a tube or a connector is also attached thereto by heating sealing.

The bottle type has advantages such as (1) excellent stability of sealed portions, (2) high safety against leakage, (3) excellent strength against dropping or vibration during a distribution process, (4) rigidity to some extent, and (5) excellent usability upon packing or use. On the other hand, the bottle type has the disadvantages that (1) flexibility in the choice of a resin material is small in terms of processing suitability, workability, etc., (2) a mold is required, and a volume is relatively difficult to change, (3) uneven thickness cannot be avoided, and (4) cost is high due to expensive production facilities. By contrast, the bag type has such high flexibility in the choice of a material that various materials such as single films, coextruded films, and laminate films can be used, and a laminated multi-layer film can be used according to required properties. Also, the bag type has an easy-to-change volume or form and requires low cost, as compared with the bottle type. However, the bag type has the disadvantage that many factors cause pinholes or cracks at the edges of heat-sealed portions, as compared with the bottle type. In general, a container packed with a liquid undergoes fatigue failure caused by repetitive bending resulting from the fluctuation of the liquid by vibration or impact during transport, and is thus susceptible to pinholes or cracks at the edges of heat-sealed portions. In order to suppress the fluctuation of contents, the bottle type can be brought into close contact with the inner surface of a cardboard box by providing a close fit of the outside dimension of the container to the inside dimension of the cardboard box, whereas it is difficult for the bag type to accurately provide a close fit to the inside dimension of the cardboard box due to the presence of sealed portions. A box containing the container of bag type is apt to breakage from sealed portions of the bag at a sufficiently conceivable low temperature (e.g., 4° C.) during a distribution process or at the time of transport in a cold region.

Medical liquid packaging containers, for example, infusion bags, made of glass are used in addition to plastic ones. The glass infusion bags are disadvantageously heavier than the plastic ones and apt to splinter due to impact, dropping, or the like during working or transport. Therefore, the plastic infusion bags are used in place of the glass infusion bags. Infusion bags made of soft vinyl chloride resins and infusion bags made of polyolefins such as polyethylene and polypropylene are used as the plastic infusion bags. A drug solution injected in an infusion bag is generally sterilized by a method such as steam sterilization or autoclave sterilization after hermetical sealing, then transported, and used. The infusion bags made of soft vinyl chloride resins contain a large amount of a plasticizer for conferring flexibility and might therefore dissolve the plasticizer into the infusion solution depending on the type of the infusion solution or present the problem of toxic gases generated during incineration. The infusion bags made of polyolefins such as polyethylene and polypropylene, which are free from a plasticizer, are preferred from a safety standpoint. However, the infusion bags made of polyolefins are not sufficiently handleable because of their low flexibility or transparency and insufficient impact resistance. The bags may be not only transported in the low temperature environment mentioned above but refrigerated for a long period in order to maintain efficacy without decomposing intrabag drug solutions, and therefore must also possess impact resistance at low temperatures. In addition, the infusion bags also include bags of double chamber type which are provided with two or more liquid reservoirs, wherein a sealed portion which partitions the reservoirs is opened immediately before use so that the liquids contained therein are mixed, and bags of type for use in peritoneal dialysis. These types of infusion bags tend to be capacious (2 L or larger) because the amount of the drug solution contained therein is larger than that of conventional infusion bags. Accordingly, there is a demand for higher impact resistance of the bags.

In light of such utilization forms of medical containers, the present inventors have conceived the resin composition of the present embodiment with the aim of (1) preventing the rupture at low temperatures of a container of bag type processed therefrom and (2) preventing the rupture of an infusion bag of double chamber type or a capacious infusion bag processed therefrom. A container of bag type comprising the resin composition comprising the hydrogenated block copolymer of the present embodiment can not only overcome the major disadvantage of conventional bag type, i.e., the occurrence of pinholes or cracks in heat-sealed portions ascribable to bending fatigue at low temperatures but can be suitably used in capacious (e.g., 2 L) liquid-packed bag containers without being broken in a low temperature environment, which has heretofore been difficult to achieve.

The containers mentioned above can be used as containers for various applications packed with liquids such as pharmaceutical products as well as food (including frozen food), drink, and retort food such as mineral water, soft drink, ice cream, soy sauce, and seasonings, pesticides, developing solutions, creams for business use, and chemicals such as toiletry products.

<Sheet and Film>

The method for producing the sheet of the present embodiment is not particularly limited. For example, a T-die method or an inflation method can be adopted as an extrusion molding method of charging the polypropylene resin composition into an extruder. For example, usual air-cooling inflation molding, air-cooling two-stage inflation molding, high-speed inflation molding, or water-cooling inflation molding can be adopted as the inflation molding. Also, a blow molding method such as direct blow or injection blow, or a press molding method can be adopted. A single-screw or multiple-screw extruder can be used as the extruder. Also, a multi-layer sheet can be formed by multi-layer extrusion using a plurality of extruders. Alternatively, the polypropylene resin composition may be molded directly into a sheet from the extruder used for producing the polypropylene resin composition.

In general, a sheet-shaped molded body having a thickness of 0.005 mm or larger and smaller than 0.2 mm is referred to as a film, and a sheet-shaped molded body having a thickness of 0.2 mm or larger and 50 mm or smaller is referred to as a sheet. In the specification of the present application, the "sheet" encompasses the film and the sheet. The thickness of the sheet of the present embodiment is not particularly limited and is preferably in the range of 0.005 mm to 0.5 mm, more preferably 0.01 mm to 0.3 mm, from the viewpoint of moldability, flexibility, etc.

<Multi-Layer Film>

The multi-layer film of the present embodiment has at least two layers. The film of the present embodiment contains a polypropylene resin and the hydrogenated block copolymer (a) in at least one layer. The multi-layer film configured as described below is excellent in flexibility, transparency, low stickiness, impact resistance, and the balance among these properties.

(Hydrogenated Block Copolymer (b1))

The multi-layer film of the present embodiment may contain a hydrogenated block copolymer (b1) (provided that the hydrogenated block copolymer (b1) is a hydrogenated block copolymer other than the hydrogenated block copolymer (a)) in at least one layer.

The hydrogenated block copolymer (b1) comprises a polymer block (C-1) having a conjugated diene compound as a main component, a polymer block (B-1) having a conjugated diene compound as a main component (hereinafter, referred to as a polymer block (B-1)), and a polymer block (S-1) having a vinyl aromatic compound as a main component (hereinafter, referred to as a polymer block (S-1)).

In the hydrogenated block copolymer (b1), the content of the polymer block (C-1) having a conjugated diene compound as a main component is 0 to 15 mass %, the content of the polymer block (B-1) is 75 to 97 mass %, and the content of the polymer block (S-1) is 3 to 25 mass %.

The amount of vinyl bond before hydrogenation of the polymer block (C-1) having a conjugated diene compound as a main component is 1 to 25 mol %, and the amount of vinyl bond before hydrogenation of the polymer block (B-1) is 40 to 100 mol %.

The degree of hydrogenation of the hydrogenated block copolymer (b1) is 80 mol % or more.

For the hydrogenated block copolymer (b1), the phrase "having . . . as a main component", the respective materials of the conjugated diene compound and the vinyl aromatic compound, the amount of vinyl bond, and the degree of hydrogenation can be defined in the same way as in the hydrogenated block copolymer (a) mentioned above.

(Method for Producing Hydrogenated Block Copolymer (b1))

The hydrogenated block copolymer (b1) can be produced in the same way as the method for producing the hydrogenated block copolymer (a) mentioned above.

Specifically, the content of each polymer block, the amount of vinyl bond, the degree of hydrogenation, etc. can be controlled under the same conditions using the same monomers as in the hydrogenated block copolymer (a).

(Structural Example of Hydrogenated Block Copolymer (b1))

Examples of the hydrogenated block copolymer (b1) mentioned above include those having structures represented by the following general formulas:

$$((C\text{-}1)\text{-}(B\text{-}1))_n\text{-}(S\text{-}1)$$

$$((C\text{-}1)\text{-}(B\text{-}1))_n\text{-}(S\text{-}1)\text{-}(B3)$$

$$((C\text{-}1)\text{-}(B\text{-}1)\text{-}(S\text{-}1))_n$$

$$((C\text{-}1)\text{-}(B\text{-}1)\text{-}(S\text{-}1))_n\text{-}(B3)$$

$$((C\text{-}1)\text{-}(B\text{-}1)\text{-}(S\text{-}1)\text{-}(B3))_n$$

$$((C\text{-}1)\text{-}(B\text{-}1)\text{-}(S\text{-}1))_m\text{-}X$$

$$((C\text{-}1)\text{-}(B\text{-}1)\text{-}(S\text{-}1)\text{-}(B3))_m\text{-}X$$

$$((S\text{-}1)\text{-}(B\text{-}1))_n\text{-}(S\text{-}1)$$

$$((S\text{-}1)\text{-}(B\text{-}1))_n\text{-}(S\text{-}1)\text{-}(B3)$$

$$((S\text{-}1)\text{-}(B\text{-}1)\text{-}(S\text{-}1))_n$$

$$((S\text{-}1)\text{-}(B\text{-}1)\text{-}(S\text{-}1))_n\text{-}(B3)$$

$$((S\text{-}1)\text{-}(B\text{-}1)\text{-}(S\text{-}1)\text{-}(B3))_n$$

$$((S\text{-}1)\text{-}(B\text{-}1)\text{-}(S\text{-}1))_m\text{-}X$$

In these general formulas, (C-1), (B-1), (S-1), and (B3) represent the polymer blocks (C-1), (B-1), and (S-1), and the same polymer block (B3) as in the hydrogenated block copolymer (a), respectively. When there are a plurality of polymer blocks (C-1), (B-1), (S-1), or (B3), these polymer blocks may be different from or the same as each other. The boundary between the polymer blocks is not necessarily required to be clearly defined. n is an integer of 1 or larger and is preferably an integer of 1 to 3. m represents an integer of 2 or larger and is preferably an integer of 2 to 6. X represents a residue of a coupling agent or a residue of a polyfunctional initiator.

Particularly, a polymer represented by the structural formula (C-1)-(B-1)-(S-1), (C-1)-(B-1)-(S-1)-(B3), (S-1)-(B-1)-(S-1), or (S-1)-(B-1)-(S-1)-(B3) is preferred.

In this respect, the residue of the coupling agent means a residue after coupling by a coupling agent for use in coupling a plurality of copolymers of conjugated diene compound monomer units and vinyl aromatic hydrocarbon compound monomer units.

Examples of the coupling agent include bifunctional coupling agents and polyfunctional coupling agents.

Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (C-1), (B-1), or (S-1) may be uniformly distributed or may be distributed in a tapered pattern. When the polymer block (C-1), (B-1), or (S-1) forms a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

The multi-layer film of the present embodiment may be configured to have a predetermined intermediate layer between a predetermined outer layer and inner layer. In this case, preferably, the outer layer comprises polypropylene resin P1, the intermediate layer comprises polypropylene resin P2 and the hydrogenated block copolymer (a), and the inner layer comprises polypropylene resin P3 and/or a polyethylene resin. In this context, the polypropylene resins P1 to P3 may be different from each other or may be the same.

The thickness of the outer layer is preferably 5 to 50 µm, the thickness of the intermediate layer is preferably 100 to 200 µm, and the thickness of the inner layer is preferably 5 to 50 µm.

The multi-layer film configured as described above is excellent in transparency, flexibility, low stickiness, and impact resistance.

The thickness of the outer layer is more preferably 10 to 40 µm, further preferably 15 to 35 µm.

The thickness of the intermediate layer is more preferably 110 to 190 µm, further preferably 120 to 180 µm.

The thickness of the inner layer is more preferably 10 to 45 µm, further preferably 15 to 40 µm.

The multi-layer film of the present embodiment can have at least an outer layer, an intermediate layer, and an inner layer, as mentioned above.

When the multi-layer film of the present embodiment has at least three layers, i.e., an outer layer, an intermediate layer, and an inner layer, the multi-layer film of the present embodiment is particularly preferably configured as described below.

The content of the polypropylene resin P1 in the outer layer is preferably 60 to 100 mass %, more preferably 65 to 100 mass %, further preferably 70 to 100 mass %.

The outer layer may comprise the hydrogenated block copolymer (a). In this case, the content of the hydrogenated block copolymer (a) in the outer layer is preferably 0 to 40 mass %, more preferably 0 to 35 mass %, further preferably 0 to 30 mass %.

The content of the polypropylene resin P2 in the intermediate layer is preferably 30 to 90 mass %, more preferably 35 to 85 mass %, further preferably 40 to 80 mass %.

The content of the hydrogenated block copolymer (a) in the intermediate layer is preferably 10 to 70 mass %, more preferably 15 to 65 mass %, further preferably 20 to 60 mass %.

The content of the polypropylene resin P3 and/or the polyethylene resin in the inner layer is preferably 50 to 95 mass %, more preferably 55 to 90 mass %, further preferably 60 to 85 mass %.

The inner layer may comprise the hydrogenated block copolymer (a). In this case, the content of the hydrogenated block copolymer (a) in the inner layer is preferably 5 to 50 mass %, more preferably 10 to 45 mass %, further preferably 15 to 40 mass %.

The multi-layer film having the configuration described above is excellent in transparency, flexibility, low stickiness, impact resistance, and the balance among these properties.

In the multi-layer film of the present embodiment, the outer layer may comprise the hydrogenated block copolymer (a) and/or a hydrogenated block copolymer (b1) (provided that the hydrogenated block copolymer (b1) is a hydrogenated block copolymer other than the hydrogenated block copolymer (a)). The content of the polypropylene resin in the outer layer is preferably 60 to 100 mass %, and the content of the hydrogenated block copolymer (a) and/or the hydrogenated block copolymer (b1) in the outer layer is preferably 0 to 40 mass %.

The multi-layer film configured as described above is excellent in flexibility, transparency, impact resistance, low stickiness, and the balance among these properties.

From the viewpoint described above, the content of the polypropylene resin P1 in the outer layer is more preferably 65 to 100 mass %, further preferably 70 to 100 mass %.

The content of the hydrogenated block copolymer (a) and/or the hydrogenated block copolymer (b1) in the outer layer is more preferably 0 to 35 mass %, further preferably 0 to 30 mass %.

In the multi-layer film of the present embodiment, the intermediate layer may comprise the hydrogenated block copolymer (a) and/or the hydrogenated block copolymer (b1). The content of the polypropylene resin P2 in the intermediate layer is preferably 30 to 90 mass %, and the content of the hydrogenated block copolymer (a) and/or the hydrogenated block copolymer (b1) in the intermediate layer is preferably 10 to 70 mass %.

The multi-layer film configured as described above is excellent in flexibility, transparency, impact resistance, low stickiness, and the balance among these properties.

From the viewpoint described above, the content of the polypropylene resin P2 in the intermediate layer is more preferably 35 to 85 mass %, further preferably 40 to 80 mass %. The content of the hydrogenated block copolymer (a) and/or the hydrogenated block copolymer (b1) in the intermediate layer is more preferably 15 to 65 mass %, further preferably 20 to 60 mass %.

In the multi-layer film of the present embodiment, the inner layer may comprise the hydrogenated block copolymer (a) and/or the hydrogenated block copolymer (b1). The content of the polypropylene resin and/or the polyethylene resin in the inner layer is preferably 50 to 95 mass %, and the content of the hydrogenated block copolymer (a) and/or the hydrogenated block copolymer (b1) in the inner layer is preferably 5 to 50 mass %.

The multi-layer film configured as described above is excellent in flexibility, transparency, impact resistance, low stickiness, and the balance among these properties.

From the viewpoint described above, the content of the polypropylene resin P3 and/or the polyethylene resin in the inner layer is more preferably 55 to 95 mass %, further preferably 60 to 85 mass %. The content of the hydrogenated block copolymer (a) and/or the hydrogenated block copolymer (b1) in the inner layer is more preferably 10 to 45 mass %, further preferably 15 to 40 mass %.

In the measurement of the multi-layer film of the present embodiment by cross fractionation chromatography (hereinafter, referred to as "CFC"), preferably, an integral elution volume at −20° C. or lower is 0.1% or more and less than 75% of the total volume, an integral elution volume in the range of higher than −20° C. and lower than 60° C. is 5% or more and less than 80% of the total volume, and an integral elution volume in the range of 60° C. or higher and 150° C. or lower is 20% or more and less than 95% of the total volume.

The multi-layer film configured as described above is excellent in flexibility, transparency, low stickiness, impact resistance, and the balance among these properties.

From similar viewpoints, the integral elution volume at −20° C. or lower is more preferably 2% or more and less than 70%, further preferably 3% or more and less than 65%, of the total volume.

The integral elution volume in the range of higher than −20° C. and lower than 60° C. is more preferably 10% or more and less than 75%, further preferably 15% or more and less than 70%, of the total volume.

The integral elution volume in the range of 60° C. or higher and 150° C. or lower is more preferably 25% or more and less than 90%, further preferably 30% or more and less than 85%, of the total volume.

The CFC elution volumes can be controlled by, for example, the ratio of the polymer block (C), (B1), or (B2), the blending ratio of the hydrogenated block copolymer (a), or the types of the polypropylene resin and the polyethylene resin. The CFC elution volumes can be measured by a method described in Examples mentioned later.

The resin material forming each layer of the multi-layer film of the present embodiment can be produced by, for example, a method of appropriately selecting the hydrogenated block copolymer (a), the polypropylene resin, the polyethylene resin, the hydrogenated block copolymer (b1), and other optional components to be added, and dry-blending these components, or a method of preparing the material using a usual apparatus for the mixing of polymer substances.

The polypropylene resin is not particularly limited as long as the content of a non-propylene structural unit is preferably less than 50 mol %. A known polypropylene resin can be used. Examples of the non-propylene structural unit include structural units derived from ethylene, structural units derived from α-olefins such as 1-butene, 1-hexene, 1-heptene, 1-octene, 4-methyl-1-pentene, 1-nonene, and 1-decene as well as structural units derived from modifying agents mentioned later.

Examples of the polypropylene resin include homopolypropylene, propylene-ethylene random copolymers, propylene-ethylene block copolymers, propylene-butene random copolymers, propylene-ethylene-butene random copolymers, propylene-pentene random copolymers, propylene-hexene random copolymers, propylene-octene random copolymers, propylene-ethylene-pentene random copolymers, and propylene-ethylene-hexene random copolymers. Alternatively, modified polypropylene resins of these polypropylene resins graft-copolymerized with modifying agents including: unsaturated monocarboxylic acids such as acrylic acid, methacrylic acid, and crotonic acid; unsaturated dicarboxylic acids such as maleic acid, citraconic acid, and itaconic acid; esters, amides, or imides of these unsaturated monocarboxylic acids or unsaturated dicarboxylic acids; and unsaturated dicarboxylic anhydrides such as maleic anhydride, citraconic anhydride, and itaconic anhydride, may be used. An unmodified polypropylene resin is preferred.

Among them, the polypropylene resin is preferably homopolypropylene, a propylene-ethylene random copolymer, or a propylene-ethylene block copolymer, more preferably homopolypropylene or a propylene-ethylene random copolymer, further preferably a propylene-ethylene random copolymer, from the viewpoint of relatively inexpensive and easy availability. The polypropylene resin may be used alone or in combination of two or more. The polypropylene resin may be obtained by a routine method using any polymerization catalyst selected from Ziegler catalysts, vanadium catalysts, and metallocene catalysts. Alternatively, a commercially available product can be used. For example, a suitable polypropylene resin selected from "Novatec PP" (trade name) series manufactured by Japan Polypropylene Corp. as product examples using Ziegler catalysts and "WINTEC" (trade name) series manufactured by Japan Polypropylene Corp. as product examples using metallocene catalysts can be used as the commercially available product. The melt flow rate (MFR) of the polypropylene resin is not particularly limited. Usually, MFR is preferably 0.03 to 40 g/10 minutes, more preferably 0.3 to 20 g/10 minutes. When MFR falls within the range described above, film formation by, for example, melt extrusion molding or inflation molding can secure sufficient productivity because back pressure during processing is not too high. MFR is measured according to JIS K7210 under conditions involving a temperature of 230° C. and a load of 2.16 kg.

(Outer Layer)

The polypropylene resin for use in the outer layer preferably has a content of a unit other than the propylene monomer unit, of less than 50 mol %. The content of the unit other than the propylene monomer unit is preferably less than 30 mol %, more preferably less than 20 mol %, further preferably less than 10 mol %, for preventing the uneven thickness of the film upon heat sealing and attaining excellent strength. Among others, the polypropylene resin is preferably homopolypropylene, a propylene-ethylene random copolymer, or a propylene-ethylene block copolymer, more preferably homopolypropylene or a propylene-ethylene random copolymer, further preferably homopolypropylene, from the viewpoint of relatively inexpensive and easy availability.

(Intermediate Layer and Inner Layer)

The polypropylene resin for use in the intermediate layer and the inner layer preferably has a content of a unit other than the propylene monomer unit, of 0.1 to 50 mol %. The content of the unit other than the propylene monomer unit is preferably 5 to 45 mol %, more preferably 8 to 40 mol %, further preferably 10 to 35 mol %, from the viewpoint of the heat sealability, transparency, flexibility, and low temperature impact resistance of the multi-layer film. Among others, the polypropylene resin is preferably a propylene-ethylene random copolymer or a propylene-ethylene block copolymer, more preferably a propylene-ethylene random copolymer, from the viewpoint of relatively inexpensive and easy availability. For example, a known production method described in, for example, Japanese Patent Laid-Open No. 2005-132992 is known as a method for producing the propylene-ethylene random copolymer.

Examples of commercially available products of such a propylene-ethylene random copolymer include propylene-ethylene random copolymers of "WELNEX" series manufactured by Japan Polypropylene Corp. These copolymers are soft polypropylenes, also called reactor-blended thermoplastic olefinic elastomers (R-TPO), which are obtained using metallocene catalysts. R-TPO is reportedly excellent in the balance among various performance such as workability, flexibility, and impact resistance because soft components are fine and uniformly dispersed as compared with compound type or cross-linked type soft resins of polypropylene kneaded with an amorphous elastomer. Examples thereof include NEWCON manufactured by Japan Polypropylene Corp., Prime TPO manufactured by Prime Polymer Co., Ltd., and Catalloy and QUALEAR manufactured by SunAllomer Ltd., in addition to WELNEX manufactured by Japan Polypropylene Corp. A suitable one selected from these commercially available products can be used. In the inner layer, a polyethylene resin may be used instead of the polypropylene resin. The polyethylene resin is excellent in low temperature impact resistance and flexibility, while the polypropylene resin is excellent in heat resistance and strength. Therefore, the polyethylene resin and the polypropylene resin may be appropriately blended according to the desired physical properties. Examples of the polyethylene resin used in the present invention include low density polyethylene, linear low density polyethylene, linear ultralow density polyethylene, medium density polyethylene, high density polyethylene, and copolymers having ethylene as a main component, i.e., copolymers and multicomponent copolymers of ethylene with one or two or more comonomers selected from: α-olefins having 3 to 10 carbon atoms, such as propylene, butene-1, pentene-1, hexene-1, heptene-1, and octene-1; vinyl esters such as vinyl acetate and vinyl propionate; unsaturated carboxylic acid esters such as methyl acrylate, ethyl acrylate, methyl methacrylate, and ethyl methacrylate; and unsaturated compounds such as conjugated diene and non-conjugated diene, and mixed compositions of these copolymers and multicomponent copolymers. The content of the ethylene unit in the ethylene polymer is usually more than 50 mass %. The polyethylene resin is preferably at least one polyethylene resin selected from among low density polyethylene, linear low density polyethylene, and high density polyethylene, more preferably high density polyethylene. The polyethylene resin may be used alone or in combination of two or more. Examples of the method for producing the polyethylene resin include, but are not particularly limited to, known polymerization methods using known catalysts for olefin polymerization, for example, polymerization methods using multi-site catalysts typified by Ziegler-Natta catalysts, or single-site catalysts typified by metallocene catalysts. The polymerization method for the polyethylene resin includes one-stage polymerization, two-stage polymerization, and three- or more multi-stage polymerization, etc. A polyethylene resin produced by any of these methods can be used. The melt flow rate (MFR) of the polyethylene resin is not particularly limited. Usually, MFR is preferably 0.03 to 30 g/10 minutes, more preferably 0.3 to 15 g/10 minutes. When MFR falls within the range described above, film formation by, for example, melt extrusion molding or inflation molding can secure sufficient productivity because back pressure during processing is not too high. MFR is measured according to JIS K7210 under conditions involving a temperature of 190° C. and a load of 2.16 kg. Examples of the polyethylene resin include Novatec, Novatec LL, Novatec HD, Karnel, and Hermorex (manufactured by Japan Polyethylene Corp.), Suntec and CREOLEX (manufactured by Asahi Kasei Chemicals Corp.), Neo-Zex and Evolue (manufactured by Prime Polymer Co., Ltd.), SUMIKACENE (manufactured by Sumitomo Chemical Co., Ltd.), Petrocene and Nipolon (manufactured by Tosoh Corp.), and Umerit (Ube-Maruzen Polyethylene Co., Ltd.). A suitable one selected from these commercially available products can be used.

Examples of the mixing apparatus include, but are not particularly limited to, kneading apparatuses such as Banbury mixers, kneaders, Labo Plastomill, single-screw extruders, and twin-screw extruders. Production by a melt mixing method using an extruder is preferred from productivity and good kneadability.

The melting temperature for kneading can be appropriately set and is usually in the range of 130 to 300° C., preferably in the range of 150 to 250° C.

The method for producing the multi-layer film of the present embodiment is not particularly limited. For example, a T-die method or an inflation method can be adopted as an extrusion molding method of charging the resin composition into an extruder.

For example, usual air-cooling inflation molding, air-cooling two-stage inflation molding, high-speed inflation molding, or water-cooling inflation molding can be adopted as the inflation molding.

Also, a blow molding method such as direct blow or injection blow, or a press molding method can be adopted. A single-screw or multiple-screw extruder can be used as the extruder. Also, the multi-layer film can be formed by multi-layer extrusion using a plurality of extruders.

Alternatively, the resin composition may be molded directly into a film from the extruder used for producing the resin composition.

The bag refers to a pouched molded body that can be formed from the sheet of the present embodiment. Examples of the bag include bags for food packaging, bags for apparel packaging, medical bags, for example, medical infusion bags, and bags for chemical packaging.

The multi-layer film of the present embodiment is excellent in transparency, flexibility, low stickiness, and impact resistance, and the balance among these properties, as shown in Examples mentioned later.

By exploiting these properties, the multi-layer film of the present embodiment can be used as, for example, various apparel packages, various food packages, household sundries packages, industrial material packages, laminates for various rubber products, resin products, leather products, and the like, elastic tapes for use in paper diapers and the like, industrial products such as dicing films, protective films for use in the protection of building materials or steel plates, substrates for tacky films, trays for meat and fish, packs for vegetables and fruits, sheet products such as frozen food containers, applications for home appliances such as televisions, stereos, and cleaners, applications for automobile interior or exterior parts such as bumper parts, body panels, and side seals, road paving materials, waterproof materials, water-shielding sheets, packings for civil engineering, daily goods, leisure goods, toys and games, industrial products, furniture supplies, stationery products such as writing utensils, clear pockets, folders, and file spines, and medical supplies such as transfusion bags.

Particularly, the multi-layer film of the present embodiment can be suitably used as medical films and packaging materials, for example, food packaging materials and apparel packaging materials.

<Molding of Tube>

The molded body of the present embodiment can be obtained by a molding method mentioned below. The molding method, for example, for a tube, is not particularly limited. For example, the hydrogenated block copolymer is charged into an extruder and molten, and the resultant can be tubulated through a die and cooled in water or in air to prepare a tube. A single-screw or multiple-screw extruder can be used as the extruder. Also, a multi-layer tube can be formed by multi-layer extrusion using a plurality of extruders. Alternatively, the polypropylene resin composition may be molded directly into a tube from the extruder used for producing the hydrogenated block copolymer.

The shape of the tube is not particularly limited. For example, a round or oval tube is usually used. The diameter of the tube is not particularly limited and is, for example, preferably, 1 to 50 mm, more preferably 2 to 30 mm, further preferably 3 to 20 mm, in terms of outside diameter. The thickness of the tube is preferably 0.3 to 30 mm, more preferably 0.4 to 20 mm, further preferably 0.5 to 10 mm.

The tube obtained as described above may be prepared as a multi-layer tube by laminating an additional polymer without inhibiting the purpose of the present embodiment. The polymer can be used alone or in combination of two or more as a single layer or as a multi-layer laminate that may differ in type among the layers. The layer consisting of the polymer in the tube having such a multi-layer structure may be positioned as an innermost layer, an intermediate layer, or an outermost layer according to the desired performance to be imparted. In the present embodiment, the hydrogenated block copolymer may be prepared as a resin composition with polypropylene, and this polypropylene resin composition can be prepared into a tube. In the present embodiment, a reinforcing yarn braid or a helical reinforcing body can be wrapped around the tube and prepared as a pressure-resistant tube (hose) in order to improve pressure resistance, etc. while maintaining flexibility by suppressing increase in thickness. The reinforcing yarn braid is disposed in the inside or between layers in the thickness direction, and can employ vinylon, polyamide, polyester, aramide fiber, carbon fiber, metal wire, or the like. The helical reinforcing body is disposed at the outer circumference and can employ a metal, a plastic, or the like.

[Tube]

The tube of the present embodiment has a layer comprising the hydrogenated block copolymer (a) and a polypropylene resin. In this context, the tube refers to an article having a hollow tubulated structure and includes both of a tube having a single-layer structure and a tube having a two-layer or more multi-layer structure, as a cross sectional structure. In the present embodiment, the content of the hydrogenated block copolymer is preferably 40 to 95 mass %, and the content of the polypropylene resin is preferably 5 to 60 mass %.

(Hydrogenated Block Copolymer (a2))

The tube of the present embodiment may contain a hydrogenated block copolymer (a2) (provided that the hydrogenated block copolymer (a2) is a hydrogenated block copolymer other than the hydrogenated block copolymer (a)) in at least one layer.

The hydrogenated block copolymer (a2) comprises a polymer block (C-2) having a conjugated diene compound as a main component (hereinafter, referred to as a polymer block (C-2)), a polymer block (B-2) having a conjugated diene compound as a main component (hereinafter, referred to as a polymer block (B-2)), and a polymer block (S-2) having a vinyl aromatic compound as a main component (hereinafter, referred to as a polymer block (S-2)).

In the hydrogenated block copolymer (a2), the content of the polymer block (C-2) is 0 to 15 mass %, the content of the polymer block (B-2) is 75 to 97 mass %, and the content of the polymer block (S-2) is 3 to 25 mass %.

The amount of vinyl bond before hydrogenation of the polymer block (C-2) is 1 to 25 mol %, and the amount of vinyl bond before hydrogenation of the polymer block (B-2) is 40 to 100 mol %.

The degree of hydrogenation of the hydrogenated block copolymer (a2) is 80 mol % or more.

For the hydrogenated block copolymer (a2), the phrase "having . . . as a main component", the respective materials of the conjugated diene compound and the vinyl aromatic compound, the amount of vinyl bond, and the degree of hydrogenation can be defined in the same way as in the hydrogenated block copolymer (a1) mentioned above.

(Method for Producing Hydrogenated Block Copolymer (a2))

The hydrogenated block copolymer (a2) can be produced in the same way as the method for producing the hydrogenated block copolymer (a) mentioned above.

Specifically, the content of each polymer block, the amount of vinyl bond, the degree of hydrogenation, etc. can be controlled under the same conditions using the same monomers as in the hydrogenated block copolymer (a).

(Structural Example of Hydrogenated Block Copolymer (a2))

Examples of the hydrogenated block copolymer (a2) mentioned above include those having structures represented by the following general formulas:

$((C\text{-}2)\text{-}(B\text{-}2))_n\text{-}(S\text{-}2)$ $((C\text{-}2)\text{-}(B\text{-}2))_n\text{-}(S\text{-}2)\text{-}(B3)$ $((C\text{-}2)\text{-}(B\text{-}2)\text{-}(S\text{-}2))_n$ $((C\text{-}2)\text{-}(B\text{-}2)\text{-}(S\text{-}2))_n\text{-}(B3)$ $((C\text{-}2)\text{-}(B\text{-}2)\text{-}(S\text{-}2)\text{-}(B3))_n$ $((C\text{-}2)\text{-}(B\text{-}2)\text{-}(S\text{-}2))_m\text{-}X$ $((C\text{-}2)\text{-}(B\text{-}2)\text{-}(S\text{-}2)\text{-}(B3))_m\text{-}X$ $((S\text{-}2)\text{-}(B\text{-}2))_n\text{-}(S\text{-}2)$ $((S\text{-}2)\text{-}(B\text{-}2))_n\text{-}(S\text{-}2)\text{-}(B3)$ $((S\text{-}2)\text{-}(B\text{-}2)\text{-}(S\text{-}2))_n$ $((S\text{-}2)\text{-}(B\text{-}2)\text{-}(S\text{-}2))_n\text{-}(B3)$ $((S\text{-}2)\text{-}(B\text{-}2)\text{-}(S\text{-}2)\text{-}(B3))_n$ $((S\text{-}2)\text{-}(B\text{-}2)\text{-}(S\text{-}2))_m\text{-}X$ In these general formulas, (C-2), (B-2), (S-2), and (B3) represent the polymer blocks (C-2), (B-2), and (S-2), and the same polymer block (B3) as in the hydrogenated block copolymer (a), respectively. When there are a plurality of polymer blocks (C-2), (B-2), (S-2), or (B3), these polymer blocks may be different from or the same as each other. The boundary between the polymer blocks is not necessarily required to be clearly defined.

n is an integer of 1 or larger and is preferably an integer of 1 to 3.

m represents an integer of 2 or larger and is preferably an integer of 2 to 6. X represents a residue of a coupling agent or a residue of a polyfunctional initiator.

Particularly, a polymer represented by the structural formula (C-2)-(B-2)-(S-2), (C-2)-(B-2)-(S-2)-(B3), (S-2)-(B-2)-(S-2), or (S-2)-(B-2)-(S-2)-(B3) is preferred.

In this respect, the coupling residue means a residue after coupling by a coupling agent for use in coupling a plurality of copolymers of conjugated diene compound monomer units and vinyl aromatic hydrocarbon compound monomer units.

Examples of the coupling agent include bifunctional coupling agents and polyfunctional coupling agents.

Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (S-2), (C-2), or (B-2) may be uniformly distributed or may be distributed in a tapered pattern.

When the polymer block (S-2), (C-2), or (B-2) forms a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

In the tube of the present embodiment, the total content of the hydrogenated block copolymer (a) and the hydrogenated block copolymer (a2) is preferably 40 to 95 mass %, and the content of the polypropylene resin is preferably 5 to 60 mass %, from the viewpoint of flexibility, transparency, and kink resistance.

More preferably, the total content of the components (a) and (a2) is 50 to 90 mass %, and the content of the polypropylene resin component is 10 to 50 mass %.

Further preferably, the total content of the components (a) and (a2) is 60 to 85 mass %, and the content of the polypropylene resin component is 15 to 40 mass %.

(Configuration of Tube)

The tube of the present embodiment preferably has at least an outer layer and an inner layer at its cross section.

In the tube of the present embodiment, the inner layer and/or the outer layer preferably contains the hydrogenated block copolymer (a) and preferably further contains the polypropylene resin.

The tube configured as described above is excellent in flexibility, transparency, kink resistance, and low stickiness.

In the tube of the present embodiment, the thickness of the outer layer is preferably 5 to 1000 μm, and the thickness of the inner layer is preferably 10 to 3000 μm, from the viewpoint of flexibility, transparency, and kink resistance.

The thickness of the outer layer in the tube of the present embodiment is more preferably 10 to 500 μm, further preferably 20 to 200 μm.

The thickness of the inner layer in the tube of the present embodiment is more preferably 20 to 2000 μm, further preferably 30 to 1000 μm.

The content of the polypropylene resin in the outer layer is preferably 60 to 95 mass %, and the content of the hydrogenated block copolymer (a) in the outer layer is preferably 5 to 40 mass %. The tube configured as described above is excellent in flexibility, transparency, and low stickiness.

From the viewpoint described above, the content of the polypropylene resin in the outer layer is more preferably 65 to 90 mass %, further preferably 70 to 85 mass %.

The content of the hydrogenated block copolymer (a) in the outer layer is more preferably 10 to 35 mass %, further preferably 15 to 30 mass %.

The content of the polypropylene resin in the inner layer is preferably 5 to 60 mass %, and the content of the hydrogenated block copolymer (a) in the inner layer is preferably 40 to 95 mass %, from the viewpoint of flexibility, transparency, and kink resistance.

The content of the polypropylene resin in the inner layer is more preferably 10 to 50 mass %, further preferably 15 to 40 mass %.

The content of the hydrogenated block copolymer (a) in the inner layer is more preferably 50 to 90 mass %, further preferably 60 to 85 mass %.

The tube of the present embodiment preferably has at least an outer layer and an inner layer as described above, and the outer layer and/or the inner layer preferably comprises the hydrogenated block copolymer (a2) from the viewpoint of flexibility, transparency, and low stickiness.

The content of the polypropylene resin in the outer layer is preferably 60 to 95 mass %, and the total content of the hydrogenated block copolymer (a) and the hydrogenated block copolymer (a2) in the outer layer is preferably 5 to 40 mass %.

The tube configured as described above is excellent in flexibility, transparency, and low stickiness.

From the viewpoint described above, the content of the polypropylene resin in the outer layer is more preferably 65 to 90 mass %, further preferably 70 to 85 mass %.

The total content of the hydrogenated block copolymer (a) and the hydrogenated block copolymer (a2) in the outer layer is more preferably 10 to 35 mass %, further preferably 15 to 30 mass %.

The content of the polypropylene resin in the inner layer is preferably 5 to 60 mass %, and the total content of the hydrogenated block copolymer (a) and the hydrogenated block copolymer (a2) in the inner layer is preferably 40 to 95 mass %, from the viewpoint of flexibility, transparency, and kink resistance.

The content of the polypropylene resin in the inner layer is more preferably 10 to 50 mass %, further preferably 15 to 40 mass %.

The total content of the hydrogenated block copolymer (a) and the hydrogenated block copolymer (a2) in the inner layer is more preferably 50 to 90 mass %, further preferably 60 to 85 mass %.

(Intermediate Layer)

The tube of the present embodiment may be configured to have a predetermined intermediate layer between the outer layer and the inner layer.

In this case, the intermediate layer preferably comprises the hydrogenated block copolymer (a) and/or the hydrogenated block copolymer (a2).

The thickness of the intermediate layer is preferably 10 to 3000 μm, more preferably 20 to 2000 μm, further preferably 30 to 1000 μm.

The tube configured as described above is excellent in transparency, flexibility, and kink resistance.

In the measurement of the tube of the present embodiment by cross fractionation chromatography (hereinafter, referred to as "CFC"), preferably, an integral elution volume at −20° C. or lower is 0.1% or more and less than 40% of the total volume, an integral elution volume in the range of higher than −20° C. and lower than 60° C. is 40% or more and less than 95% of the total volume, and an integral elution volume in the range of 60° C. or higher and 150° C. or lower is 5% or more and less than 60% of the total volume.

The tube configured as described above is excellent in flexibility, transparency, low stickiness, and kink resistance.

From similar viewpoints, the integral elution volume at −20° C. or lower is more preferably 2% or more and less than 30%, further preferably 3% or more and less than 20%, of the total volume.

The integral elution volume in the range of higher than −20° C. and lower than 60° C. is more preferably 50% or more and less than 90%, further preferably 55% or more and less than 80%, of the total volume.

The integral elution volume in the range of 60° C. or higher and 150° C. or lower is more preferably 10% or more and less than 50%, further preferably 20% or more and less than 45%, of the total volume.

The CFC elution volumes can be controlled by adjusting, for example, the ratio of the polymer block (C), (B1), or (B2), the blending ratio of the hydrogenated block copolymer (a), or the type of the polypropylene resin. The CFC elution volumes can be measured by a method described in Examples mentioned later.

(Method for Producing Material Forming Each Layer of Tube)

The resin material forming each layer of the tube of the present embodiment can be produced by, for example, a method of appropriately selecting the hydrogenated block copolymer (a), the polypropylene resin, and optionally the hydrogenated block copolymer (a2) and predetermined other components, and dry-blending these components, or using a usual apparatus for the mixing of polymer substances.

Examples of the mixing apparatus include, but are not particularly limited to, kneading apparatuses such as Banbury mixers, Labo Plastomill, single-screw extruders, and twin-screw extruders. Production by a melt mixing method using an extruder is preferred from the viewpoint of productivity and good kneadability.

The melting temperature for kneading can be appropriately set and is usually in the range of 130 to 300° C., preferably in the range of 150 to 250° C.

(Method for Producing Tube)

The method for producing the tube of the present embodiment is not particularly limited. For example, the resin composition comprising the materials is charged into an extruder and molten, and the resultant can be tubulated through a die and cooled in water or in air to prepare a tube.

A single-screw or multiple-screw extruder can be used as the extruder. Also, a multi-layer tube can be formed by multi-layer extrusion using a plurality of extruders. Alternatively, the resin composition may be molded directly into a tube from the extruder used for producing the resin composition.

The shape of the tube is not particularly limited. For example, a round or oval tube is usually used. The diameter of the tube is not particularly limited and is, for example, preferably, 1 to 50 mm, more preferably 2 to 30 mm, further preferably 3 to 20 mm, in terms of outside diameter. The thickness of the tube is preferably 0.3 to 30 mm, more preferably 0.4 to 20 mm, further preferably 0.5 to 10 mm.

The tube of the present embodiment may be prepared as a multi-layer tube by laminating an additional polymer without inhibiting the purpose of the present embodiment.

The polymer can be used alone or in combination of two or more as a single layer or as a multi-layer laminate that may differ in type among the layers.

The layer consisting of the polymer in the tube having such a multi-layer structure may be positioned as an innermost layer, an intermediate layer, or an outermost layer according to the desired performance to be imparted.

In the present embodiment, a reinforcing yarn braid or a helical reinforcing body can be wrapped around the tube and prepared as a pressure-resistant tube (hose) in order to improve pressure resistance, etc. while maintaining flexibility by suppressing increase in thickness. The reinforcing yarn braid is disposed in the inside or between layers in the thickness direction, and can employ vinylon, polyamide, polyester, aramide fiber, carbon fiber, metal wire, or the like. The helical reinforcing body is disposed at the outer circumference and can employ a metal, a plastic, or the like.

The tube of the present embodiment is excellent in flexibility, transparency, low stickiness, kink resistance, and the balance among these properties, as shown in Examples mentioned later and can be used in any application without particular limitations.

By exploiting these properties, the tube of the present embodiment can be used in a wide range of applications such as applications for home appliances, applications for automobile interior or exterior parts, daily goods, leisure goods, toys and games, industrial products, applications for food production instruments, and medical applications.

Among them, the tube of the present embodiment can be suitably used in medical applications.

<Tacky Film>

The tacky film of the present embodiment comprises: a substrate film; and a tacky layer comprising the hydrogenated block copolymer (a), the tacky layer being disposed on the substrate film.

The tacky film configured as described above is excellent in initial tackiness, low temperature tackiness, feeding properties, low tack increasing properties, and the balance among these properties.

(Substrate Film)

The material of the substrate film is not particularly limited, and any of nonpolar and polar resins can be used.

From the viewpoint of performance, price, etc., preferred examples of the nonpolar resin can include polyethylene and homo or block polypropylene, and preferred examples of the polar resin can include: polyester resins such as polyethylene terephthalate and polybutylene terephthalate; polyamide resins; and ethylene-vinyl acetate copolymers and hydrolysates thereof.

The thickness of the substrate film is preferably 1 mm or smaller, more preferably 300 μm or smaller, further preferably 10 to 200 μm.

The substrate film having a thickness of 10 μm or larger can sufficiently protect an adherend. The substrate film having a thickness of 1 mm or smaller produces a practically good elastic modulus, has good followability to irregularities, and can effectively prevent uplift or peeling.

(Tacky Layer)

The tacky layer forming the tacky film of the present embodiment preferably has a thickness of 3 to 100 μm. The thickness of the tacky layer is more preferably 5 to 50 μm, further preferably 8 to 20 μm.

The tacky layer having a thickness of 100 μm or smaller tends to have better handleability and is also economically preferred. The tacky layer having a thickness of 3 μm or larger tends to have better adhesion and produce a uniform thickness.

In general, a sheet-shaped molded body having a thickness of 0.005 mm or larger and smaller than 0.2 mm is referred to as a film, and a sheet-shaped molded body having a thickness of 0.2 mm or larger and 50 mm or smaller is referred to as a sheet. In the specification of the present application, the "film" encompasses the film and the sheet.

<Tackifier>

The tacky layer of the tacky film of the present embodiment may contain a tackifier.

The tackifier is not particularly limited as long as the tackifier is a resin capable of imparting viscosity to the tacky layer. Examples thereof include known tackifiers such as hydrogenated terpene resins, rosin terpene resins, hydrogenated rosin terpene resins, aromatic modified hydrogenated terpene resins, coumarone resins, phenol resins, terpene phenol resins, hydrogenated terpene phenol resins, aromatic hydrocarbon resins, and aliphatic hydrocarbon resins.

Particularly, a hydrogenated terpene resin, an aromatic modified hydrogenated terpene resin, a hydrogenated terpene phenol resin, or a terpene phenol resin is preferred.

These tackifiers may be used alone or may be used as a mixture of two or more. Specific examples of the tackifier that can be used include those described in "Chemicals for Rubber/Plastics" (ed. by Rubber Digest, Co., Ltd., Japan). Use of the tackifier achieves improvement in tack strength.

The content of the tackifier in the tacky layer is preferably 0.5 to 50 mass %, more preferably 5 to 45 mass %, further preferably 10 to 30 mass %, in the tacky layer.

The tackifier content of 50 mass % or less in the tacky layer is preferred because there is a tendency that: increase in tack can be effectively prevented; and the amount of adhesive deposition upon detaching can be further reduced. The tackifier content of 0.5 mass % or more produces moderate tack strength.

<Hydrogenated Block Copolymer (b) and Hydrogenated Block Copolymer (c)>

In the tacky film of the present embodiment, the tacky layer is preferably configured to further comprise 5 to 95 mass %, more preferably 10 to 90 mass %, further preferably 15 to 85 mass %, of a hydrogenated block copolymer (b) and/or a hydrogenated block copolymer (c) mentioned later.

The tacky film configured as described above more moderately has initial tackiness, low temperature tackiness, feeding properties, and low tack increasing properties and is excellent in the balance among these properties.

The hydrogenated block copolymer (b) comprises, in its molecule, a polymer block (B-1) having a conjugated diene compound as a main component and a polymer block (S1) having a vinyl aromatic compound as a main component, wherein: in the hydrogenated block copolymer (b), a content of the polymer block (B-1) having a conjugated diene compound as a main component is 95 to 70 mass %, and a content of the polymer block (S1) having a vinyl aromatic compound as a main component is 5 to 30 mass %; and an amount of vinyl bond before hydrogenation of the polymer block (B-1) having a conjugated diene compound as a main component is 30 to 100 mol %, and a degree of hydrogenation of the hydrogenated block copolymer (b) is 80 mol % or more.

The hydrogenated block copolymer (c) comprises, in its molecule, a polymer block (B-2) comprising a conjugated diene compound and a vinyl aromatic compound and a polymer block (S2) having a vinyl aromatic compound as a main component, wherein: in the hydrogenated block copolymer (c), a content of the polymer block (B-2) comprising a conjugated diene compound and a vinyl aromatic compound is 95 to 70 mass %, and a content of the polymer block (S2) having a vinyl aromatic compound as a main component is 5 to 30 mass %; and a degree of hydrogenation of the hydrogenated block copolymer (c) is 80 mol % or more.

For the hydrogenated block copolymer (b) and the hydrogenated block copolymer (c), the phrase "having . . . as a main component", the respective materials of the conjugated diene compound and the vinyl aromatic compound, the amount of vinyl bond, and the degree of hydrogenation can be defined and controlled in the same way as in the hydrogenated block copolymer (a) mentioned above.

The hydrogenated block copolymer (b) and the hydrogenated block copolymer (c) can be produced in the same way as the method for producing the hydrogenated block copolymer (a) mentioned above. Specifically, the content of each polymer block, the amount of vinyl bond, the degree of hydrogenation, etc. can be controlled under the same conditions using the same monomers as in the hydrogenated block copolymer (a).

<Structural Example of Hydrogenated Block Copolymer (b)>

Examples of the hydrogenated block copolymer (b) mentioned above include those having structures represented by the following general formulas:

$(S1\text{-}(B\text{-}1))_n$, $S1\text{-}(B\text{-}1)\text{-}S1)_n$, $(B\text{-}1)\text{-}(S1\text{-}(B\text{-}1))_n$, $[((B\text{-}1)\text{-}S1)_n]_m\text{-}Z$, $[(S1\text{-}(B\text{-}1))_n]_m\text{-}Z$, $[((B\text{-}1)\text{-}S1)_n\text{-}(B\text{-}1)]_m\text{-}Z$, and $[(S1\text{-}(B\text{-}1))_n\text{-}S1]_m\text{-}Z$.

In these general formulas, S1 represents the polymer block (S1) having a vinyl aromatic compound as a main component, and (B-1) represents the polymer block (B-1) having a conjugated diene compound as a main component.

The boundary between the polymer block (S1) and the polymer block (B-1) is not necessarily required to be clearly defined. n is an integer of 1 or larger and is preferably an integer of 1 to 5. m is an integer of 2 or larger and is preferably an integer of 2 to 11, more preferably 2 to 8. Z represents a residue of a coupling agent. In this respect, the residue of the coupling agent means a residue after coupling by a coupling agent for use in coupling a plurality of copolymers of conjugated diene compound monomer units and vinyl aromatic hydrocarbon compound monomer units between the polymer block (S1) and the polymer block (S1), between the polymer block (B-1) and the polymer block (B-1), or between the polymer block (S1) and the polymer block (B-1). Examples of the coupling agent include bifunctional coupling agents and polyfunctional coupling agents.

Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (S1) and the polymer block (B-1) may be uniformly distributed or may be distributed in a tapered pattern. When the polymer block (S1) and the polymer block (B-1) form a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

<Structural Example of Hydrogenated Block Copolymer (c)>

Examples of the hydrogenated block copolymer (c) mentioned above include those having structures represented by the following general formulas:

$(S1\text{-}(B\text{-}2))_n$, $(B\text{-}2)\text{-}(S2\text{-}(B\text{-}2))_n$, $[((B\text{-}2)\text{-}S2)_n]_m\text{-}Z$, and $[((B\text{-}2)\text{-}S2)_n\text{-}(B\text{-}2)]_m\text{-}Z$.

In these general formulas, (B-2) represents the polymer block (B-2) comprising a conjugated diene compound and a vinyl aromatic compound, and S2 represents the polymer block (S2) having a vinyl aromatic compound as a main component.

The boundary between the polymer block (S2) and the polymer block (B-2) is not necessarily required to be clearly defined. n is an integer of 1 or larger and is preferably an integer of 1 to 5. m is an integer of 2 or larger and is preferably an integer of 2 to 11, more preferably 2 to 8. Z represents a residue of a coupling agent. In this respect, the coupling residue means a residue after coupling by a coupling agent for use in coupling a plurality of copolymers of conjugated diene compound monomer units and vinyl aromatic hydrocarbon compound monomer units between the polymer block (S2) and the polymer block (S2), between the polymer block (B-2) and the polymer block (B-2), or between the polymer block (S2) and the polymer block (B-2). Examples of the coupling agent include bifunctional coupling agents and polyfunctional coupling agents.

Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (S2) and the polymer block (B-2) may be uniformly distributed or may be distributed in a tapered pattern. When the polymer block (S2) and the polymer block (B-2) form a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

<Other Materials>

The tacky layer in the tacky film of the present embodiment may contain other materials such as hydrogenated styrene elastomers, olefin resins, olefin elastomers, acrylic copolymers, softening agents, antioxidants, light stabilizers, pigments, waxes, thermoplastic resins, natural rubbers, synthetic rubbers, and saturated fatty acid bisamides mentioned later, in addition to the hydrogenated block copolymers (a), (b), and (c) and the tackifier mentioned above.

[Hydrogenated Styrene Elastomer]

Typical examples of the hydrogenated styrene elastomer include, but are not particularly limited to, styrene-butadiene-styrene (SBS), styrene-isoprene-styrene (SIS), styrene-butadiene random polymer (SBR), styrene-ethylene-butylene-styrene (SEBS) prepared by the saturation of SBS by hydrogenation, and styrene-ethylene-propylene-styrene (SEPS). Other examples of the hydrogenated styrene elastomer may include elastomers having a structure such as styrene-ethylene-butylene (SEB), styrene-ethylene-propylene (SEP), or styrene-isobutylene-styrene triblock copolymer (SIBS).

Alternatively, a reactive elastomer derived from the hydrogenated styrene elastomer by the addition of various functional groups may be used. Examples of the functional groups include, but are not limited to, a hydroxy group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronate group, an alkoxy tin group, and a phenyl tin group.

[Olefin Resin and Olefin Elastomer]

Examples of the olefin resin and the olefin elastomer include α-olefin polymers or copolymers having 2 to 20 carbon atoms, and copolymers of ethylene and unsaturated carboxylic acid or unsaturated carboxylic acid ester.

Examples thereof include, but are not limited to, ethylene-propylene copolymers, ethylene-1-butene copolymers, ethylene-1-hexene copolymers, ethylene-4-methylpentene copolymers, ethylene-1-octene copolymers, propylene homopolymers, propylene-ethylene copolymers, propylene-ethylene-1-butene copolymers, 1-butene homopolymers, 1-butene-ethylene copolymers, 1-butene-propylene copolymers, 4-methylpentene homopolymers, 4-methylpentene-1-propylene copolymers, 4-methylpentene-1-butene copolymers, 4-methylpentene-1-propylene-1-butene copolymers, propylene-1-butene copolymers, ethylene-vinyl acetate copolymers, ethylene-methacrylic acid copolymers, and ethylene-methyl methacrylate copolymers.

A propylene homopolymer, a propylene-ethylene copolymer, a propylene-1-butene copolymer, a propylene-ethylene-1-butene copolymer, or polyethylene is preferred from the viewpoint of tack strength stability over time.

[Acrylic Copolymer]

The tacky layer of the tacky film of the present embodiment may further contain an acrylic copolymer. Examples of the acrylic copolymer include, but are not particularly limited to, copolymers of methyl acrylate, ethyl acrylate, methyl methacrylate, or acrylonitrile and vinyl acetate, vinyl chloride, or styrene.

[Softening Agent]

The tacky layer of the tacky film of the present embodiment may further contain a softening agent. The softening agent is not particularly limited. For example, any of mineral oil softening agents and synthetic resin softening agents can be used. Examples of the mineral oil softening agents generally include mixtures of aromatic hydrocarbons, naphthenic hydrocarbons, and paraffinic hydrocarbons.

In general, an oil in which a paraffinic hydrocarbon carbon atom number accounts for 50% or more of the total number of carbon atoms is referred to as a paraffinic oil; an oil in which a naphthenic hydrocarbon carbon atom number accounts for 30% to 45% of the total number of carbon atoms is referred to as a naphthenic oil; and an oil in which an aromatic hydrocarbon carbon atom number accounts for 35% or more of the total number of carbon atoms is referred to as an aromatic oil. The mineral oil softening agent is preferably a paraffinic oil serving as a softening agent for rubber. The synthetic resin softening agent is preferably polybutene, low molecular weight polybutadiene, or the like. The softening agent contained therein tends to further improve the tackiness of the tacky film of the present embodiment.

The content of the softening agent in the tacky layer of the tacky film of the present embodiment is preferably 0 to 100 parts by mass, more preferably 0.1 to 80 parts by mass, based on 100 parts by mass in total of the hydrogenated block copolymer (a), the hydrogenated block copolymer (b), and the hydrogenated block copolymer (c) mentioned above from the viewpoint of suppressing the bleeding of the softening agent and securing practically sufficient tack strength.

[Antioxidant, Light Stabilizer, etc.]

The tacky layer of the tacky film of the present embodiment may be further supplemented with a stabilizer such as an antioxidant or a light stabilizer.

Examples of the antioxidant include, but are not limited to: hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis [(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)] acrylate; sulfur antioxidants such as dilauryl thiodipropionate and lauryl stearyl thiodipropionate pentaerythritol-tetrakis(β-laurylthiopropionate); and phosphorus antioxidants such as tris(nonylphenyl)phosphite and tris(2,4-di-t-butylphenyl)phosphite.

Examples of the light stabilizer include, but are not limited to: benzotriazole ultraviolet absorbers such as 2-(2'-hydroxy-5'-methylphenyl)benzotriazole, 2-(2'-hydroxy-3', 5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

[Pigment, Wax, Thermoplastic Resin, Natural Rubber, and Synthetic Rubber]

The tacky layer of the tacky film of the present embodiment can also contain various additives, if necessary, in addition to those mentioned above.

Examples of the additives include, but are not limited to: pigments such as colcothar and titanium dioxide; waxes such as paraffin wax, microcrystalline wax, and low molecular weight polyethylene wax; polyolefin or low molecular weight vinyl aromatic thermoplastic resins such as amorphous polyolefin and ethylene-ethyl acrylate copolymers; natural rubber; and synthetic rubbers such as polyisoprene rubber, polybutadiene rubber, styrene-butadiene rubber, ethylene-propylene rubber, chloroprene rubber, acrylic rubber, isoprene-isobutylene rubber, and polypentenamer rubber. Examples of the synthetic rubbers include those described above as well as those described in "Chemicals for Rubber/Plastics" (ed. by Rubber Digest, Co., Ltd., Japan).

[Saturated Fatty Acid Bisamide]

The tacky layer of the tacky film of the present embodiment can contain a saturated fatty acid bisamide, which is effective for suppressing increase in tack.

Examples of the saturated fatty acid bisamide include, but are not limited to: saturated fatty acid aliphatic bisamides such as ethylenebisstearamide (EBSA), methylenebisstearamide, and hexamethylenebisstearamide; and saturated fatty acid aromatic bisamides such as m-xylylenebisstearamide and N,N'-distearylisophthalamide.

Among the saturated fatty acid aliphatic bisamides, ethylenebisstearamide is more preferred.

Among the saturated fatty acid aromatic bisamides, m-xylylenebisstearamide is more preferred.

These saturated fatty acid bisamides may be used alone or may be used in combination of two or more.

The tack layer may further contain a styrene block phase reinforcing agent, which is effective for suppressing increase in tack. Examples of the styrene block phase reinforcing agent include, but are not limited to, styrene and styrene compounds such as α-methylstyrene, p-methylstyrene, p-chlorostyrene, chloromethylstyrene, tert-butylstyrene, p-ethylstyrene, and divinylbenzene, as monomer units. These agents may be used alone or may be used in combination of two or more.

(Method for Producing Resin Material Forming Tacky Layer of Tacky Film)

The resin material forming the tacky layer of the tacky film of the present embodiment can be produced by, for example, a method of dry-blending the hydrogenated block copolymer (a), the hydrogenated block copolymer (b), the hydrogenated block copolymer (c), and other components to be optionally added, or a preparation method using an apparatus that is subjected to the usual mixing of polymer materials.

Examples of the mixing apparatus include, but are not particularly limited to, kneading apparatuses such as Banbury mixers, Labo Plastomill, single-screw extruders, and twin-screw extruders. Production by a melt mixing method using an extruder is preferred from productivity and good kneadability.

Particularly, in the case of blending a tackifier, the dry blending method described above may be used, or a master batch may be prepared by kneading the hydrogenated block copolymer (a), (b), or (c) in advance thereinto because the tackifier is strongly sticky and poorly handleable due to its flake form. The melting temperature for kneading can be appropriately set and is usually in the range of 130 to 300° C., preferably in the range of 150 to 250° C.

The resin material forming the tacky layer of the present embodiment may be subjected to blowing treatment in order to achieve weight reduction, softening, and an improving effect on adhesion.

Examples of the blowing method include, but are not limited to, chemical methods, physical methods, and exploitation of thermally expandable microballoons. These methods can employ the addition of chemical blowing agents (e.g., inorganic blowing agents and organic blowing agents), the addition of physical blowing agents, and the addition of thermally expandable microballoons, respectively, to distribute air bubbles in the inside of the material. Alternatively, weight reduction, softening, and improvement in adhesion may be achieved by the addition of a hollow filler (already expanded balloon).

(Method for Producing Tacky Film)

Examples of the method for producing the tacky film of the present embodiment include, but are not particularly limited to, a method of coating a substrate film with a solution or a molten form of the resin material forming the tacky layer, and a method using a film extruder.

In this context, in the case of using a solution or a molten form of the resin material forming the tacky layer, a composition may be prepared and then dissolved or molten, or a solution or a molten form of the hydrogenated block copolymer (a) supplemented, if necessary, with the hydrogenated block copolymer (b) and the hydrogenated block copolymer (c) may be prepared and then mixed.

The coating method using a solution of the resin material can involve, but is not limited to, for example, dissolving the resin material in a solvent capable of dissolving the resin material, coating a substrate film with the solution using a coater or the like, and drying off the solvent by heating to produce the tacky film.

The coating method using a molten form of the resin material can involve, but is not limited to, for example, coating a substrate film with the molten resin material using a hot melt coater or the like to produce the tacky film. In this case, it is preferred to use various substrate films having a glass transition temperature, a melting point, or a softening point higher than the coating temperature.

The method using a film extruder can involve, but is not limited to, for example, joining together a tacky layer component containing the resin material and a component (e.g., a thermoplastic resin) capable of forming a substrate film as two flows, i.e., a fluid for tacky layer formation and a fluid for substrate film formation, within a die in a melt coextruder so that a single fluid is formed and extruded, and combining the tacky layer and the resin film layer to produce the tacky film.

The method using a film extruder is excellent in productivity because the resin material forming the tacky layer can also be produced by dry-blending each component for the tacky layer in advance. Particularly, extrusion molding tends to be excellent in the adhesion and adhesion strength of a prepared surface protecting film.

The tacky film of the present embodiment can be temporarily attached to the surface of an optical molded body such as a light guide plate or a prism sheet, a synthetic resin plate, a metal plate, decorated plywood, a coated steel plate, various nameplates, or the like, and used as a protecting film for preventing scratches or dirt during the processing, conveyance, or storage of these adherends.

EXAMPLES

Hereinafter, the present embodiment will be specifically described with reference to Examples. However, the present embodiment is not limited by these Examples. In each of Examples and Comparative Examples, the preparation of a hydrogenated block copolymer, the production of a propylene resin composition, and the comparison of physical properties were performed by the methods described below. In this respect, the properties of the hydrogenated block copolymer and the physical properties of the propylene resin composition were measured as follows.

<Measurement Method>

1) Content of Each Polymer Block in Hydrogenated Block Copolymer

Approximately 20 mL of a polymer solution sampled in each step of a polymerization process for a pre-hydrogenated block copolymer was injected to a hermetically sealed 100 mL bottle containing 0.50 mL of n-propylbenzene and approximately 20 mL of toluene as internal standards to prepare a sample.

This sample was measured with a gas chromatograph (manufactured by Shimadzu Corporation; GC-14B) equipped with a packed column carrying Apiezon grease. The amount of residual monomers in the polymer solution was determined from calibration curves of butadiene monomers and styrene monomers obtained beforehand to confirm that the degrees of polymerization of butadiene monomers and styrene monomers were 100%. The content of each polymer block was calculated according to the formula given below.

The degree of polymerization of butadiene was measured at a constant temperature of 90° C., and the degree of polymerization of styrene was performed under conditions involving holding at 90° C. for 10 minutes and temperature increase to 150° C. at a rate of 10° C./min.

Content of each block=(Total amount of monomers fed in each step)/(Amount of all monomers)× 100 mass %

2) Amount of Vinyl Bond Before Hydrogenation of Hydrogenated Block Copolymer

Polymers sampled in each step of a polymerization process for a pre-hydrogenated block copolymer, and during polymerization for the polymer block (B) were measured by the proton nuclear magnetic resonance (H1-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature: 26° C. The amount of vinyl bond was calculated from the ratios of 1,4-bonds and 1,2-bonds by calculating an integrated value of signals per 1H of each bond from an integrated value of signals attributed to 1,4-bonds and 1,2-bonds.

The amount of vinyl bond of each polymer sampled in each step of a polymerization process for a pre-hydrogenated block copolymer was calculated to calculate the respective amount of vinyl bonds of the block (C) and the block (B).

3) Degree of Hydrogenation of Unsaturated Bond Based on Conjugated Diene Compound Unit of Hydrogenated Block Copolymer Polymers after hydrogenation were measured by proton nuclear magnetic resonance (H1-NMR). The measurement conditions and the method for processing measurement data were the same as in the paragraph 3). The degree of hydrogenation was determined by calculating integrated values of signals derived from remaining double bonds and signals derived from hydrogenated conjugated diene at 4.5 to 5.5 ppm, and calculating ratios thereof.

4) Butylene Content and/or Propylene Content Based on 100 mol % in Total of Conjugated Diene Compound Unit The total amount of conjugated diene compound units in a hydrogenated block copolymer, and a butylene content and/or a propylene content were measured by proton nuclear magnetic resonance (H1-NMR) using polymers after hydrogenation. The measurement conditions and the method for processing measurement data were the same as in the paragraphs 3) and 4). The butylene content was determined by calculating an integrated value of signals attributed to butylene (hydrogenated 1,2-bonds) at 0 to 2.0 ppm of the spectrum, and calculating a ratio thereof.

5) Content of Vinyl Aromatic Compound Unit (Hereinafter, Also Referred to as "Styrene Content") of Hydrogenated Block Copolymer Polymers after hydrogenation were measured by the proton nuclear magnetic resonance (H1-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature:

26° C. The styrene content was calculated using an integrated value of all styrene aromatic signals at 6.2 to 7.5 ppm of the spectrum.

The content of all vinyl aromatic compounds (total styrene content) and the styrene content of the (S) block were also confirmed by calculating the content of vinyl aromatic compound units in each polymer sampled in each step of a polymerization process for a pre-hydrogenated block copolymer.

6) Width at Half Height of Elution Volume Peak in TGIC Measurement of Hydrogenated Block Copolymer A dry sample of extracts obtained by Soxhlet extraction (chloroform solvent, 90° C.×8 hr) from each of hydrogenated block copolymers and molded bodies of polypropylene resin compositions obtained in Examples and Comparative Examples was dissolved in o-dichlorobenzene. As described below, the solution sample was injected to a graphite carbon column, and the elution volumes (mass %) of the samples and the corresponding intracolumn temperatures (° C.) were calculated. The elution volume at each temperature was determined from an elution temperature-elution volume curve obtained from the values.

First, the temperature of a column containing a packing material was increased to 95° C. 0.2 mL of a sample solution containing a hydrogenated block copolymer dissolved in o-dichlorobenzene was introduced to the column. The temperature of the column was decreased to −20° C. at a rate of temperature decrease of 2° C./min. Then, the temperature of the column was increased to 165° C. at a rate of temperature increase of 2° C./min. The concentration of a sample eluted at each temperature was detected at a mobile phase flow rate of 0.5 mL/min. Then, the elution temperature-elution volume curve was measured, and the elution volume at each temperature was determined.

Apparatus: high throughput compositional analysis apparatus (manufactured by Polymer Characterization, S.A.)

Detector: IR5 type infrared spectrophotometer (manufactured by Polymer Characterization, S.A.)

Detection wavelength: concentration sensor CH2 v3.42 µm (2920 cm$^{-1}$), methyl sensor CH3 v3.38 µm (2960 cm$^{-1}$)

Column: porous graphite carbon column, Hypercarb adapted to high temperature (manufactured by Polymer Characterization, S.A.), inside diameter: 4.6 mm, length: 150 mm, particle size: 5 µm Mobile phase: o-dichlorobenzene supplemented with BHT Sample concentration: 8 mg/8 mL Dissolution conditions: 150° C., 60 minutes (in a nitrogen atmosphere)

Injection volume: 0.2 mL

Temperature decrease conditions: from 95° C. to −20° C. (2° C./min), flow rate: 0.0 mL/min Temperature increase conditions: from −20° C. to −165° C. (2° C./min), flow rate: 0.5 mL/min The width at half height of the elution peak in the range of 0° C. or higher and 150° C. or lower was determined from the obtained elution temperature-elution volume curve.

7) DSC Measurement 10 mg of each hydrogenated block copolymer was precisely weighed into an aluminum pan. A differential scanning calorimeter (DSC) (manufactured by TA Instruments, Q2000) was used. The temperature was increased at a rate of temperature increase of 10° C./min from an initial temperature of −50° C. to 150° C. in a nitrogen atmosphere (flow rate: 50 mL/min), kept at 150° C. for 5 minutes, and then decreased to −50° C. at a rate of 10° C./min, followed by measurement. A crystallization peak appearing in the course of temperature decrease on the drawn DSC curve was regarded as a crystallization temperature (° C.), and the quantity of heat indicated by the crystallization peak area was regarded as the heat of crystallization (J/g).

8) Dynamic Viscoelasticity Measurement of Hydrogenated Block Copolymer

The temperature-loss tangent (tan δ) spectrum obtained from solid viscoelasticity (1 Hz) was measured by the following method to obtain a tan δ peak temperature.

A sample for measurement was loaded in the torsion type geometry of an apparatus ARES (trade name, manufactured by TA Instruments), and the samples given below were measured under conditions involving an effective measurement length of 25 mm, a strain of 0.5%, a frequency of 1 Hz, a measurement range from −100° C. to 100° C., and a rate of temperature increase of 3° C./min.

Sample 1: a hydrogenated block copolymer (a) was singly molded into a sheet having a thickness of 2 mm by hot press at 200° C. for 5 minutes. Then, the sheet was cut into a width of 10 mm and a length of 35 mm to prepare a sample for measurement. Its tan δ peak (Tg1) was determined.

Sample 2: a composition of hydrogenated block copolymer (a)/homopolypropylene (manufactured by SunAllomer Ltd., PL500A)=30/70 was molded into a sheet having a thickness of 2 mm by hot press at 200° C. for 5 minutes. Then, the sheet was cut into a width of 10 mm and a length of 35 mm to prepare a sample for measurement. Its tan δ peak on the lower temperature side (Tg2) was determined.

The value of ΔTg (Tg1-Tg2) was determined from the sample 1 and the sample 2.

9) Shore A Hardness of Hydrogenated Block Copolymer

The Shore A hardness (conforming to ASTM D-2240) of a hydrogenated block copolymer was determined as follows: the hydrogenated block copolymer was press-molded into a sheet having a thickness of 2 mm at 200° C. for 5 minutes. Four such sheets were laminated, and the momentary value was measured using durometer type A.

10) Confirmation of Microphase Separated Structure

Pellets of a hydrogenated block copolymer obtained in each of Examples and Comparative Examples were hot press-molded into a sheet having a thickness of 2 mm at 200° C. This sheet was frozen in liquid nitrogen and then sliced into ultrathin sections in a direction perpendicular to the machine direction (MD) using a microtome. The polymer block (S) phase was stained with osmic acid, washed with water, dried, and then observed under a transmission electron microscope (TEM) at a magnification of ×50000. The microphase separated structure of the hydrogenated block copolymer was morphologically identified from the presence or absence of a portion stained black (black portion) present in the TEM image using image analysis software (manufactured by Asahi Kasei Engineering Corp., A-Zou Kun). An average value of the major and minor axes of the black portion was further calculated and used as a particle size. This particle size was calculated for all black portions, and an average value thereof was determined and used as a sphere size (average particle size). A hydrogenated block copolymer that formed a microphase separated structure comprising a spherical structure and had an average particle size of the spheres of 5 to 20 nm was assessed as ◯; and a hydrogenated block copolymer that formed a microphase separated structure other than that indicated by "◯" or formed no microphase separated structure was assessed as x.

Figure 2:
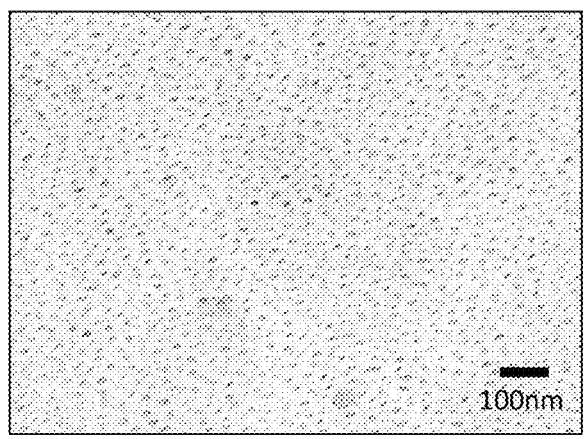
FIG. 2 shows a TEM image showing an example in which the hydrogenated block copolymer according to the present embodiment forms a microphase separated structure comprising a spherical structure.
Figure 3:
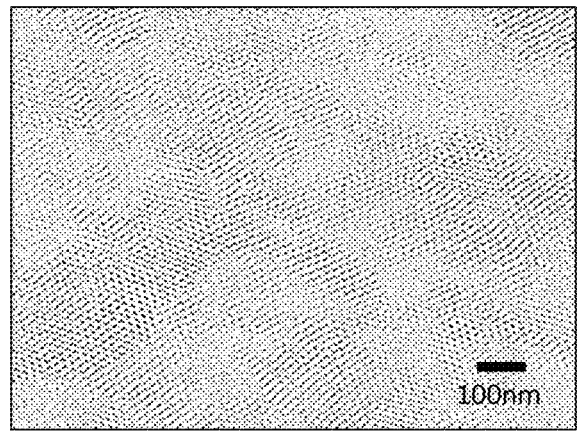
FIG. 3 shows a TEM image showing an example in which a hydrogenated block copolymer does not form a microphase separated structure containing a spherical structure.

An example of "◯" described above is shown in FIG. 2. An example of "x" described above is shown in FIG. 3.

11) Wide Angle X Ray Diffractometry

250 μm sheet-shaped molded bodies obtained in Examples and Comparative Examples were used as test specimens. A nano-scale X ray structural evaluation apparatus NANO-Viewer manufactured by Rigaku Corp. was used, and the optical system employed X ray (wavelength: 0.154 nm) parallelized using point collimation (first slit: 0.4 mmφ, second slit: 0.2 mmφ, guard slit: 0.8 mφ). Each molded body was irradiated with incident X ray (edge incident) parallel to the molded body surface from the side. In this respect, the sample thickness in the X ray incident direction was equal to or smaller than the sheet thickness. The detector used was an imaging plate. The camera length was set to 74.5 mm, and the exposure time was set to 15 minutes. In order to prevent air-derived scatter, the passage from the second slit through the detector was vacuumized. Scatter correction was performed for empty cells and the background of the apparatus. The obtained two-dimensional scatter pattern was averaged in a fan-like fashion within the range of $-15°<\chi<15°$ ($\chi$: azimuth defined with the thickness direction of the molded body as 0°) to obtain a one-dimensional scatter profile. The line connecting scattering intensity at 2θ=5° and scattering intensity at 2θ=30° in the obtained scatter profile was used as a baseline. Intensity at scattering peak top present at 2θ=14° (scattered by the (110) plane of the α crystals of the polypropylene resin) from the baseline was defined as I14, and scattering intensity at 2θ=15° from the baseline was defined as I15. The intensity ratio thereof (I14/I15) was calculated.

12) CFC Measurement of Molded Body of Polypropylene Resin Composition

Molded bodies of the polypropylene resin composition obtained in Examples and Comparative Examples were used as test samples. An elution temperature-elution volume curve was measured by temperature rising elution fractionation as described below, and an elution volume at each temperature and an integral elution volume were determined.

First, the temperature of a column containing a packing material was increased to 145° C. A sample solution containing a hydrogenated block copolymer dissolved in o-dichlorobenzene was introduced to the column, which was then kept at 140° C. for 30 minutes. Next, the temperature of the column was decreased to −20° C. at a rate of temperature decrease of 1° C./min and then kept for 60 minutes to deposit the sample on the packing material surface.

Then, the temperature of the column was sequentially increased at 5° C. intervals at a rate of temperature increase of 40° C./min. The concentration of a sample eluted at each temperature was detected. Then, the elution temperature-elution volume curve was measured from the elution volumes (%) of the samples and the corresponding intracolumn temperatures (° C.). The elution volume at each temperature was determined.

Apparatus: CFC type cross fractionation chromatograph (manufactured by Polymer Characterization, S.A.)
Detector: IR type infrared spectrophotometer (manufactured by Polymer Characterization, S.A.)
Detection wavelength: 3.42 μm
Column: Shodex HT-806M×3 (manufactured by Showa Denko K.K.)
Column calibration: monodisperse polystyrene (manufactured by Tosho Corp.)
Molecular weight calibration method: calibration method using standards (based on polystyrene)
Eluent: o-dichlorobenzene
Flow rate: 1.0 mL/min
Sample concentration: 120 mg/30 mL
Injection volume: 0.5 mL An integral elution volume in the total volume at −20° C. or lower, an integral elution volume in the total volume in the range of higher than −20° C. and lower than 60° C., and an integral elution volume in the total volume in the range of 60° C. or higher and 150° C. or lower were determined from the obtained elution temperature-elution volume curve.

13) Ratio of Integrated Value of 29.4 to 30.0 ppm to Integrated Value of 9.0 to 14.0 ppm in 13C-NMR Measurement A dry sample of extracts obtained by Soxhlet extraction (chloroform solvent, 90° C.×8 hr) from a hydrogenated block copolymer was dissolved at a concentration of 10 wt/vol % in deuterated chloroform. The solution sample was measured by 13C-NMR under the conditions given below, and the ratio of an integrated value of 29.4 to 30.0 ppm to an integrated value of 9.0 to 14.0 ppm (integrated value of 29.4 to 30.0 ppm/integrated value of 9.0 to 14.0 ppm) was calculated.

Apparatus: Bruker Biospin Avance 600
Sample tube: 5 mmφ
Chemical shift reference of 0 ppm: TMS
Observed nucleus: 13C
Observation frequency: 150.91 MHz
Pulse program: zgig30 (quantitative measurement method)
Pulse width: 30°
Waiting time: 10 sec
The number of integrations: 5000

Each integrated value ratio was calculated according to the following integration (1) or (2):

$$\text{Integrated value ratio}=((1.23+((100-\text{Butylene content}\times0.97\times0.3)/0.97)^3/10000\times0.97)/0.97)/(\text{Butylene content}/4) \quad \text{Formula (1)}$$

$$\text{Integrated value ratio}=((12.28+((100-\text{Butylene content}\times0.97-0.3)/0.97)^3/10000\times0.97)/0.97)/(\text{Butylene content}/4) \quad \text{Formula (2)}$$

<Method for Evaluating Property of Resin Composition>

14) Impact Resistance of Sheet-Shaped Molded Body

Sheet-shaped molded bodies obtained in Examples and Comparative Examples were used. These sheet-shaped molded bodies were cut into 20 cm×13 cm test specimens. Two sheets of the test specimens were laminated, and three sides thereof were then heat-sealed at 145° C. for 2 seconds to prepare a bag.

500 mL of water was added into the bag, and the remaining one side was further heat-sealed under the same conditions as above to prepare a water-containing bag.

The water-containing bag was further sterilized by steam and then left for 24 hours in a refrigerator of 4° C. When 10 bags of each example were then dropped from a height of 1.8 m, the breakage rate of the bags was measured and used as an index for impact resistance.

The obtained breakage rate was used in evaluation based on the criteria given below.

5: The non-breakage rate was 100%.
4: The non-breakage rate was 80% or more and less than 100%.
3: The non-breakage rate was 70% or more and less than 80%.
2: The non-breakage rate was 50% or more and less than 70%.
1: The non-breakage rate was less than 50%.

15) Flexibility of Sheet-Shaped Molded Body

Sheet-shaped molded bodies obtained in Examples and Comparative Examples were used. These molded bodies were punched into JIS No. 5 dumbbell shapes, and the tensile modulus (MPa) in the machine direction (MD) of each of the resulting samples was measured at a pulling rate of 200 mm/min using a tensile tester (Minebea Co., Ltd., Tg-5 kN) in accordance with JIS K6251 and used as an index for flexibility. The obtained tensile modulus was evaluated according to the following criteria:

5: The tensile modulus was lower than 250 MPa.
4: The tensile modulus was 250 MPa or higher and lower than 300 MPa.
3: The tensile modulus was 300 MPa or higher and lower than 350 MPa.
2: The tensile modulus was 350 MPa or higher and lower than 450 MPa.
1: The tensile modulus was 450 MPa or higher.

16) Transparency of Sheet-Shaped Molded Body

Sheet-shaped molded bodies obtained in Examples and Comparative Examples were used. The haze value (%) was measured using a haze meter (manufactured by Nippon Denshoku Industries, Co., Ltd., NDH-1001DP) and used as an index for transparency. The obtained haze value was used in evaluation based on the criteria given below.

5: The haze value was less than 2.0%.
4: The haze value was 2.0% or more and less than 3.5%.
3: The haze value was 3.5% or more and less than 5.0%.
2: The haze value was 5.0% or more and less than 6.0%.
1: The haze value was 6.0% or more.

17) Low Stickiness of Sheet-Shaped Molded Body

Sheet-shaped molded bodies obtained in Examples and Comparative Examples (Examples 2-1 to 2-19 and Comparative Examples 2-1 to 2-14) were each cut into 5 cm×8 cm and 4 cm×6 cm test specimens. Two sheets of the obtained test specimens were laminated (upper: 5 cm×8 cm, lower: 4 cm×5 cm). Then, a load of 500 g (size: 6 cm×10 cm×1 cm) was placed on the upper sheet and left standing for 60 seconds. When the sheets were then detached 180° at a rate of 100 mm/min, the tack strength (J) was measured using a tensile tester (Minebea Co., Ltd., Tg-5 kN) and used as an index for low stickiness. The obtained tack strength was evaluated according to the following criteria:

5: The tack strength was smaller than 3 N.
4: The tack strength was 3 N or larger and smaller than 5 N.
3: The tack strength was 5 N or larger and smaller than 8 N.
2: The tack strength was 8 N or larger and smaller than 10 N.
1: The tack strength was 10 N or larger.

<Method for Evaluating Property of Film>

(1) Flexibility

Films obtained in Examples and Comparative Examples were punched into JIS No. 5 test specimens to prepare samples for measurement. The samples for measurement were measured under conditions involving a pulling rate of 200 mm/min in the machine direction (MD) of the resin in accordance with JIS K7127. The evaluation criteria are given below.

⊚: The tensile modulus was lower than 400 MPa.
○: The tensile modulus was 400 MPa or higher and lower than 500 MPa.
Δ: The tensile modulus was 500 MPa or higher and lower than 600 MPa.
x: The tensile modulus was 600 MPa or higher.

(2) Transparency

The haze values of films obtained in Examples and Comparative Examples were measured using a haze meter (manufactured by Nippon Denshoku Industries, Co., Ltd., NDH-1001DP) to evaluate transparency.

The evaluation criteria are given below.

⊚: The haze value was less than 12.
○: The haze value was 12 or more and less than 15.
Δ: The haze value was 15 or more and less than 20.
x: The haze value was 20 or more.

(3) Low Stickiness

Films obtained in Examples and Comparative Examples were used as test specimens to evaluate low stickiness using a friction tester (KES-SE, manufactured by Kato Tech Co., Ltd.). A 2 cm long film was cut out of each film and mounted to a sensor portion, and a 10 cm film was fixed to a sample table. The film of the sensor portion and the film of the sample table were disposed in contact with each other (layer 2 shown in Tables 5 and 6 or an inner layer shown in Tables 8 and 9 was in contact with the sensor portion). The test conditions involved a sweep rate of 1 mm/sec and a load of 5 g. The obtained friction coefficient μ (non-dimensional) was evaluated according to the following criteria:

⊚: The friction coefficient was less than 0.9.
○: The friction coefficient was 0.9 or more and less than 1.8.
Δ: The friction coefficient was 1.8 or more and less than 2.7.
x: The friction coefficient was 2.7 or more.

(4) Elution Volume in CFC Measurement of Film

Films obtained in Examples and Comparative Examples were used as test samples. An elution temperature-elution volume curve was measured by temperature rising elution fractionation as described below, and an elution volume at each temperature and an integral elution volume were determined. First, the temperature of a column containing a packing material was increased to 145° C. A sample solution containing a hydrogenated block copolymer dissolved in o-dichlorobenzene was introduced to the column, which was then kept at 140° C. for 30 minutes. Next, the temperature of the column was decreased to −20° C. at a rate of temperature decrease of 1° C./min and then kept for 60 minutes to deposit the sample on the packing material surface. Then, the temperature of the column was sequentially increased at 5° C. intervals at a rate of temperature increase of 40° C./min. The concentration of a sample eluted at each temperature was detected. Then, the elution temperature-elution volume curve was measured from the elution volumes (%) of the samples and the corresponding intracolumn temperatures (° C.). The elution volume at each temperature was determined.

Apparatus: CFC type cross fractionation chromatograph (manufactured by Polymer Characterization, S.A.)
Detector: IR type infrared spectrophotometer (manufactured by Polymer Characterization, S.A.)
Detection wavelength: 3.42 μm
Column: Shodex HT-806M×3 (manufactured by Showa Denko K.K.)
Column calibration: monodisperse polystyrene (manufactured by Tosoh Corp.)
Molecular weight calibration method: calibration method using standards (based on polystyrene)
Eluent: o-dichlorobenzene
Flow rate: 1.0 mL/min
Sample concentration: 120 mg/30 mL
Injection volume: 0.5 mL An integral elution volume (%) in the total volume at −20° C. or lower, an integral elution volume (%) in the total volume in the range of higher than −20° C. and lower than 60° C., and an integral elution volume (%) in the total volume in the range of 60° C. or higher and 150° C. or lower were determined from the obtained elution temperature-elution volume curve. These values were indicated as "CFC area %" in Tables 5 and 6.

(5) Impact Resistance (Bag Capacity: 500 mL)

Films were cut into 20 cm×13 cm test specimens. Two sheets of the test specimens were laminated, and three sides thereof were then heat-sealed at 145° C. for 2 seconds to prepare a bag. 500 mL of water was added into the bag, and the remaining one side was further heat-sealed under the same conditions as above to prepare a water-containing bag. The water-containing bag was further sterilized by steam and then left for 24 hours in a refrigerator of 4° C. When 10 bags of each example were then dropped from a height of 1.8 m, the breakage rate of the bags was measured and used as an index for impact resistance.

The obtained breakage rate was used in evaluation based on the criteria given below.

⊚: The non-breakage rate was 100%.

◯: The non-breakage rate was 70% or more and less than 100%.

Δ: The non-breakage rate was 50% or more and less than 70%.

x: The non-breakage rate was less than 50%.

(6) Impact Resistance (Bag Capacity: 2000 mL)

Films were cut into 21 cm×33 cm test specimens. Two sheets of the test specimens were laminated, and three sides thereof were then heat-sealed at 145° C. for 2 seconds to prepare a bag. 2000 mL of water was added into the bag, and the remaining one side was further heat-sealed under the same conditions as above to prepare a water-containing bag. The water-containing bag was further sterilized by steam and then left for 24 hours in a refrigerator of 4° C. When 10 bags of each example were then dropped from a height of 1.5 m, the breakage rate of the bags was measured and used as an index for impact resistance.

The obtained breakage rate was used in evaluation based on the criteria given below.

⊚: The non-breakage rate was 100%.

◯: The non-breakage rate was 70% or more and less than 100%.

Δ: The non-breakage rate was 50% or more and less than 70%.

x: The non-breakage rate was less than 50%.

<Method for Evaluating Property of Tube>

(1) Wide Angle X Ray Diffractometry of Tube-Shaped Molded Body

Tube-shaped molded bodies obtained in Examples and Comparative Examples were used as test specimens. A nano-scale X ray structural evaluation apparatus NANO-Viewer manufactured by Rigaku Corp. was used, and the optical system employed X ray (wavelength: 0.154 nm) parallelized using point collimation (first slit: 0.4 mmφ, second slit: 0.2 mmφ, guard slit: 0.8 mφ). A sample cut out of each tube-shaped molded body was irradiated in the circumferential direction with incident X ray (edge incident) parallel to the molded body surface from the side.

In this respect, the sample thickness in the X ray incident direction was equal to or smaller than the tube thickness.

The detector used was an imaging plate. The camera length was set to 74.5 mm, and the exposure time was set to 15 minutes. In order to prevent air-derived scatter, the passage from the second slit through the detector was vacuumized. Scatter correction was performed for empty cells and the background of the apparatus.

The obtained two-dimensional scatter pattern was averaged in a fan-like fashion within the range of −15°<χ<15° (χ: azimuth defined with the thickness direction of the molded body as 0°) to obtain a one-dimensional scatter profile. The line connecting scattering intensity at 2θ=5° and scattering intensity at 2θ=30° in the obtained scatter profile was used as a baseline. Intensity at scattering peak top present at 2θ=14° (scattered by the (110) plane of the α crystals of the polypropylene resin) from the baseline was defined as I(14), and scattering intensity at 2θ=15° from the baseline was defined as I(15). The intensity ratio thereof (I(14)/I(15)) was calculated.

(2) Elution Volume in CFC Measurement of Tube-Shaped Molded Body

Tube-shaped molded bodies obtained in Examples and Comparative Examples were used as test samples. An elution temperature-elution volume curve was measured by temperature rising elution fractionation as described below, and an elution volume at each temperature and an integral elution volume were determined.

First, the temperature of a column containing a packing material was increased to 145° C. A sample solution containing a hydrogenated block copolymer dissolved in o-di-chlorobenzene was introduced to the column, which was then kept at 140° C. for 30 minutes.

Next, the temperature of the column was decreased to −20° C. at a rate of temperature decrease of 1° C./min and then kept for 60 minutes to deposit the sample on the packing material surface.

Then, the temperature of the column was sequentially increased at 5° C. intervals at a rate of temperature increase of 40° C./min. The concentration of a sample eluted at each temperature was detected.

Then, the elution temperature-elution volume curve was measured from the elution volumes (%) of the samples and the corresponding intracolumn temperatures (° C.). The elution volume at each temperature was determined.

Apparatus: CFC type cross fractionation chromatograph (manufactured by Polymer Characterization, S.A.)

Detector: IR type infrared spectrophotometer (manufactured by Polymer Characterization, S.A.)

Detection wavelength: 3.42 μm

Column: Shodex HT-806M×3 (manufactured by Showa Denko K.K.)

Column calibration: monodisperse polystyrene (manufactured by Tosoh Corp.)

Molecular weight calibration method: calibration method using standards (based on polystyrene)

Eluent: o-dichlorobenzene

Flow rate: 1.0 mL/min

Sample concentration: 120 mg/30 mL

Injection volume: 0.5 mL

An integral elution volume (%) in the total volume at −20° C. or lower, an integral elution volume (%) in the total volume in the range of higher than −20° C. and lower than 60° C., and an integral elution volume (%) in the total volume in the range of 60° C. or higher and 150° C. or lower were determined from the obtained elution temperature-elution volume curve. These values were indicated as "CFC area %" in Tables 10 to 12.

(3) Flexibility of Tube-Shaped Molded Body

Tube-shaped molded bodies obtained in Examples and Comparative Examples were used. These molded bodies were cut into 3 mm width in the machine direction, and the tensile modulus (MPa) of the resulting samples was measured at a pulling rate of 100 mm/min using a tensile tester (Minebea Co., Ltd., Tg-5kN) and used as an index for flexibility.

The obtained tensile modulus was evaluated according to the following criteria:
⊚: The tensile modulus was lower than 27 MPa.
○: The tensile modulus was 27 MPa or higher and lower than 35 MPa.
Δ: The tensile modulus was 35 MPa or higher and lower than 45 MPa.
×: The tensile modulus was 45 MPa or higher.

(4) Transparency of Tube-Shaped Molded Body

Tube-shaped molded bodies obtained in Examples and Comparative Examples were used. Five tubes were placed alongside in a quartz cell, which was then filled with paraffin oil. Then, the haze value (%) was measured using a haze meter (manufactured by Nippon Denshoku Industries, Co., Ltd., NDH-1001DP) and used as an index for transparency.

The obtained haze value was used in evaluation based on the criteria given below.
<Criteria for Single-Layer Tube>
⊚: The haze value was less than 15%.
○: The haze value was 15% or more and less than 22%.
Δ: The haze value was 22% or more and less than 30%.
×: The haze value was 30% or more.
<Criteria for Three-Layer Tube>
⊚: The haze value was less than 20%.
○: The haze value was 20% or more and less than 28%.
Δ: The haze value was 28% or more and less than 40%.
×: The haze value was 40% or more.

(5) Low Stickiness of Tube-Shaped Molded Body

Tube-shaped molded bodies obtained in Examples and Comparative Examples were used as test specimens to evaluate low stickiness using a friction tester (KES-SE, manufactured by Kato Tech Co., Ltd.).

A 2 cm long tube was cut out of each tube and mounted to an inner layer sensor portion, and a 10 cm tube was fixed to a sample table. The test specimen of the sensor portion and the tube were disposed in contact with each other.

The test conditions involved a sweep rate of 1 mm/sec and a load of 25 g. The obtained friction coefficient μ (non-dimensional) was evaluated according to the following criteria:
⊚: The friction coefficient was less than 0.9.
○: The friction coefficient was 0.9 or more and less than 1.8.
Δ: The friction coefficient was 1.8 or more and less than 2.7.
×: The friction coefficient was 2.7 or more.

(6) Kink Resistance of Tube-Shaped Molded Body (23° C. and 4° C.)

Tube-shaped molded bodies obtained in Examples and Comparative Examples were used. Stress that inflected a tube was measured using a tensile compression tester in a thermostat bath of 23° C. and in a thermostat bath of 4° C. Specifically, a tube having a length of 30 cm was used as a sample. The inter-chuck distance was set to 10 cm, and the sample was bended and measured at a crosshead speed of 200 mm/min.

Figure 4:
FIG. 4 shows one example of a stress curve obtained from the relationship between stress and an inter-chuck distance when stress that inflected a tube was measured using a tensile compression tester.

One example of a stress curve obtained from the relationship between the stress and the inter-chuck distance is shown in FIG. 4.

In the example of FIG. 4, the inter-chuck distance (X in FIG. 4) under the maximum stress was defined as an inter-chuck distance at the instant when the tube was kinked (kink position). A larger value of the inter-chuck distance corresponding to this kink position was assessed as better kink resistance. The kink resistance was evaluated according to the following criteria:
<Criteria for Kink at 23° C.>
⊚: The kink position was 57 mm or larger.
○: The kink position was 53 mm or larger and smaller than 57 mm.
Δ: The kin position was 50 mm or larger and smaller than 53 mm.
×: The kink position was smaller than 50 mm.
<Criteria for Kink at 4° C.>
⊚: The kink position was 53 mm or larger.
○: The kink position was 47 mm or larger and smaller than 53 mm.
Δ: The kin position was 40 mm or larger and smaller than 47 mm.
×: The kink position was smaller than 40 mm.
<Method for Evaluating Property of Tacky Film>

(1) Initial Tack (23° C.)

The measuring apparatus used for the tack strength of tacky films obtained in Examples and Comparative Examples was a universal tensile compression tester "Technograph TGE-500N; manufactured by Minebea Co., Ltd.". A 25 mm wide sample cut out of each tacky film was laminated with a PMMA plate (arithmetic average roughness of surface: 0.1 μm), and attached thereto by moving thereon a rubber roll (diameter: 10 cm) having a weight of 2 kg, at a temperature of 23° C. and 50% relative humidity. The resulting sample was left for 30 minutes. Then, the peel strength of the sample was measured at a peel speed of 300 mm/min.

For evaluation, a 180-degree peeling test was conducted at a temperature of 23° C. and 50% relative humidity. The initial tackiness was evaluated on the basis of the initial tack strength according to the following criteria:
○: Tack strength of 200 g/25 mm or larger
Δ: Tack strength of 100 g/25 mm or larger and smaller than 200 g/25 mm
×: Tack strength of smaller than 100 g/25 mm (2) Low Temperature Tack The measuring apparatus used for the tack strength of tacky films obtained in Examples and Comparative Examples was a universal tensile compression tester "Technograph TGE-500N; manufactured by Minebea Co., Ltd.". A 25 mm wide sample cut out of each tacky film was laminated with a PMMA plate (arithmetic average roughness of surface: 0.1 μm), and attached thereto by moving thereon a rubber roll (diameter: 10 cm) having a weight of 2 kg, at a temperature of 23° C. and 50% relative humidity. The resulting sample was left at each of 23° C. and 4° C. for 24 hours. Then, a 180-degree peeling test was conducted at a peel speed of 300 mm/min in each of environments of 23° C. and 4° C. to measure peel strength.

The low temperature tackiness was evaluated on the basis of the tack strength at 23° C. and 4° C. according to the following criteria:
○: The tack strength (4° C.) was 80% or more of the tack strength (23° C.)
Δ: The tack strength (4° C.) was 50% or more and less than 80% of the tack strength (23° C.)
×: The tack strength (4° C.) was less than 50% of the tack strength (23° C.)

(3) Feeding Properties

Tacky films obtained in Examples and Comparative Examples were each rolled up around a 3 inch paper core such that the outer layer (paper core) and the tacky layer (tacky film) were in contact with each other. The resulting sample was mounted to a feeder and fed at a rate of 5 m/min. Smooth feeding without wrinkles, sags, and the like was visually confirmed. The feeding properties were evaluated according to the following criteria:

◯: Smoothly fed.

Δ: Smoothly fed though slightly involving wrinkles, sags, and the like.

×: Not smoothly fed.

(4) Tack Increasing Properties

The measuring apparatus used for the tack strength of tacky films obtained in Examples and Comparative Examples was a universal tensile compression tester "Technograph TGE-500N; manufactured by Minebea Co., Ltd.". A 25 mm wide sample cut out of each tacky film was laminated with a PMMA plate (arithmetic average roughness of surface: 0.1 μm), and attached thereto by moving thereon a rubber roll (diameter: 10 cm) having a weight of 2 kg, at a temperature of 23° C. and 50% relative humidity. The resulting sample was left for 30 minutes. Then, a 180-degree peeling test was conducted at a peel speed of 300 mm/min to measure peel strength (initial tack strength). Meanwhile, the prepared tacky film was laminated and attached to a PMMA plate by the method described above, then heated at 80° C. for 1 hour in a gear oven for tack acceleration, and left for 30 minutes in a measurement environment. Then, the tack strength (tack strength after acceleration by heating) was measured.

The tack increasing properties were evaluated on the basis of time-dependent change in the tack strength of the tacky film before and after heating according to the following criteria:

◯: The tack strength after acceleration by heating was within 2.0 times the initial tack strength.

Δ: The tack strength after acceleration by heating was within 2.5 times the initial tack strength.

×: The tack strength after acceleration by heating was higher than 2.5 times the initial tack strength.

<Production of Hydrogenated Block Copolymer>

Example 1

(Preparation of Hydrogenation Catalyst)

A hydrogenation catalyst used in hydrogenation reaction for a hydrogenated block copolymer was prepared by the following method: 1 L of dried and purified cyclohexane was charged into a reactor purged with nitrogen. To the reactor, 100 mmol of bis(η5-cyclopentadienyl) titanium dichloride was added, and a n-hexane solution containing 200 mmol of trimethyl aluminum was added with thorough stirring. The mixture was reacted at room temperature for 3 days.

(Preparation of Hydrogenated Block Copolymer)

Batch polymerization was performed using a tank reactor (internal volume: 10 L) equipped with a stirring device and a jacket. 1 L of cyclohexane was charged into the reactor. Then, 0.050 parts by mass of n-butyl lithium (hereinafter, also referred to as "Bu-Li") based on 100 parts by mass in total of monomers, and 0.05 mol of N,N,N',N'-tetramethylethylenediamine (hereinafter, also referred to as "TMEDA") as a vinylating agent based on 1 mol of Bu-Li were added to the reactor.

In step 1, a cyclohexane solution (butadiene concentration: 20 mass %) containing 10 parts by mass of butadiene was charged into the reactor over 10 minutes, followed by polymerization for 10 minutes. The polymerization temperature in step 1 was controlled to 65° C.

In step 2, 0.45 mol of TMEDA based on 1 mol of Bu-Li was added to the reactor, and a cyclohexane solution (butadiene concentration: 20 mass %) containing 34 parts by mass of butadiene was charged into the reactor over 30 minutes, followed by polymerization for 10 minutes. The polymerization temperature in step 2 was controlled to 65° C.

In step 3, 1.10 mol of TMEDA based on 1 mol of Bu-Li and 0.05 mol of sodium t-pentoxide (hereinafter, also referred to as "NaOAm") based on 1 mol of Bu-Li were added to the reactor, and a cyclohexane solution (butadiene concentration: 20 mass %) containing 51 parts by mass of butadiene was charged into the reactor over 30 minutes, followed by polymerization for 10 minutes. The polymerization temperature in step 3 was controlled to 60° C.

In step 4, a cyclohexane solution (styrene concentration: 20 mass %) containing 5 parts by mass of styrene was charged into the reactor over 10 minutes, followed by polymerization for 10 minutes. The polymerization temperature in step 4 was controlled to 65° C.

Each polymer was sampled in each step of a polymerization process for the block copolymer.

To the obtained block copolymer, the hydrogenation catalyst was added at a concentration of 100 ppm in terms of titanium based on 100 parts by mass of the block copolymer, followed by hydrogenation reaction at a temperature of 70° C. at a hydrogen pressure of 0.7 MPa. After subsequent addition of methanol, 0.25 parts by mass of octadecyl-3-(3,5-di-t-butyl-4-hydroxyphenyl)propionate were added as a stabilizer to the block copolymer.

The obtained hydrogenated block copolymer (a-1) had a degree of hydrogenation of 99%, MFR of 2.5 g/10 minutes, a weight average molecular weight (Mw) of 260,000, and a molecular weight distribution (Mw/Mn) of 1.08.

The results of analyzing the obtained hydrogenated block copolymer (a-1) are shown in Tables 1 and 2.

Example 2

A hydrogenated block copolymer (a-2) was produced in the same way as in (a-1) except that: in step 1, 0.01 mol of TMEDA based on 1 mol of Bu-Li was added to the reactor; and in step 2, 0.50 mol of TMEDA based on 1 mol of Bu-Li was added to the reactor.

The obtained hydrogenated block copolymer (a-2) had a degree of hydrogenation of 97%, MFR of 1.8 g/10 minutes, a weight average molecular weight (Mw) of 262,000, and a molecular weight distribution of 1.09.

The results of analyzing the obtained hydrogenated block copolymer (a-2) are shown in Tables 1 and 2.

Example 3

A hydrogenated block copolymer (a-3) was produced in the same way as in (a-1) except that: in step 1, 0.15 mol of TMEDA based on 1 mol of Bu-Li was added to the reactor; and in step 2, 0.35 mol of TMEDA based on 1 mol of Bu-Li was added to the reactor.

The obtained hydrogenated block copolymer (a-3) had a degree of hydrogenation of 98%, MFR of 3.2 g/10 minutes, a weight average molecular weight (Mw) of 259,000, and a molecular weight distribution of 1.07.

The results of analyzing the obtained hydrogenated block copolymer (a-3) are shown in Tables 1 and 2.

Example 4

A hydrogenated block copolymer (a-4) was produced in the same way as in (a-1) except that: in step 2, 0.40 mol of TMEDA based on 1 mol of Bu-Li was added to the reactor; and in step 3, 0.25 mol of TMEDA based on 1 mol of Bu-Li was added to the reactor.

The obtained hydrogenated block copolymer (a-4) had a degree of hydrogenation of 98%, MFR of 1.6 g/10 minutes, a weight average molecular weight (Mw) of 258,000, and a molecular weight distribution of 1.07.

The results of analyzing the obtained hydrogenated block copolymer (a-4) are shown in Tables 1 and 2.

Example 5

A hydrogenated block copolymer (a-5) was produced in the same way as in (a-1) except that in step 3, 1.50 mol of TMEDA based on 1 mol of Bu-Li was added to the reactor, and 0.08 mol of NaOAm based on 1 mol of Bu-Li was further added to the reactor.

The obtained hydrogenated block copolymer (a-5) had a degree of hydrogenation of 97%, MFR of 3.2 g/10 minutes, a weight average molecular weight (Mw) of 267,000, and a molecular weight distribution of 1.26.

The results of analyzing the obtained hydrogenated block copolymer (a-5) are shown in Tables 1 and 2.

Example 6

A hydrogenated block copolymer (a-6) was produced in the same way as in (a-1) except that the hydrogenation reaction was stopped in midstream.

The obtained hydrogenated block copolymer (a-6) had a degree of hydrogenation of 85%, MFR of 5.2 g/10 minutes, a weight average molecular weight (Mw) of 259,000, and a molecular weight distribution of 1.08.

The results of analyzing the obtained hydrogenated block copolymer (a-6) are shown in Tables 1 and 2.

Example 7

A hydrogenated block copolymer (a-7) was produced in the same way as in (a-1) except that: in step 2, 32 parts by mass of butadiene were charged into the reactor over 30 minutes, followed by polymerization for 10 minutes; in step 3, 48 parts by mass of butadiene were charged into the reactor over 30 minutes, followed by polymerization for 10 minutes; in step 4, 7 parts by mass of styrene were charged into the reactor over 10 minutes, followed by polymerization for 10 minutes; and in step 5, 3 parts by mass of butadiene were charged into the reactor over 5 minutes, followed by polymerization for 10 minutes.

The obtained hydrogenated block copolymer (a-7) had a degree of hydrogenation of 97%, MFR of 3.5 g/10 minutes, a weight average molecular weight (Mw) of 264,000, and a molecular weight distribution of 1.09.

The results of analyzing the obtained hydrogenated block copolymer (a-7) are shown in Tables 1 and 2.

Example 8

A hydrogenated block copolymer (a-8) was produced in the same way as in (a-1) except that: in step 1, 15 parts by mass of butadiene were charged into the reactor over 10 minutes, followed by polymerization for 10 minutes; in step 2, 31 parts by mass of butadiene were charged into the reactor over 30 minutes, followed by polymerization for 10 minutes; in step 3, 47 parts by mass of butadiene were charged into the reactor over 30 minutes, followed by polymerization for 10 minutes; and in step 4, 7 parts by mass of styrene were charged into the reactor over 10 minutes, followed by polymerization for 10 minutes.

The obtained hydrogenated block copolymer (a-8) had a degree of hydrogenation of 99%, MFR of 2.3 g/10 minutes, a weight average molecular weight (Mw) of 261,000, and a molecular weight distribution of 1.08.

The results of analyzing the obtained hydrogenated block copolymer (a-8) are shown in Tables 1 and 2.

Example 9

A hydrogenated block copolymer (a-9) was produced in the same way as in (a-1) except that: before step 1, 0.071 parts by mass of Bu-Li based on 100 parts by mass in total of monomers were added to the reactor; in step 1, 3 parts by mass of butadiene were charged into the reactor over 10 minutes, followed by polymerization for 10 minutes; in step 2, 42.5 parts by mass of butadiene were charged into the reactor over 30 minutes, followed by polymerization for 10 minutes; in step 3, 42.5 parts by mass of butadiene were charged into the reactor over 30 minutes, followed by polymerization for 10 minutes; and in step 4, 12 parts by mass of styrene were charged into the reactor over 10 minutes, followed by polymerization for 10 minutes.

The obtained hydrogenated block copolymer (a-9) had a degree of hydrogenation of 99%, MFR of 2.3 g/10 minutes, a weight average molecular weight (Mw) of 167,000, and a molecular weight distribution of 1.09.

The results of analyzing the obtained hydrogenated block copolymer (a-9) are shown in Tables 1 and 2.

Example 10

A hydrogenated block copolymer (a-10) was produced in the same way as in (a-1) except that: in step 1, 5 parts by mass of butadiene were charged into the reactor over 10 minutes, followed by polymerization for 10 minutes; in step 2, 13.5 parts by mass of butadiene were charged into the reactor over 15 minutes, followed by polymerization for 10 minutes; and in step 3, 0.90 mol of TMEDA based on 1 mol of Bu-Li was added to the reactor, and 76.5 parts by mass of butadiene were charged into the reactor over 45 minutes, followed by polymerization for 10 minutes.

The obtained hydrogenated block copolymer (a-10) had a degree of hydrogenation of 99%, MFR of 4.3 g/10 minutes, a weight average molecular weight (Mw) of 265,000, and a molecular weight distribution of 1.09.

The results of analyzing the obtained hydrogenated block copolymer (a-10) are shown in Tables 1 and 2.

Example 11

A hydrogenated block copolymer (a-11) was produced in the same way as in (a-1) except that: before step 1, 0.047 parts by mass of Bu-Li based on 100 parts by mass in total of monomers were added to the reactor; in step 1, 5 parts by mass of butadiene were charged into the reactor over 10 minutes, followed by polymerization for 10 minutes; in step 2, 0.55 mol of TMEDA based on 1 mol of Bu-Li was added to the reactor, and 55 parts by mass of butadiene were charged into the reactor over 30 minutes, followed by polymerization for 10 minutes; in step 3, 1.00 mol of TMEDA based on 1 mol of Bu-Li was added to the reactor, and 37 parts by mass of butadiene were charged into the reactor over 30 minutes, followed by polymerization for 10 minutes; and in step 4, 3 parts by mass of styrene were charged into the reactor over 10 minutes, followed by polymerization for 10 minutes.

The obtained hydrogenated block copolymer (a-11) had a degree of hydrogenation of 99%, MFR of 2.8 g/10 minutes, a weight average molecular weight (Mw) of 250,000, and a molecular weight distribution of 1.07.

The results of analyzing the obtained hydrogenated block copolymer (a-11) are shown in Tables 1 and 2.

Example 12

A hydrogenated block copolymer (a-12) was produced in the same way as in (a-1) except that: in step 1, 5 parts by mass of butadiene were charged into the reactor over 10 minutes, followed by polymerization for 10 minutes; in step 2, 0.40 mol of TMEDA based on 1 mol of Bu-Li was added to the reactor, 45 parts by mass of butadiene were charged into the reactor over 30 minutes, followed by polymerization for 10 minutes; and in step 3, 45 parts by mass of butadiene were charged into the reactor over 30 minutes, followed by polymerization for 10 minutes.

The obtained hydrogenated block copolymer (a-12) had a degree of hydrogenation of 99%, MFR of 1.8 g/10 minutes, a weight average molecular weight (Mw) of 262,000, and a molecular weight distribution of 1.07.

The results of analyzing the obtained hydrogenated block copolymer (a-12) are shown in Tables 1 and 2.

Example 13

A hydrogenated block copolymer (a-13) was produced in the same way as in (a-1) except that: before step 1, 0.042 parts by mass of Bu-Li based on 100 parts by mass in total of monomers were added to the reactor; in step 1, 0.09 mol of TMEDA based on 1 mol of Bu-Li was added to the reactor; in step 1, 2 parts by mass of butadiene were charged into the reactor over 10 minutes, followed by polymerization for 10 minutes; in step 2, 17 parts by mass of butadiene were charged into the reactor over 20 minutes, followed by polymerization for 10 minutes; in step 3, 78 parts by mass of butadiene were charged into the reactor over 60 minutes, followed by polymerization for 10 minutes; and in step 4, 3 parts by mass of styrene were charged into the reactor over 10 minutes, followed by polymerization for 10 minutes.

The obtained hydrogenated block copolymer (a-13) had a degree of hydrogenation of 97%, MFR of 6.1 g/10 minutes, a weight average molecular weight (Mw) of 289,000, and a molecular weight distribution of 1.09.

The results of analyzing the obtained hydrogenated block copolymer (a-13) are shown in Tables 1 and 2.

Example 14

A hydrogenated block copolymer (a-14) was produced in the same way as in (a-1) except that: before step 1, 0.045 parts by mass of Bu-Li based on 100 parts by mass in total of monomers were added to the reactor; in step 1, 0.02 mol of TMEDA based on 1 mol of Bu-Li was added to the reactor; in step 1, 12 parts by mass of butadiene were charged into the reactor over 10 minutes, followed by polymerization for 10 minutes; in step 2, 0.40 mol of TMEDA based on 1 mol of Bu-Li was added to the reactor, and 55 parts by mass of butadiene were charged into the reactor over 30 minutes, followed by polymerization for 10 minutes; in step 3, 1.00 mol of TMEDA based on 1 mol of Bu-Li was added to the reactor, and 31 parts by mass of butadiene were charged into the reactor over 30 minutes, followed by polymerization for 10 minutes; and in step 4, 2 parts by mass of styrene were charged into the reactor over 10 minutes, followed by polymerization for 10 minutes.

The obtained hydrogenated block copolymer (a-14) had a degree of hydrogenation of 98%, MFR of 2.9 g/10 minutes, a weight average molecular weight (Mw) of 275,000, and a molecular weight distribution of 1.08.

The results of analyzing the obtained hydrogenated block copolymer (a-14) are shown in Tables 1 and 2.

Comparative Example 1

A hydrogenated block copolymer (a-15) was produced in the same way as in (a-1) except that: step 1 was not performed; in step 2, 38 parts by mass of butadiene were charged into the reactor over 30 minutes, followed by polymerization for 10 minutes; and in step 3, 57 parts by mass of butadiene were charged into the reactor over 30 minutes, followed by polymerization for 10 minutes.

The obtained hydrogenated block copolymer (a-15) had a degree of hydrogenation of 99%, MFR of 18.6 g/10 minutes, a weight average molecular weight (Mw) of 253,000, and a molecular weight distribution of 1.11.

The results of analyzing the obtained hydrogenated block copolymer (a-15) are shown in Tables 1 and 2.

Comparative Example 2

A hydrogenated block copolymer (a-16) was produced in the same way as in (a-1) except that: before step 1, 0.054 parts by mass of Bu-Li based on 100 parts by mass in total of monomers were added to the reactor; in step 1, 25 parts by mass of butadiene were charged into the reactor over 10 minutes, followed by polymerization for 5 minutes; in step 2, 35 parts by mass of butadiene were charged into the reactor over 30 minutes, followed by polymerization for 10 minutes; and in step 3, 35 parts by mass of butadiene were charged into the reactor over 30 minutes, followed by polymerization for 10 minutes.

The obtained hydrogenated block copolymer (a-16) had a degree of hydrogenation of 99%, MFR of 1.1 g/10 minutes, a weight average molecular weight (Mw) of 226,000, and a molecular weight distribution of 1.08.

The results of analyzing the obtained hydrogenated block copolymer (a-16) are shown in Tables 1 and 2.

Comparative Example 3

A hydrogenated block copolymer (a-17) was produced in the same way as in (a-1) except that: before step 1, 0.105 parts by mass of Bu-Li based on 100 parts by mass in total of monomers were added to the reactor; in step 1, 15 parts by mass of butadiene were charged into the reactor over 10 minutes, followed by polymerization for 10 minutes; in step 2, 30 parts by mass of butadiene were charged into the reactor over 30 minutes, followed by polymerization for 10 minutes; in step 3, 30 parts by mass of butadiene were charged into the reactor over 30 minutes, followed by polymerization for 10 minutes; and in step 4, 25 parts by mass of styrene were charged into the reactor over 15 minutes, followed by polymerization for 10 minutes.

The obtained hydrogenated block copolymer (a-17) had a degree of hydrogenation of 99%, MFR of 3.1 g/10 minutes, a weight average molecular weight (Mw) of 100,000, and a molecular weight distribution of 1.09.

The results of analyzing the obtained hydrogenated block copolymer (a-17) are shown in Tables 1 and 2.

Comparative Example 4

A hydrogenated block copolymer (a-18) was produced in the same way as in (a-1) except that: before step 1, 0.040 parts by mass of Bu-Li based on 100 parts by mass in total of monomers were added to the reactor; in step 1, 15 parts by mass of butadiene were charged into the reactor over 10 minutes, followed by polymerization for 10 minutes; in step 2, 34 parts by mass of butadiene were charged into the reactor over 30 minutes, followed by polymerization for 10 minutes; in step 3, 50.5 parts by mass of butadiene were charged into the reactor over 30 minutes, followed by polymerization for 10 minutes; and in step 4, 0.5 parts by mass of styrene were charged into the reactor over 5 minutes, followed by polymerization for 5 minutes.

The obtained hydrogenated block copolymer (a-18) had a degree of hydrogenation of 99%, MFR of 25.5 g/10 minutes, a weight average molecular weight (Mw) of 308,000, and a molecular weight distribution of 1.07.

The results of analyzing the obtained hydrogenated block copolymer (a-18) are shown in Tables 1 and 2.

Comparative Example 5

A hydrogenated block copolymer (a-19) was produced in the same way as in (a-1) except that: 10 parts by mass were charged into the reactor over 10 minutes, followed by polymerization for 10 minutes; step 2 was not performed; in step 3, 1.60 mol of TMEDA based on 1 mol of Bu-Li was added to the reactor, and 85 parts by mass of butadiene were charged into the reactor over 60 minutes, followed by polymerization for 10 minutes; and in step 4, 5 parts by mass of styrene were charged into the reactor over 10 minutes, followed by polymerization for 10 minutes.

The obtained hydrogenated block copolymer (a-19) had a degree of hydrogenation of 98%, MFR of 3.2 g/10 minutes, a weight average molecular weight (Mw) of 241,000, and a molecular weight distribution of 1.06.

The results of analyzing the obtained hydrogenated block copolymer (a-19) are shown in Tables 1 and 2.

Comparative Example 6

A hydrogenated block copolymer (a-20) was produced in the same way as in (a-1) except that: in step 2, 85 parts by mass of butadiene were charged into the reactor over 60 minutes, followed by polymerization for 10 minutes; and step 3 was not performed.

The obtained hydrogenated block copolymer (a-20) had a degree of hydrogenation of 97%, MFR of 1.8 g/10 minutes, a weight average molecular weight (Mw) of 258,000, and a molecular weight distribution of 1.07.

The results of analyzing the obtained hydrogenated block copolymer (a-20) are shown in Tables 1 and 2.

Comparative Example 7

A hydrogenated block copolymer (a-21) was produced in the same way as in (a-1) except that: before step 1, 0.064 parts by mass of Bu-Li based on 100 parts by mass in total of monomers were added to the reactor; in step 1, 17 parts by mass of butadiene were charged into the reactor over 10 minutes, followed by polymerization for 5 minutes; in step 2, 0.30 mol of TMEDA based on 1 mol of Bu-Li was added to the reactor, and 62 parts by mass of butadiene were charged into the reactor over 45 minutes, followed by polymerization for 10 minutes; and in step 3, 1.25 mol of TMEDA based on 1 mol of Bu-Li was added to the reactor, and 16 parts by mass of butadiene were charged into the reactor over 15 minutes, followed by polymerization for 10 minutes.

The obtained hydrogenated block copolymer (a-21) had a degree of hydrogenation of 99%, MFR of 1.2 g/10 minutes, a weight average molecular weight (Mw) of 189,000, and a molecular weight distribution of 1.08.

The results of analyzing the obtained hydrogenated block copolymer (a-21) are shown in Tables 1 and 2.

Comparative Example 8

A hydrogenated block copolymer (a-22) was produced in the same way as in (a-1) except that: in step 1, 0.35 mol of TMEDA based on 1 mol of Bu-Li was added to the reactor; in step 2, 0.15 mol of TMEDA based on 1 mol of Bu-Li was added to the reactor, and 42.5 parts by mass of butadiene were charged into the reactor over 30 minutes, followed by polymerization for 10 minutes; and in step 3, 42.5 parts by mass of butadiene were charged into the reactor over 30 minutes, followed by polymerization for 10 minutes.

The obtained hydrogenated block copolymer (a-22) had a degree of hydrogenation of 99%, MFR of 11.8 g/10 minutes, a weight average molecular weight (Mw) of 258,000, and a molecular weight distribution of 1.06.

The results of analyzing the obtained hydrogenated block copolymer (a-22) are shown in Tables 1 and 2.

Comparative Example 9

A hydrogenated block copolymer (a-23) was produced in the same way as in (a-1) except that: in step 1, 15 parts by mass of butadiene were charged into the reactor over 10 minutes, followed by polymerization for 5 minutes; in step 2, 0.60 mol of TMEDA based on 1 mol of Bu-Li was added to the reactor, and 50 parts by mass of butadiene were charged into the reactor over 30 minutes, followed by polymerization for 10 minutes; and in step 3, 0.75 mol of TMEDA based on 1 mol of Bu-Li was added to the reactor, and 30 parts by mass of butadiene were charged into the reactor over 30 minutes, followed by polymerization for 10 minutes.

The obtained hydrogenated block copolymer (a-23) had a degree of hydrogenation of 99%, MFR of 3.2 g/10 minutes, a weight average molecular weight (Mw) of 262,000, and a molecular weight distribution of 1.09.

The results of analyzing the obtained hydrogenated block copolymer (a-23) are shown in Tables 1 and 2.

Comparative Example 10

A hydrogenated block copolymer (a-24) was produced in the same way as in (a-1) except that: before step 1, 0.064 parts by mass of Bu-Li based on 100 parts by mass in total of monomers were added to the reactor; in step 2, 0.40 mol of TMEDA based on 1 mol of Bu-Li was added to the reactor, and 42.5 parts by mass of butadiene were charged into the reactor over 30 minutes, followed by polymerization for 10 minutes; and in step 3, 0.15 mol of TMEDA based on 1 mol of Bu-Li was added to the reactor, and 42.5 parts by mass of butadiene were charged into the reactor over 30 minutes, followed by polymerization for 10 minutes.

The obtained hydrogenated block copolymer (a-24) had a degree of hydrogenation of 99%, MFR of 2.0 g/10 minutes, a weight average molecular weight (Mw) of 184,000, and a molecular weight distribution of 1.05.

The results of analyzing the obtained hydrogenated block copolymer (a-24) are shown in Tables 1 and 2.

Comparative Example 11

A hydrogenated block copolymer (a-25) was produced in the same way as in (a-1) except that: in step 2, 42.5 parts by mass of butadiene were charged into the reactor over 30 minutes, followed by polymerization for 10 minutes; in step 3, 42.5 parts by mass of butadiene were charged into the reactor over 30 minutes, followed by polymerization for 10 minutes; and the subsequent hydrogenation reaction was stopped in midstream.

The obtained hydrogenated block copolymer (a-25) had a degree of hydrogenation of 60%, MFR of 38.8 g/10 minutes, a weight average molecular weight (Mw) of 265,000, and a molecular weight distribution of 1.05.

The results of analyzing the obtained hydrogenated block copolymer (a-25) are shown in Tables 1 and 2.

Comparative Example 12

A hydrogenated block copolymer (a-26) was produced in the same way as in (a-1) except that: before step 1, 0.065 parts by mass of Bu-Li based on 100 parts by mass in total of monomers were added to the reactor; in step 1, 8 parts by mass of styrene were charged into the reactor over 10 minutes, followed by polymerization for 10 minutes; in step 2, 0.55 mol of TMEDA based on 1 mol of Bu-Li was added to the reactor, and 42 parts by mass of butadiene were charged into the reactor over 30 minutes, followed by polymerization for 10 minutes; in step 3, 0.80 mol of TMEDA based on 1 mol of Bu-Li was added to the reactor, and 42 parts by mass of butadiene were charged into the reactor over 30 minutes, followed by polymerization for 10 minutes; and in step 4, 8 parts by mass of styrene were charged into the reactor over 10 minutes, followed by polymerization for 10 minutes.

The obtained hydrogenated block copolymer (a-26) had a degree of hydrogenation of 99%, MFR of 4.4 g/10 minutes, a weight average molecular weight (Mw) of 184,000, and a molecular weight distribution of 1.07.

The results of analyzing the obtained hydrogenated block copolymer (a-26) are shown in Tables 1 and 2.

Comparative Example 13

A hydrogenated block copolymer (a-27) was produced in the same way as in (a-1) except that: before step 1, 0.035 parts by mass of Bu-Li based on 100 parts by mass in total of monomers were added to the reactor; in step 1, 10 parts by mass of butadiene were charged into the reactor over 10 minutes, followed by polymerization for 10 minutes; in step 2, 30 parts by mass of butadiene were charged into the reactor over 30 minutes, followed by polymerization for 10 minutes; in step 3, 60 parts by mass of butadiene were charged into the reactor over 45 minutes, followed by polymerization for 10 minutes; and step 4 was not performed.

The obtained hydrogenated block copolymer (a-27) had a degree of hydrogenation of 98%, MFR of 0/9 g/10 minutes, a weight average molecular weight (Mw) of 408,000, and a molecular weight distribution of 1.21.

The results of analyzing the obtained hydrogenated block copolymer (a-27) are shown in Tables 1 and 2.

Comparative Example 14

A hydrogenated block copolymer (a-28) was produced in the same way as in (a-1) except that: before step 1, 0.035 parts by mass of Bu-Li based on 100 parts by mass in total of monomers were added to the reactor; in step 1, 10 parts by mass of butadiene were charged into the reactor over 10 minutes, followed by polymerization for 10 minutes; in step 2, 60 parts by mass of butadiene were charged into the reactor over 45 minutes, followed by polymerization for 10 minutes; in step 3, 30 parts by mass of butadiene were charged into the reactor over 30 minutes, followed by polymerization for 10 minutes; and step 4 was not performed.

The obtained hydrogenated block copolymer (a-28) had a degree of hydrogenation of 97%, MFR of 0.6 g/10 minutes, a weight average molecular weight (Mw) of 403,000, and a molecular weight distribution of 1.23.

The results of analyzing the obtained hydrogenated block copolymer (a-28) are shown in Tables 1 and 2.

TABLE 1

| | | Block structural composition (mass %) | | | | | | Soft | Hard | Amount of vinyl bond before hydrogenation (mol %) | | | | Butylene/propylene content (mol %) | Degree of hydrogenation (mol %) |
|---|---|---|---|---|---|---|---|---|---|---|---|---|---|---|---|
| | | S | C | B1 | B2 | S | B3 | B1 + B2 + B3 | S + C | C | B1 | B2 | B3 | | |
| Example 1 | a-1 | | 10 | 34 | 51 | 5 | | 85 | 15 | 15 | 50 | 85 | | 65.1 | 99 |
| Example 2 | a-2 | | 10 | 34 | 51 | 5 | | 85 | 15 | 6 | 50 | 85 | | 64.2 | 97 |
| Example 3 | a-3 | | 10 | 34 | 51 | 5 | | 85 | 15 | 24 | 50 | 85 | | 66.1 | 98 |
| Example 4 | a-4 | | 7 | 34 | 51 | 5 | | 85 | 12 | 15 | 42 | 64 | | 52.1 | 98 |
| Example 5 | a-5 | | 10 | 34 | 51 | 5 | | 85 | 15 | 15 | 50 | 92 | | 68.9 | 97 |
| Example 6 | a-6 | | 10 | 34 | 51 | 5 | | 85 | 15 | 15 | 50 | 85 | | 65.1 | 85 |
| Example 7 | a-7 | | 10 | 32 | 48 | 7 | 3 | 83 | 17 | 15 | 50 | 85 | 83 | 65.4 | 97 |
| Example 8 | a-8 | | 15 | 31 | 47 | 7 | | 78 | 22 | 15 | 50 | 85 | | 62.0 | 99 |
| Example 9 | a-9 | | 3 | 42.5 | 42.5 | 12 | | 85 | 15 | 15 | 55 | 85 | | 68.1 | 99 |
| Example 10 | a-10 | | 5 | 13.5 | 76.5 | 5 | | 90 | 10 | 15 | 50 | 70 | | 64.3 | 99 |
| Example 11 | a-11 | | 5 | 55 | 37 | 3 | | 92 | 8 | 15 | 60 | 88 | | 68.4 | 99 |
| Example 12 | a-12 | | 5 | 45 | 45 | 5 | | 90 | 10 | 15 | 40 | 88 | | 61.4 | 99 |
| Example 13 | a-13 | | 2 | 17 | 78 | 3 | | 95 | 5 | 20 | 55 | 85 | | 78.4 | 97 |
| Example 14 | a-14 | | 12 | 55 | 31 | 2 | | 86 | 14 | 7 | 41 | 68 | | 45.4 | 98 |
| Comparative Example 1 | a-15 | | 0 | 38 | 57 | 5 | | 95 | 5 | 0 | 50 | 85 | | 71.0 | 99 |

TABLE 1-continued

| | | Block structural composition (mass %) | | | | | Soft B1 + B2 + B3 | Hard S + C | Amount of vinyl bond before hydrogenation (mol %) | | | | Butylene/propylene content (mol %) | Degree of hydrogenation (mol %) |
|---|---|---|---|---|---|---|---|---|---|---|---|---|---|---|
| | | S | C | B1 | B2 | S B3 | | | C | B1 | B2 | B3 | | |
| Comparative Example 2 | a-16 | | 25 | 35 | 35 | 5 | 70 | 30 | 15 | 50 | 80 | | 51.8 | 99 |
| Comparative Example 3 | a-17 | | 15 | 30 | 30 | 25 | 60 | 40 | 15 | 50 | 80 | | 55.0 | 99 |
| Comparative Example 4 | a-18 | | 15 | 34 | 50.5 | 0.5 | 84.5 | 15.5 | 15 | 50 | 85 | | 62.5 | 99 |
| Comparative Example 5 | a-19 | | 10 | 0 | 85 | 5 | 85 | 15 | 15 | 0 | 85 | | 77.6 | 98 |
| Comparative Example 6 | a-20 | | 10 | 85 | 0 | 5 | 85 | 15 | 10 | 45 | 0 | | 41.3 | 97 |
| Comparative Example 7 | a-21 | | 17 | 62 | 16 | 5 | 78 | 22 | 15 | 35 | 75 | | 38.2 | 99 |
| Comparative Example 8 | a-22 | | 10 | 42.5 | 42.5 | 5 | 85 | 15 | 37 | 50 | 80 | | 62.1 | 99 |
| Comparative Example 9 | a-23 | | 15 | 50 | 30 | 5 | 80 | 20 | 15 | 65 | 75 | | 60.3 | 99 |
| Comparative Example 10 | a-24 | | 10 | 42.5 | 42.5 | 5 | 85 | 15 | 15 | 40 | 58 | | 45.4 | 99 |
| Comparative Example 11 | a-25 | | 10 | 42.5 | 42.5 | 5 | 85 | 15 | 15 | 50 | 80 | | 47.8 | 60 |
| Comparative Example 12 | a-26 | 8 | 0 | 42 | 42 | 8 | 84 | 16 | 0 | 50 | 80 | | 65.0 | 99 |
| Comparative Example 13 | a-27 | | 10 | 30 | 60 | 0 | 90 | 10 | 14 | 40 | 80 | | 61.4 | 98 |
| Comparative Example 14 | a-28 | | 10 | 60 | 30 | 0 | 90 | 10 | 15 | 40 | 80 | | 49.5 | 97 |

TABLE 2

| | | DSC measurement | | TGIC | | | | | 13C-NMR Integrated value of 29.4 to 30.0 ppm/ integrated value of 9 to 14 ppm | | | | |
|---|---|---|---|---|---|---|---|---|---|---|---|---|---|
| | | Crystallization temperature (° C.) | Heat of crystallization (J/g) | width at half height (° C.) | Tan δ height (—) | Shore A hardness | Formula (1) | Formula (2) | | Tg 1 (° C.) | ΔTg (° C.) | Microphase separation |
| Example 1 | a-1 | 41.0 | 4.5 | 24.5 | 1.34 | 47 | 0.39 | 1.07 | 0.59 | −39 | 8.9 | ○ |
| Example 2 | a-2 | 63.5 | 6.6 | 21.1 | 1.31 | 53 | 0.38 | 1.05 | 0.59 | −40 | 9.2 | ○ |
| Example 3 | a-3 | 12.5 | 2.1 | 26.9 | 1.36 | 39 | 0.38 | 1.06 | 0.58 | −37 | 8.6 | ○ |
| Example 4 | a-4 | 42.1 | 4.4 | 20.4 | 1.15 | 57 | 0.37 | 1.05 | 0.57 | −43 | 3.4 | ○ |
| Example 5 | a-5 | 39.4 | 4.1 | 39.3 | 1.37 | 41 | 0.39 | 1.07 | 0.59 | −35 | 10.1 | ○ |
| Example 6 | a-6 | 16.1 | 1.1 | 30.4 | 1.30 | 39 | 0.37 | 1.06 | 0.59 | −44 | 9.5 | ○ |
| Example 7 | a-7 | 40.5 | 4.3 | 25.5 | 1.34 | 43 | 0.39 | 1.06 | 0.57 | −38 | 9.4 | ○ |
| Example 8 | a-8 | 48.5 | 7.0 | 21.0 | 1.30 | 54 | 0.50 | 1.21 | 0.77 | −38 | 9.7 | ○ |
| Example 9 | a-9 | 9.0 | 1.5 | 32.0 | 1.35 | 57 | 0.31 | 0.96 | 0.49 | −38 | 7.8 | ○ |
| Example 10 | a-10 | 19.5 | 1.9 | 27.0 | 1.41 | 40 | 0.42 | 1.11 | 0.56 | −32 | 7.4 | ○ |
| Example 11 | a-11 | 18.5 | 2.0 | 30.5 | 1.39 | 42 | 0.30 | 0.95 | 0.50 | −44 | 5.5 | ○ |
| Example 12 | a-12 | 21.0 | 2.3 | 33.5 | 1.28 | 46 | 0.53 | 1.25 | 0.74 | −43 | 6.8 | ○ |
| Example 13 | a-13 | −12.2 | 0.5 | 39.6 | 1.57 | 18 | 0.45 | 1.16 | 0.58 | −33 | 2.8 | ○ |
| Example 14 | a-14 | 79.1 | 9.6 | 20.2 | 1.09 | 55 | 0.28 | 0.93 | 0.47 | −44 | 9.3 | X |
| Comparative Example 1 | a-15 | Not detected | 0.0 | Not detected | 1.35 | 14 | 0.24 | 0.87 | 0.17 | −37 | 7.9 | ○ |
| Comparative Example 2 | a-16 | 80.5 | 10.3 | 18.5 | 1.31 | 61 | 1.08 | 1.94 | 1.50 | −41 | 10.3 | ○ |
| Comparative Example 3 | a-17 | 47.5 | 6.9 | 21.5 | 1.33 | 67 | 0.86 | 1.66 | 0.73 | −40 | 12.2 | X |
| Comparative Example 4 | a-18 | 48.0 | 7.2 | 20.0 | 1.32 | 13 | 0.49 | 1.19 | 0.75 | −35 | 8.7 | X |
| Comparative Example 5 | a-19 | 11.5 | 1.3 | 25.0 | 1.82 | 38 | 0.10 | 0.64 | 0.14 | −30 | −3.5 | ○ |
| Comparative Example 6 | a-20 | 55.3 | 5.5 | 14.5 | 1.01 | 62 | 0.13 | 0.67 | 0.16 | −52 | 10.1 | ○ |
| Comparative Example 7 | a-21 | 53.0 | 9.1 | 19.0 | 1.04 | 55 | 2.87 | 4.03 | 2.44 | −46 | 8.2 | ○ |
| Comparative Example 8 | a-22 | Not detected | 0.0 | Not detected | 1.30 | 29 | 0.50 | 1.21 | 0.35 | −34 | 8.8 | ○ |

TABLE 2-continued

| | | DSC measurement | | TGIC | | | | 13C-NMR Integrated value of 29.4 to 30.0 ppm/ integrated value of 9 to 14 ppm | | | |
|---|---|---|---|---|---|---|---|---|---|---|---|
| | | Crystal- lization temperature (° C.) | Heat of crystal- lization (J/g) | width at half height (° C.) | Tan δ height (—) | Shore A hardness | Formula (1) | Formula (2) | Tg 1 (° C.) | ΔTg (° C.) | Microphase separation |
| Comparative Example 9 | a-23 | 39.5 | 4.1 | 19.5 | 1.45 | 43 | 0.58 | 1.31 | 0.95 | −41 | 2.8 | ○ |
| Comparative Example 10 | a-24 | 41.5 | 7.1 | 15.5 | 1.03 | 61 | 1.72 | 2.69 | 1.67 | −47 | 12.1 | ○ |
| Comparative Example 11 | a-25 | Not detected | 0.0 | Not detected | 1.25 | 31 | 1.45 | 2.38 | 1.50 | −49 | 12.5 | X |
| Comparative Example 12 | a-26 | Not detected | 0.0 | Not detected | 1.29 | 63 | 0.40 | 1.08 | 0.35 | −38 | 10.8 | X |
| Comparative Example 13 | a-27 | 38.3 | 5.1 | 27.9 | 1.48 | 11 | 0.38 | 1.05 | 0.57 | −32 | 8.5 | X |
| Comparative Example 14 | a-28 | 37.8 | 5.2 | 22.2 | 1.44 | 23 | 0.31 | 0.95 | 0.51 | −47 | 9.3 | X |

<Production of Polypropylene Resin Composition and Sheet-Shaped Molded Body (Tables 3 and 4)>
<Polypropylene Resin>
The following polypropylene resins were used in Examples and Comparative Examples.
PP (A): propylene-ethylene random copolymer ("PC630A" (trade name), manufactured by SunAllomer Ltd., MFR=6.8 g/10 minutes)
PP (B): propylene-ethylene random copolymer ("PM931M" (trade name), manufactured by SunAllomer Ltd., MFR=25.1 g/10 minutes)
PP (C): propylene homopolymer ("PL500A" (trade name), manufactured by SunAllomer Ltd., MFR=3.0 g/10 minutes)

Examples 2-1 to 2-19 and Comparative Examples 2-1 to 2-14

Each of the hydrogenated block copolymers (a-1) to (a-28) of Examples 1 to 14 and Comparative Examples 1 to 14 was dry-blended with the polypropylene resin at the ratio (indicated by part by mass) shown in Tables 3 and 4, and the blend was melt-kneaded under conditions involving 200° C., 150 rpm, and an extrusion output of 5 Kg/h using a twin-screw extruder (L/D=42, 30 mmϕ) to produce pellets of the polypropylene resin composition.

The sheet-shaped molded bodies of Examples 2-1 to 2-19 and Comparative Examples 2-1 to 2-14 were prepared as described below, and each physical property was measured. Specifically, the polypropylene resin composition pellets were applied to a T-die in a single-screw sheet extruder (40 mmϕ) under conditions involving a resin temperature of 200° C., the number of screw revolutions of 30 rpm, a T-die lip opening of 0.5 mm, a T-die slit width of 400 mm, a roller surface temperature of 45° C., and a take-up rate of 3 m/min to prepare sheet-shaped molded bodies having a thickness of approximately 250 μm. The thickness was adjusted by changing the number of screw revolutions, the extrusion output, the take-up rate, etc. The obtained evaluation results are shown in Tables 3 and 4. Specifically, each physical property was evaluated on a scale of 1 to 5, and the balance among the physical properties was evaluated.

TABLE 3

| | | | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 | 2-17 | 2-18 | 2-19 |
|---|---|---|---|---|---|---|---|---|---|---|---|---|---|---|---|---|---|---|---|---|---|
| Material composition | Polypropylene resin | PP(A) | 70 | 70 | 70 | 70 | 70 | 70 | 70 | 70 | 70 | 70 | 70 | 70 | 70 | 70 | 70 | | | | |
| | | PP(B) | | | | | | | | | | | | | | | | 60 | 20 | | |
| | | PP(C) | | | | | | | | | | | | | | | | 40 | 80 | 80 | 20 |
| | Hydrogenated block copolymer | a-1 | 30 | | | | | | | | | | | | | | | | | | |
| | | a-2 | | 30 | | | | | | | | | | | | | | | | | |
| | | a-3 | | | 30 | | | | | | | | | | | | | | | | |
| | | a-4 | | | | 30 | | | | | | | | | | | | | | | |
| | | a-5 | | | | | 30 | | | | | | | | | | | | | | |
| | | a-6 | | | | | | 30 | | | | | | | | | | | | | |
| | | a-7 | | | | | | | 30 | | | | | | | | | | | | |
| | | a-8 | | | | | | | | 30 | | | | | | | | | | | |
| | | a-9 | | | | | | | | | 30 | | | | | | | | | | |
| | | a-10 | | | | | | | | | | 30 | | | | | | | | | |
| | | a-11 | | | | | | | | | | | 30 | | | | | | | | |
| | | a-12 | | | | | | | | | | | | 30 | | | | | | | |
| | | a-13 | | | | | | | | | | | | | 30 | | | | | | |
| | | a-14 | | | | | | | | | | | | | | 30 | | | | | |
| | | a-15 | | | | | | | | | | | | | | | 30 | 30 | | | |
| | | a-16 | | | | | | | | | | | | | | | | | | | |
| | | a-17 | | | | | | | | | | | | | | | | | | | |
| | | a-18 | | | | | | | | | | | | | | | | | | | |
| | | a-19 | | | | | | | | | | | | | | | | | | | |
| | | a-20 | | | | | | | | | | | | | | | | | | | |
| | | a-21 | | | | | | | | | | | | | | | | | | | |
| | | a-22 | | | | | | | | | | | | | | | | | | | |
| | | a-23 | | | | | | | | | | | | | | | | | | | |
| | | a-24 | | | | | | | | | | | | | | | | | | | |
| | | a-25 | | | | | | | | | | | | | | | | | | | |
| | | a-26 | | | | | | | | | | | | | | | | | | | |
| | | a-27 | | | | | | | | | | | | | | | | | | | |
| | | a-28 | | | | | | | | | | | | | | | | | | | |
| | WAXD ($I(14)/I(15)$) | | 0.98 | 1.05 | 0.95 | 1.26 | 0.93 | 1.18 | 1.01 | 1.09 | 1.23 | 0.83 | 1.05 | 1.13 | 0.96 | 0.85 | 1.11 | 1.22 | 0.73 | 0.51 | 1.28 |
| CFC (area %) | | −20° C. or lower | 5.7 | 6.0 | 5.8 | 7.1 | 5.5 | 5.6 | 4.3 | 3.3 | 8.2 | 6.8 | 7.1 | 7.3 | 8.9 | 3.6 | 4.9 | 5.1 | 4.4 | 6.1 | 3.5 |
| | | Higher than −20° C. and lower than 60° C. | 29.0 | 28.3 | 28.1 | 26.7 | 28.0 | 28.1 | 29.6 | 29.5 | 24.7 | 27.0 | 26.6 | 28.8 | 25.0 | 29.8 | 29.0 | 39.4 | 42.7 | 83.7 | 19.8 |
| | | 60° C. or higher and 150° C. or lower | 65.3 | 65.7 | 66.1 | 66.2 | 66.5 | 66.3 | 66.1 | 67.2 | 67.1 | 66.2 | 66.3 | 63.9 | 66.1 | 66.6 | 66.1 | 55.5 | 52.9 | 10.2 | 76.7 |
| Performance evaluation | Sheet-shaped molded body | Impact resistance | 5 | 5 | 4 | 5 | 5 | 5 | 5 | 5 | 5 | 2 | 5 | 5 | 2 | 5 | 5 | 5 | 5 | 5 | 3 |
| | | Flexibility | 5 | 5 | 5 | 2 | 5 | 3 | 5 | 2 | 2 | 5 | 3 | 3 | 5 | 2 | 4 | 3 | 5 | 5 | 3 |
| | | Transparency | 5 | 5 | 5 | 5 | 5 | 5 | 5 | 5 | 2 | 5 | 4 | 5 | 2 | 3 | 3 | 5 | 5 | 5 | 3 |
| | | Low stickiness | 5 | 5 | 2 | 5 | 4 | 2 | 4 | 5 | 5 | 3 | 4 | 2 | 3 | 3 | 5 | 3 | 3 | 2 | 5 |

TABLE 4

| | | | Comparative Example | | | | | | | | | | | | | |
|---|---|---|---|---|---|---|---|---|---|---|---|---|---|---|---|---|
| | | | 2-1 | 2-2 | 2-3 | 2-4 | 2-5 | 2-6 | 2-7 | 2-8 | 2-9 | 2-10 | 2-11 | 2-12 | 2-13 | 2-14 |
| Material composition | Polypropylene resin | PP(A) | 70 | 70 | 70 | 70 | 70 | 70 | 70 | 70 | 70 | 70 | 70 | 70 | 70 | 70 |
| | | PP(B) | | | | | | | | | | | | | | |
| | | PP(C) | | | | | | | | | | | | | | |
| | Hydrogenated block copolymer | a-1 | | | | | | | | | | | | | | |
| | | a-2 | | | | | | | | | | | | | | |
| | | a-3 | | | | | | | | | | | | | | |
| | | a-4 | | | | | | | | | | | | | | |
| | | a-5 | | | | | | | | | | | | | | |
| | | a-6 | | | | | | | | | | | | | | |
| | | a-7 | | | | | | | | | | | | | | |
| | | a-8 | | | | | | | | | | | | | | |
| | | a-9 | | | | | | | | | | | | | | |
| | | a-10 | | | | | | | | | | | | | | |
| | | a-11 | | | | | | | | | | | | | | |
| | | a-12 | | | | | | | | | | | | | | |
| | | a-13 | | | | | | | | | | | | | | |
| | | a-14 | | | | | | | | | | | | | | |
| | | a-15 | 30 | | | | | | | | | | | | | |
| | | a-16 | | 30 | | | | | | | | | | | | |
| | | a-17 | | | 30 | | | | | | | | | | | |
| | | a-18 | | | | 30 | | | | | | | | | | |
| | | a-19 | | | | | 30 | | | | | | | | | |
| | | a-20 | | | | | | 30 | | | | | | | | |
| | | a-21 | | | | | | | 30 | | | | | | | |
| | | a-22 | | | | | | | | 30 | | | | | | |
| | | a-23 | | | | | | | | | 30 | | | | | |
| | | a-24 | | | | | | | | | | 30 | | | | |
| | | a-25 | | | | | | | | | | | 30 | | | |
| | | a-26 | | | | | | | | | | | | 30 | | |
| | | a-27 | | | | | | | | | | | | | 30 | |
| | | a-28 | | | | | | | | | | | | | | 30 |
| WAXD (I(14)/I(15)) | | | Not moldable | 1.29 | 1.47 | 1.12 | 0.65 | 1.30 | 1.22 | 0.92 | 0.77 | 1.33 | 1.24 | 1.79 | 0.91 | 0.95 |
| CFC (area %) | −20° C. or lower | | | 5.3 | 6.1 | 5.7 | 4.1 | 4.1 | 4.4 | 4.8 | 5.2 | 5.1 | 6.9 | 27.9 | 4.3 | 4.2 |
| | Higher than −20° C. and lower than 60° C. | | | 28.1 | 26.7 | 27.2 | 30.6 | 30.8 | 29.7 | 28.8 | 30.9 | 30.1 | 26.0 | 6.6 | 29.7 | 29.0 |
| | 60° C. or higher and 150° C. or lower | | | 66.6 | 67.2 | 67.1 | 65.3 | 65.1 | 65.9 | 66.4 | 63.9 | 64.8 | 67.1 | 65.5 | 66.0 | 66.8 |
| Performance evaluation | Sheet-shaped molded body | Impact resistance | | 5 | 5 | 2 | 1 | 5 | 5 | 4 | 1 | 5 | 3 | 5 | 2 | 2 |
| | | Flexibility | | 1 | 1 | 2 | 5 | 1 | 1 | 5 | 5 | 1 | 1 | 1 | 5 | 2 |
| | | Transparency | | 1 | 1 | 2 | 5 | 1 | 1 | 5 | 5 | 1 | 1 | 1 | 5 | 2 |
| | | Low stickiness | | 5 | 5 | 1 | 2 | 5 | 5 | 1 | 3 | 5 | 1 | 5 | 1 | 1 |

As seen from Tables 3 and 4, the sheets obtained by molding the polypropylene resin compositions comprising the hydrogenated block copolymers that satisfied the requirements of the present embodiment were free from "1" in all the items and were evaluated as being excellent in the balance among low temperature impact resistance, flexibility, transparency, and low stickiness. On the other hand, the sheets obtained by molding the polypropylene resin compositions comprising the hydrogenated block copolymers that did not satisfy the requirements of the present embodiment got x in at least any one of the items and were evaluated as being inferior in the balance among low temperature impact resistance, flexibility, transparency, and low stickiness.

Two-Layer Film [Examples 3-1 to 3-14 and Comparative Examples 3-1 to 3-14]

[Polypropylene Resin]

The polypropylene resin used was PP-1 given below. MFR given below was measured at 230° C. under a load of 2160 g.

PP-1: random

Novatec MF3FQ (manufactured by Japan Polypropylene Corp., MFR: 8.0 g/10 minutes)

The materials shown in Tables 5 and 6 were molded by coextrusion under conditions involving an extrusion temperature of 230° C. and a die temperature of 250° C. using a multi-layer extruder (manufactured by Research Laboratory of Plastics Technology Co., Ltd., PLABOR) such that two layers shown in Tables 5 and 6 were laminated in the order shown in Tables 5 and 6 (layer 1 and layer 2) to obtain a two-layer film having a thickness of 0.17 mm.

TABLE 5

|  |  |  | Example 3-1 | Example 3-2 | Example 3-3 | Example 3-4 | Example 3-5 | Example 3-6 | Example 3-7 |
|---|---|---|---|---|---|---|---|---|---|
| Layer 1 | Polypropylene | Type | PP-1 | PP-1 | PP-1 | PP-1 | PP-1 | PP-1 | PP-1 |
|  |  | Content (wt %) | 80 | 80 | 80 | 80 | 80 | 80 | 80 |
|  | Hydrogenated block copolymer | Type | a-1 | a-2 | a-3 | a-4 | a-5 | a-6 | a-7 |
|  |  | Content (wt %) | 20 | 20 | 20 | 20 | 20 | 20 | 20 |
|  |  | Thickness (μm) | 20 | 20 | 20 | 20 | 20 | 20 | 20 |
| Layer 2 | Polypropylene | Type | PP-1 | PP-1 | PP-1 | PP-1 | PP-1 | PP-1 | PP-1 |
|  |  | Content (wt %) | 60 | 60 | 60 | 60 | 60 | 60 | 60 |
|  | Hydrogenated block copolymer | Type | a-1 | a-2 | a-3 | a-4 | a-5 | a-6 | a-7 |
|  |  | Content (wt %) | 40 | 40 | 40 | 40 | 40 | 40 | 40 |
|  |  | Thickness (μm) | 150 | 150 | 150 | 150 | 150 | 150 | 150 |
| Property of film |  | Flexibility | ⊚ | ⊚ | ⊚ | ○ | ⊚ | Δ | ⊚ |
|  |  | Transparency | ⊚ | ⊚ | ⊚ | ○ | ⊚ | Δ | ⊚ |
|  |  | Low stickiness | ⊚ | ⊚ | Δ | ⊚ | Δ | Δ | ○ |
|  |  | Impact resistance | ⊚ | ⊚ | ○ | ⊚ | ⊚ | ⊚ | ⊚ |
| CFC area % |  | −20° C. or lower | 6.1 | 6.0 | 6.2 | 7.2 | 5.9 | 6.0 | 3.1 |
|  |  | Higher than −20° C. and lower than 60° C. | 34.6 | 34.7 | 34.8 | 26.7 | 34.6 | 34.8 | 35.8 |
|  |  | 60° C. or higher and 150° C. or lower | 59.2 | 59.3 | 59.0 | 66.1 | 59.5 | 59.2 | 61.1 |

|  |  |  | Example 3-8 | Example 3-9 | Example 3-10 | Example 3-11 | Example 3-12 | Example 3-13 | Example 3-14 |
|---|---|---|---|---|---|---|---|---|---|
| Layer 1 | Polypropylene | Type | PP-1 | PP-1 | PP-1 | PP-1 | PP-1 | PP-1 | PP-1 |
|  |  | Content (wt %) | 80 | 80 | 80 | 80 | 80 | 80 | 80 |
|  | Hydrogenated block copolymer | Type | a-8 | a-9 | a-10 | a-11 | a-12 | a-13 | a-14 |
|  |  | Content (wt %) | 20 | 20 | 20 | 20 | 20 | 20 | 20 |
|  |  | Thickness (μm) | 20 | 20 | 20 | 20 | 20 | 20 | 20 |
| Layer 2 | Polypropylene | Type | PP-1 | PP-1 | PP-1 | PP-1 | PP-1 | PP-1 | PP-1 |
|  |  | Content (wt %) | 60 | 60 | 60 | 60 | 60 | 60 | 60 |
|  | Hydrogenated block copolymer | Type | a-8 | a-9 | a-10 | a-11 | a-12 | a-13 | a-14 |
|  |  | Content (wt %) | 40 | 40 | 40 | 40 | 40 | 40 | 40 |
|  |  | Thickness (μm) | 150 | 150 | 150 | 150 | 150 | 150 | 150 |
| Property of film |  | Flexibility | Δ | Δ | ⊚ | ○ | ○ | ⊚ | Δ |
|  |  | Transparency | ○ | Δ | ⊚ | ○ | ○ | ⊚ | Δ |
|  |  | Low stickiness | X | ⊚ | ○ | Δ | ⊚ | Δ | ⊚ |
|  |  | Impact resistance | ○ | ○ | Δ | ⊚ | ⊚ | Δ | ⊚ |
| CFC area % |  | −20° C. or lower | 8.5 | 6.1 | 6.8 | 3.4 | 7.8 | 8.4 | 3.3 |
|  |  | Higher than −20° C. and lower than 60° C. | 35.4 | 36.5 | 34.6 | 36.1 | 34.3 | 35.5 | 35.9 |
|  |  | 60° C. or higher and 150° C. or lower | 56.1 | 57.4 | 58.6 | 60.5 | 58.0 | 56.1 | 60.8 |

TABLE 6

|  |  |  | Comparative Example 3-1 | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|---|---|
| Layer 1 | Polypropylene | Type | PP-1 | PP-1 | PP-1 | PP-1 | PP-1 | PP-1 | PP-1 |
|  |  | Content (wt %) | 80 | 80 | 80 | 80 | 80 | 80 | 80 |
|  | Hydrogenated block copolymer | Type | a-15 | a-16 | a-17 | a-18 | a-19 | a-20 | a-21 |
|  |  | Content (wt %) | 20 | 20 | 20 | 20 | 20 | 20 | 20 |
|  |  | Thickness (μm) | 20 | 20 | 20 | 20 | 20 | 20 | 20 |
| Layer 2 | Polypropylene | Type | PP-1 | PP-1 | PP-1 | PP-1 | PP-1 | PP-1 | PP-1 |
|  |  | Content (wt %) | 60 | 60 | 60 | 60 | 60 | 60 | 60 |
|  | Hydrogenated block copolymer | Type | a-15 | a-16 | a-17 | a-18 | a-19 | a-20 | a-21 |
|  |  | Content (wt %) | 40 | 40 | 40 | 40 | 40 | 40 | 40 |
|  |  | Thickness (μm) | 150 | 150 | 150 | 150 | 150 | 150 | 150 |
| Property of film |  | Flexibility | Not moldable | X | X | ⊚ | ⊚ | X | X |
|  |  | Transparency |  | X | X | ⊚ | ⊚ | X | X |
|  |  | Low stickiness |  | ⊚ | ⊚ | X | Δ | ⊚ | ⊚ |
|  |  | Impact resistance |  | ⊚ | ○ | X | ⊚ | ⊚ | ⊚ |
| CFC area % |  | −20° C. or lower |  | 4.5 | 6.0 | 8.6 | 4.5 | 5.5 | 6.9 |
|  |  | Higher than −20° C. and lower than 60° C. |  | 35.0 | 35.4 | 34.6 | 35.0 | 35.0 | 35.8 |
|  |  | 60° C. or higher and 150° C. or lower |  | 60.5 | 58.6 | 56.7 | 60.5 | 59.5 | 57.4 |

TABLE 6-continued lower

|  |  |  | Comparative Example 3-8 | Comparative Example 3-9 | Comparative Example 3-10 | Comparative Example 3-11 | Comparative Example 3-12 | Comparative Example 3-13 | Comparative Example 3-14 |
|---|---|---|---|---|---|---|---|---|---|
| Layer 1 | Polypropylene | Type | PP-1 | PP-1 | PP-1 | PP-1 | PP-1 | PP-1 | PP-1 |
|  |  | Content (wt %) | 80 | 80 | 80 | 80 | 80 | 80 | 80 |
|  | Hydrogenated block copolymer | Type | a-22 | a-23 | a-24 | a-25 | a-26 | a-27 | a-28 |
|  |  | Content (wt %) | 20 | 20 | 20 | 20 | 20 | 20 | 20 |
|  |  | Thickness (μm) | 20 | 20 | 20 | 20 | 20 | 20 | 20 |
| Layer 2 | Polypropylene | Type | PP-1 | PP-1 | PP-1 | PP-1 | PP-1 | PP-1 | PP-1 |
|  |  | Content (wt %) | 60 | 60 | 60 | 60 | 60 | 60 | 60 |
|  | Hydrogenated block copolymer | Type | a-22 | a-23 | a-24 | a-25 | a-26 | a-27 | a-28 |
|  |  | Content (wt %) | 40 | 40 | 40 | 40 | 40 | 40 | 40 |
|  |  | Thickness (μm) | 150 | 150 | 150 | 150 | 150 | 150 | 150 |
| Property of film |  | Flexibility | ⊚ | ○ | ⊚ | X | Δ | ○ | Δ |
|  |  | Transparency | ⊚ | ○ | ⊚ | X | Δ | ○ | Δ |
|  |  | Low stickiness | X | ⊚ | Δ | ○ | X | X | X |
|  |  | Impact resistance | ○ | X | X | ⊚ | ⊚ | Δ | ○ |
|  | CFC area % | −20° C. or lower | 6.6 | 8.6 | 4.2 | 6.5 | 7.4 | 5.6 | 5.3 |
|  |  | Higher than −20° C. and lower than 60° C. | 35.4 | 34.6 | 36.5 | 36.1 | 34.6 | 35.1 | 34.9 |
|  |  | 60° C. or higher and 150° C. or lower | 58.0 | 56.7 | 59.2 | 57.4 | 58.0 | 59.3 | 59.8 |

The results of Tables 5 and 6 demonstrated that the two-layer film-shaped molded bodies obtained in Examples 3-1 to 3-14 are practically good in terms of all of flexibility, transparency, low stickiness, and impact resistance and have a good balance among properties.

Three-Layer Film [Examples 4-1 to 4-28 and Comparative Examples 4-1 and 4-2]

[Polypropylene Resin]

The polypropylene resins used were PP-1 to PP-5 given below. MFR given below was measured at 230° C. under a load of 2160 g.

PP-1: random

Novatec MF3FQ (manufactured by Japan Polypropylene Corp., MFR: 8.0 g/10 minutes)

PP-2: random

Novatec EG6D (manufactured by Japan Polypropylene Corp., MFR: 1.9 g/10 minutes)

PP-3: homo

PL500A (manufactured by SunAllomer Ltd., MFR: 3.0 g/10 minutes)

PP-4: block

PC480A (manufactured by SunAllomer Ltd., MFR: 2.0 g/10 minutes)

PP-5: R-TPO

WELNEX RFX4V (manufactured by Japan Polypropylene Corp.)

[Polyethylene Resin]

The polyethylene resins used were PE-1 and PE-2 given below. MFR given below was measured at 190° C. under a load of 2160 g.

PE-1: LDPE (LF443, manufactured by Japan Polyethylene Corp., MFR=1.5 g/10 minutes)

PE-2: HDPE (HF560, manufactured by Japan Polyethylene Corp., MFR=7.0 g/10 minutes)

Hydrogenated Block Copolymer (b1-1): Production Example 15

Batch polymerization was performed using a tank reactor (internal volume: 10 L) equipped with a stirring device and a jacket. First, 1 L of cyclohexane was charged into the reactor. Then, 0.065 parts by mass of n-butyl lithium (hereinafter, referred to as Bu-Li) based on 100 parts by mass in total of monomers, 0.05 mol of N,N,N',N'-tetramethylethylenediamine (hereinafter, referred to as TMEDA) based on 1 mol of Bu-Li, and 0.05 mol of sodium t-pentoxide (hereinafter, referred to as NaOAm) based on 1 mol of Bu-Li were added to the reactor.

In step 1, a cyclohexane solution (concentration: 20 mass %) containing 7 parts by mass of styrene was charged into the reactor over 5 minutes, followed by polymerization for 5 minutes. The polymerization temperature was controlled to 60° C.

In step 2, a cyclohexane solution (concentration: 20 mass %) containing 85 parts by mass of butadiene was charged into the reactor over 60 minutes, followed by polymerization for 5 minutes. The polymerization temperature was controlled to 55° C.

In step 3, a cyclohexane solution (concentration: 20 mass %) containing 8 parts by mass of styrene was charged into the reactor over 5 minutes, followed by polymerization for 5 minutes. The polymerization temperature was controlled to 60° C.

The obtained block copolymer had a styrene content of 15 mass %, an amount of vinyl bond before hydrogenation of 80% in the butadiene block moiety, a weight average molecular weight of 178,000, and a molecular weight distribution of 1.12.

Next, to the obtained block copolymer, the hydrogenation catalyst was added at 100 ppm (in terms of titanium) based on 100 parts by mass of the block copolymer, followed by hydrogenation reaction at a temperature of 70° C. at a hydrogen pressure of 0.7 MPa.

After subsequent addition of methanol, 0.3 parts by mass of octadecyl-3-(3,5-di-t-butyl-4-hydroxyphenyl)propionate were added as a stabilizer to the block copolymer.

The obtained hydrogenated block copolymer (b1-1) had a degree of hydrogenation of 99.2% and MFR of 4.8 g/10 minutes.

The results of analyzing the obtained hydrogenated block copolymer (b1-1) are shown in Table 7.

Hydrogenated Block Copolymer (b1-2): Production Example 16

A hydrogenated block copolymer (b1-2) was produced by the same operation as in the hydrogenated block copolymer (b1-1) mentioned above except that: 0.095 parts by mass of Bu-Li based on 100 parts by mass in total of monomers were used; 0.65 mol of TMEDA based on 1 mol of Bu-Li was added to the reactor; NaOAm was not added; in steps 1 and 3, the amount of styrene was set to 9 parts by mass; in step 2, the amount of butadiene was set to 82 parts by mass of; and the polymerization temperature was controlled to 67° C. to produce a block copolymer.

The obtained hydrogenated block copolymer (b1-2) had a styrene content of 18 mass %, an amount of vinyl bond of 55% in the butadiene block moiety, a weight average molecular weight of 121,000, a molecular weight distribution of 1.05, a degree of hydrogenation of 99.9%, and MFR of 4.0 g/10 minutes.

The results of analyzing the obtained hydrogenated block copolymer (b1-2) are shown in Table 7.

Hydrogenated Block Copolymer (b1-3): Production Example 17

A hydrogenated block copolymer (b1-3) was produced in the same way as in (a-12) except that: 0.055 parts by mass of Bu-Li based on 100 parts by mass in total of monomers were used; in step 1, 10 parts by mass of butadiene were used; in step 2, 85 parts by mass of butadiene and 0.65 mol of TMEDA based on 1 mol of Bu-Li were used, and sodium t-pentoxide (hereinafter, also referred to as "NaOAm") was not added; and in step 3, 5 parts by mass of styrene were used. Each polymer was sampled in each step of a polymerization process for the block copolymer.

The obtained hydrogenated block copolymer (b1-3) had a degree of hydrogenation of 99.4%, a styrene content of 5 mass %, MFR of 2.9 g/10 minutes, a weight average molecular weight (Mw) of 239,000, and a molecular weight distribution (Mw/Mn) of 1.08.

The results of analyzing the obtained hydrogenated block copolymer (b1-3) are shown in Table 7.

Hydrogenated Block Copolymer (b1-4): Production Example 18

Batch polymerization was performed using a tank reactor (internal volume: 10 L) equipped with a stirring device and a jacket.

First, 1 L of cyclohexane was charged into the reactor. Then, 0.065 parts by mass of n-butyl lithium (hereinafter, referred to as Bu-Li) based on 100 parts by mass in total of monomers, 1.5 mol of N,N,N',N'-tetramethylethylenediamine (hereinafter, referred to as TMEDA) based on 1 mol of Bu-Li, and 0.05 mol of sodium t-pentoxide (hereinafter, referred to as NaOAm) based on 1 mol of Bu-Li were added to the reactor.

In step 1, a cyclohexane solution (concentration: 20 mass %) containing 6.5 parts by mass of styrene was charged into the reactor over 5 minutes, followed by polymerization for 5 minutes. The polymerization temperature was controlled to 60° C.

In step 2, a cyclohexane solution (concentration: 20 mass %) containing 82 parts by mass of butadiene was charged into the reactor over 60 minutes, followed by polymerization for 5 minutes. The polymerization temperature was controlled to 55° C.

In step 3, a cyclohexane solution (concentration: 20 mass %) containing 6.5 parts by mass of styrene was charged into the reactor over 5 minutes, followed by polymerization for 5 minutes.

In additional step 4, 5 parts by mass of butadiene were charged into the reactor over 5 minutes, followed by polymerization for 5 minutes. The polymerization temperature was controlled to 60° C.

The obtained block copolymer had a styrene content of 13 mass %, an amount of vinyl bond of 77% in the butadiene block moiety corresponding to the polymer block (B-1), an amount of vinyl bond of 76% in the butadiene block moiety corresponding to the polymer block (B3), a weight average molecular weight of 174,000, and a molecular weight distribution of 1.09.

Next, to the obtained block copolymer, the hydrogenation catalyst was added at 100 ppm (in terms of titanium) based on 100 parts by mass of the block copolymer, followed by hydrogenation reaction at a temperature of 70° C. at a hydrogen pressure of 0.7 MPa.

After subsequent addition of methanol, 0.3 parts by mass of octadecyl-3-(3,5-di-t-butyl-4-hydroxyphenyl)propionate were added as a stabilizer to the block copolymer.

The obtained hydrogenated block copolymer (b1-4) had a degree of hydrogenation of 99.0% and MFR of 5.0 g/10 minutes.

The results of analyzing the obtained hydrogenated block copolymer (b1-4) are shown in Table 7.

TABLE 7

|  |  | Block structural composition (mass %) | | | | | Total (S-1) | Amount of vinyl bond before hydrogenation (mol %) | | | Degree of hydrogenation |
| --- | --- | --- | --- | --- | --- | --- | --- | --- | --- | --- | --- |
|  |  | S-1 | C-1 | B-1 | S-1 | B3 | (mass %) | C-1 | B-1 | B3 | (mol %) |
| Production Example 15 | b1-1 | 7 | 0 | 85 | 8 | 0 | 15 | — | 80 |  | 99.2 |
| Production Example 16 | b1-2 | 9 | 0 | 82 | 9 | 0 | 18 | — | 55 |  | 99.0 |
| Production Example 17 | b1-3 | 0 | 10 | 85 | 5 | 0 | 5 | 10 | 50 |  | 99.4 |

TABLE 7-continued

|  |  | Block structural composition (mass %) | | | | Total (S-1) | Amount of vinyl bond before hydrogenation (mol %) | | | Degree of hydrogenation |
|---|---|---|---|---|---|---|---|---|---|---|
|  |  | S-1 | C-1 | B-1 | S-1 B3 | (mass %) | C-1 | B-1 | B3 | (mol %) |
| Production Example 18 | b1-4 | 6 | 0 | 82 | 7  5 | 13 | — | 77 | 76 | 99.0 |

The materials shown in Tables 8 and 9 were molded by coextrusion under conditions involving an extrusion temperature of 230° C. and a die temperature of 250° C. using a multi-layer extruder (manufactured by Research Laboratory of Plastics Technology Co., Ltd., PLABOR) such that three layers shown in Tables 8 and 9 were laminated in the order shown in Tables 8 and 9 (outer layer, intermediate layer, and inner layer) to obtain a three-layer film having a thickness of 0.17 mm or 0.20 mm.

TABLE 8

|  |  |  | Example 4-1 | Example 4-2 | Example 4-3 | Example 4-4 | Example 4-5 | Example 4-6 | Example 4-7 | Example 4-8 |
|---|---|---|---|---|---|---|---|---|---|---|
| Outer layer | Polypropylene | Type | PP-2 | PP-2 | PP-2 | PP-2 | PP-2 | PP-2 | PP-2 | PP-3 |
|  |  | Content (wt %) | 90 | 80 | 80 | 80 | 100 | 100 | 100 | 100 |
|  | Hydrogenated block copolymer | Type | a-19 | b1-3 | b1-1 | b1-2 | — | — | — | — |
|  |  | Content (wt %) | 10 | 20 | 20 | 20 | — | — | — | — |
|  |  | Thickness (μm) | 25 | 25 | 25 | 25 | 25 | 25 | 25 | 20 |
| Intermediate layer | Polypropylene | Type | PP-2 | PP-2 | PP-2 | PP-2 | PP-2 | PP-2 | PP-2 | PP-1 |
|  |  | Content | 60 | 60 | 60 | 60 | 60 | 60 | 60 | 40 |
|  | Hydrogenated block copolymer | Type | a-8 | a-11 | a-8 | a-11 | a-9 | a-10 | a-10 | a-1 |
|  |  | Content | 40 | 40 | 40 | 40 | 30 | 30 | 30 | 60 |
|  | Hydrogenated block copolymer | Type | — | — | — | — | a-19 | b1-2 | b1-3 | — |
|  |  | Content | — | — | — | — | 10 | 10 | 10 | — |
|  |  | Thickness (μm) | 150 | 150 | 150 | 150 | 150 | 150 | 150 | 60 |
| Inner layer | Polypropylene | Type | PP-2 | PP-2 | PP-1 | PP-2 | PP-2 | PP-1 | PP-1 | PP-2 |
|  |  | Content | 70 | 70 | 60 | 70 | 70 | 70 | 70 | 70 |
|  | Polypropylene | Type | — | — | — | — | — | — | — | — |
|  |  | Content | — | — | — | — | — | — | — | — |
|  | Polyethylene | Type | PP-2 | PP-2 | PP-1 | PP-2 | PP-2 | PP-1 | PP-1 | — |
|  |  | Content | 70 | 70 | 60 | 70 | 70 | 70 | 70 | — |
|  | Hydrogenated block copolymer | Type | a-8 | a-11 | a-8 | a-11 | a-9 | a-10 | a-10 | a-1 |
|  |  | Content | 5 | 5 | 5 | 10 | 30 | 30 | 30 | 30 |
|  | Hydrogenated block copolymer | Type | a-19 | b1-3 | b1-1 | b1-3 | — | — | — | — |
|  |  | Content | 25 | 25 | 35 | 20 | — | — | — | — |
|  |  | Thickness (μm) | 25 | 25 | 25 | 25 | 25 | 25 | 25 | 20 |
| Property of film |  | Flexibility | ○ | ○ | ○ | ○ | ○ | ○ | ○ | ○ |
|  |  | Transparency | ◎ | ○ | ◎ | Δ | ○ | ○ | ○ | ○ |
|  |  | Low stickiness | ○ | ○ | ○ | ○ | ○ | ○ | ○ | ○ |
|  |  | Impact resistance (500 mL) | ○ | ◎ | ○ | ◎ | ○ | ◎ | ◎ | ◎ |
|  |  | Impact resistance (2000 mL) | ○ | ○ | ○ | ○ | ○ | ○ | ○ | ○ |
| CFC area % | −20° C. or lower | | 6.1 | 3.1 | 15.0 | 8.6 | 6.7 | 10.7 | 12.6 | 5.5 |
|  | Higher than −20° C. and lower than 60° C. | | 32.2 | 34.4 | 28.8 | 32.3 | 31.8 | 25.8 | 25.3 | 48.2 |
|  | 60° C. or higher and 150° C. or lower | | 61.8 | 62.5 | 56.3 | 59.0 | 61.5 | 63.4 | 62.1 | 46.3 |

|  |  |  | Example 4-9 | Example 4-10 | Example 4-11 | Example 4-12 | Example 4-13 | Example 4-14 | Example 4-15 |
|---|---|---|---|---|---|---|---|---|---|
| Outer layer | Polypropylene | Type | PP-3 | PP-3 | PP-3 | PP-3 | PP-3 | PP-3 | PP-3 |
|  |  | Content (wt %) | 90 | 90 | 90 | 90 | 90 | 90 | 90 |
|  | Hydrogenated block copolymer | Type | a-19 | a-19 | a-19 | a-19 | a-19 | a-19 | a-19 |
|  |  | Content (wt %) | 10 | 10 | 10 | 10 | 10 | 10 | 10 |
|  |  | Thickness (μm) | 20 | 20 | 20 | 20 | 20 | 20 | 20 |
| Intermediate layer | Polypropylene | Type | PP-1 | PP-1 | PP-1 | PP-1 | PP-1 | PP-1 | PP-1 |
|  |  | Content | 40 | 40 | 40 | 40 | 40 | 40 | 40 |
|  | Hydrogenated block copolymer | Type | a-1 | a-1 | a-1 | a-14 | a-1 | a-1 | a-1 |
|  |  | Content | 60 | 60 | 60 | 60 | 30 | 30 | 30 |
|  | Hydrogenated block copolymer | Type | — | — | — | — | b1-2 | b1-3 | b1-4 |
|  |  | Content | — | — | — | — | 30 | 30 | 30 |
|  |  | Thickness (μm) | 160 | 160 | 160 | 160 | 160 | 160 | 160 |
| Inner layer | Polypropylene | Type | PP-2 | PP-2 | PP-2 | PP-2 | PP-2 | PP-2 | PP-2 |
|  |  | Content | 70 | 70 | 70 | 70 | 70 | 70 | 70 |

TABLE 8-continued

|  |  |  |  |  |  |  |  |  |  |
|---|---|---|---|---|---|---|---|---|---|
|  | Polypropylene | Type | — | — | — | — | — | — | — |
|  |  | Content | — | — | — | — | — | — | — |
|  | Polyethylene | Type | — | — | — | — | — | — | — |
|  |  | Content | — | — | — | — | — | — | — |
|  | Hydrogenated block copolymer | Type | a-1 | a-1 | a-1 | a-1 | a-1 | a-1 | a-1 |
|  |  | Content | 30 | 15 | 15 | 30 | 30 | 30 | 30 |
|  | Hydrogenated block copolymer | Type | — | b1-2 | b1-4 | — | — | — | — |
|  |  | Content | — | 15 | 15 | — | — | — | — |
|  |  | Thickness (μm) | 20 | 20 | 20 | 20 | 20 | 20 | 20 |
| Property of film |  | Flexibility | ○ | ○ | ○ | Δ | ○ | Δ | ○ |
|  |  | Transparency | ○ | ○ | ○ | Δ | ○ | Δ | ○ |
|  |  | Low stickiness | ○ | ○ | ○ | ○ | ○ | ○ | ○ |
|  |  | Impact resistance (500 mL) | ⊚ | ⊚ | ⊚ | ⊚ | Δ | ⊚ | Δ |
|  |  | Impact resistance (2000 mL) | ○ | ○ | ○ | ⊚ | Δ | ⊚ | Δ |
| CFC area % |  | −20° C. or lower | 5.2 | 9.1 | 9.4 | 5.5 | 20.8 | 4.7 | 21.4 |
|  |  | Higher than −20° C. and lower than 60° C. | 49.7 | 45.7 | 46.2 | 50.5 | 34.3 | 50.7 | 33.4 |
|  |  | 60° C. or higher and 150° C. or lower | 45.1 | 45.2 | 44.4 | 44.0 | 44.9 | 44.6 | 45.2 |

TABLE 9

|  |  |  | Example 4-16 | Example 4-17 | Example 4-18 | Example 4-19 | Example 4-20 | Example 4-21 | Example 4-22 | Example 4-23 |
|---|---|---|---|---|---|---|---|---|---|---|
| Outer layer | Polypropylene | Type | PP-3 | PP-3 | PP-3 | PP-3 | PP-3 | PP-3 | PP-3 | PP-3 |
|  |  | Content (wt %) | 90 | 90 | 90 | 90 | 90 | 90 | 90 | 90 |
|  | Hydrogenated block copolymer | Type | a-19 | a-19 | a-19 | a-19 | a-19 | a-19 | a-19 | a-19 |
|  |  | Content (wt %) | 10 | 10 | 10 | 10 | 10 | 10 | 10 | 10 |
|  |  | Thickness (μm) | 20 | 20 | 20 | 20 | 20 | 20 | 20 | 20 |
| Intermediate layer | Polypropylene | Type | PP-1 | PP-1 | PP-1 | PP-1 | PP-1 | PP-1 | PP-1 | PP-1 |
|  |  | Content | 40 | 40 | 40 | 40 | 35 | 40 | 40 | 40 |
|  | Hydrogenated block copolymer | Type | a-1 | a-1 | a-1 | a-1 | a-1 | a-1 | a-1 | a-1 |
|  |  | Content | 30 | 60 | 60 | 60 | 65 | 60 | 60 | 60 |
|  | Hydrogenated block copolymer | Type | a-19 | — | — | — | — | — | — | — |
|  |  | Content | 30 | — | — | — | — | — | — | — |
|  |  | Thickness (μm) | 160 | 160 | 160 | 160 | 160 | 160 | 160 | 160 |
| Inner layer | Polypropylene | Type | PP-2 | PE-1 | PE-2 | PP-1 | PP-3 | PP-4 | PP-5 | — |
|  |  | Content | 70 | 100 | 100 | 70 | 70 | 70 | 70 | — |
|  | Polypropylene | Type | — | — | — | — | — | — | — | — |
|  |  | Content | — | — | — | — | — | — | — | — |
|  | Polyethylene | Type | — | PE-1 | PE-2 | — | — | — | — | PE-1 |
|  |  | Content | — | 100 | 100 | — | — | — | — | 70 |
|  | Hydrogenated block copolymer | Type | a-1 | — | — | a-1 | a-1 | a-1 | a-1 | a-1 |
|  |  | Content | 30 | — | — | 30 | 30 | 30 | 30 | 30 |
|  | Hydrogenated block copolymer | Type | — | — | — | — | — | — | — | — |
|  |  | Content | — | — | — | — | — | — | — | — |
|  |  | Thickness (μm) | 20 | 20 | 20 | 20 | 20 | 20 | 20 | 20 |
| Property of film |  | Flexibility | ⊚ | Δ | Δ | ○ | Δ | Δ | ⊚ | ○ |
|  |  | Transparency | ⊚ | ○ | Δ | ○ | Δ | Δ | ⊚ | ○ |
|  |  | Low stickiness | ○ | Δ | ○ | ○ | ○ | ○ | ○ | Δ |
|  |  | Impact resistance (500 mL) | Δ | ⊚ | ⊚ | ⊚ | ⊚ | ⊚ | ⊚ | ⊚ |
|  |  | Impact resistance (2000 mL) | Δ | ⊚ | ⊚ | ○ | ○ | ○ | ⊚ | ⊚ |
| CFC area % |  | −20° C. or lower | 5.7 | 5.1 | 5.8 | 5.9 | 4.8 | 5.3 | 5.7 | 5.5 |
|  |  | Higher than −20° C. and lower than 60° C. | 49.5 | 46.2 | 46.1 | 48.9 | 53.3 | 49.0 | 48.8 | 48.6 |
|  |  | 60° C. or higher and 150° C. or lower | 44.8 | 48.7 | 48.1 | 45.2 | 41.9 | 45.7 | 45.5 | 45.9 |

|  |  |  | Example 4-24 | Example 4-25 | Example 4-26 | Example 4-27 | Example 4-28 | Comparative Example 4-1 | Comparative Example 4-2 |
|---|---|---|---|---|---|---|---|---|---|
| Outer layer | Polypropylene | Type | PP-3 | PP-3 | PP-3 | PP-3 | PP-3 | PP-3 | PP-3 |
|  |  | Content (wt %) | 90 | 90 | 90 | 90 | 90 | 90 | 90 |
|  | Hydrogenated block copolymer | Type | a-19 | a-19 | a-19 | a-19 | a-19 | a-19 | a-19 |
|  |  | Content (wt %) | 10 | 10 | 10 | 10 | 10 | 10 | 10 |
|  |  | Thickness (μm) | 20 | 20 | 20 | 20 | 20 | 20 | 20 |
| Intermediate layer | Polypropylene | Type | PP-1 | PP-1 | PP-1 | PP-1 | PP-1 | PP-1 | PP-1 |
|  |  | Content | 40 | 60 | 40 | 40 | 40 | 40 | 40 |
|  | Hydrogenated block copolymer | Type | a-1 | a-1 | a-1 | a-1 | a-1 | a-19 | a-21 |
|  |  | Content | 60 | 40 | 60 | 60 | 60 | 60 | 60 |

TABLE 9-continued

|  |  |  |  |  |  |  |  |  |  |
|---|---|---|---|---|---|---|---|---|---|
|  | Hydrogenated block copolymer | Type | — | — | — | — | — | — | — |
|  |  | Content | — | — | — | — | — | — | — |
|  |  | Thickness (μm) | 160 | 160 | 160 | 160 | 160 | 160 | 160 |
| Inner layer | Polypropylene | Type | — | PP-2 | PP-1 | PP-1 | PP-1 | PP-5 | PP-5 |
|  |  | Content | — | 70 | 90 | 35 | 35 | 70 | 70 |
|  | Polypropylene | Type | — | — | — | PP-5 | — | — | — |
|  |  | Content | — | — | — | 35 | — | — | — |
|  | Polyethylene | Type | PE-2 | — | — | — | PE-1 | — | — |
|  |  | Content | 70 | — | — | — | 35 | — | — |
|  | Hydrogenated block copolymer | Type | a-1 | a-1 | a-19 | a-19 | a-19 | a-19 | a-21 |
|  |  | Content | 30 | 30 | 10 | 30 | 30 | 30 | 30 |
|  | Hydrogenated block copolymer | Type | — | — | — | — | — | — | — |
|  |  | Content | — | — | — | — | — | — | — |
|  |  | Thickness (μm) | 20 | 20 | 20 | 20 | 20 | 20 | 20 |
| Property of film |  | Flexibility | ○ | ◉ | ○ | ○ | ○ | ◉ | X |
|  |  | Transparency | ○ | ◉ | ○ | ○ | ○ | ◉ | X |
|  |  | Low stickiness | ○ | ○ | ○ | ○ | ○ | ○ | ○ |
|  |  | Impact resistance (500 mL) | ◉ | ◉ | ○ | ○ | ◉ | X | ◉ |
|  |  | Impact resistance (2000 mL) | ◉ | ◉ | Δ | ○ | ○ | X | ◉ |
|  | CFC area % | −20° C. or lower | 5.5 | 5.8 | 5.9 | 5.6 | 5.7 | 5.1 | 5.3 |
|  |  | Higher than −20° C. and lower than 60° C. | 49.4 | 34.3 | 46.9 | 48.8 | 48.8 | 50.2 | 50.2 |
|  |  | 60° C. or higher and 150° C. or lower | 45.1 | 59.9 | 47.2 | 45.6 | 45.5 | 44.7 | 44.5 |

The results of Tables 8 and 9 demonstrated that the three-layer film-shaped molded bodies obtained in Examples 4-1 to 4-28 are practically good in terms of all of flexibility, transparency, low stickiness, and impact resistance and have a good balance among properties.

Single-Layer Tube-Shaped Molded Body
[Examples 5-1 to 5-14 and Comparative Examples 5-1 to 5-14]

[Polypropylene Resin]
The following polypropylene resin was used in Examples and Comparative Examples. MFR given below was measured at 230° C. under a load of 2160 g.

PP-1: propylene-ethylene random copolymer ("PC630A" (trade name), manufactured by SunAllomer Ltd., MFR=6.8/10 minutes)

Each hydrogenated block copolymer was dry-blended with the polypropylene resin at the blending ratio shown in Tables 10 and 11, and the blend was extrusion-molded at 190° C. at an extrusion rate of 10 m/min using a single-screw extruder (40 mmϕ) and a tube die having an outside diameter of 13 mm and an inside diameter of 11 mm to prepare a tube-shaped molded body having an outside diameter of 7.0 mm and an inside diameter of 5.0 mm. The outside diameter and the inside diameter were adjusted by changing the number of screw revolutions.

TABLE 10

|  |  |  | Example 5-1 | Example 5-2 | Example 5-3 | Example 5-4 | Example 5-5 | Example 5-6 | Example 5-7 |
|---|---|---|---|---|---|---|---|---|---|
| Single layer | Polypropylene | Type | PP-1 | PP-1 | PP-1 | PP-1 | PP-1 | PP-1 | PP-1 |
|  |  | Content | 35 | 35 | 35 | 35 | 35 | 35 | 35 |
|  | Hydrogenated block copolymer | Type | a-1 | a-2 | a-3 | a-4 | a-5 | a-6 | a-7 |
|  |  | Content | 65 | 65 | 65 | 65 | 65 | 65 | 65 |
|  |  | Thickness (μm) | 1000 | 1000 | 1000 | 1000 | 1000 | 1000 | 1000 |
| Outside diameter |  | Tube outside diameter (mm) | 7 | 7 | 7 | 7 | 7 | 7 | 7 |
| Property of tube |  | Flexibility | ○ | ○ | ○ | Δ | ○ | Δ | ○ |
|  |  | Transparency | ○ | ○ | ○ | Δ | ○ | Δ | ○ |
|  |  | Low stickiness | ◉ | ◉ | ○ | ◉ | ○ | Δ | ○ |
|  |  | 23° C. kink | ○ | ○ | ○ | Δ | ○ | Δ | ○ |
|  |  | 4° C. kink | ○ | ○ | ○ | ○ | ○ | ○ | ○ |
|  |  | X ray intensity ratio | 1.15 | 1.19 | 1.10 | 1.20 | 1.09 | 1.34 | 1.08 |
|  | CFC area % | −20° C. or lower | 4.7 | 4.6 | 4.5 | 5.0 | 4.7 | 4.6 | 5.6 |
|  |  | Higher than −20° C. and lower than 60° C. | 62.4 | 62.5 | 62.3 | 62.0 | 62.2 | 62.3 | 61.8 |
|  |  | 60° C. or higher and 150° C. or lower | 32.9 | 32.9 | 33.2 | 33.0 | 33.1 | 33.1 | 32.6 |

|  |  |  | Example 5-8 | Example 5-9 | Example 5-10 | Example 5-11 | Example 5-12 | Example 5-13 | Example 5-14 |
|---|---|---|---|---|---|---|---|---|---|
| Single layer | Polypropylene | Type | PP-1 | PP-1 | PP-1 | PP-1 | PP-1 | PP-1 | PP-1 |
|  |  | Content | 35 | 35 | 35 | 35 | 35 | 35 | 35 |
|  | Hydrogenated | Type | a-8 | a-9 | a-10 | a-11 | a-12 | a-13 | a-14 |

TABLE 10-continued

|  |  |  |  |  |  |  |  |  |
|---|---|---|---|---|---|---|---|---|
|  | block copolymer | Content | 65 | 65 | 65 | 65 | 65 | 65 | 65 |
|  |  | Thickness (μm) | 1000 | 1000 | 1000 | 1000 | 1000 | 1000 | 1000 |
| Outside diameter | Tube outside diameter (mm) |  | 7 | 7 | 7 | 7 | 7 | 7 | 7 |
| Property of tube | Flexibility |  | Δ | Δ | ◎ | ○ | ○ | ◎ | Δ |
|  | Transparency |  | ○ | Δ | ◎ | ○ | ○ | ◎ | Δ |
|  | Low stickiness |  | ◎ | ◎ | ○ | Δ | ◎ | Δ | ◎ |
|  | 23° C. kink |  | Δ | Δ | ◎ | Δ | Δ | ◎ | Δ |
|  | 4° C. kink |  | Δ | Δ | Δ | Δ | Δ | ○ | Δ |
|  | X ray intensity ratio |  | 1.28 | 1.22 | 0.98 | 0.91 | 1.06 | 0.89 | 1.24 |
| CFC area % | −20° C. or lower |  | 4.2 | 7.2 | 7.6 | 3.3 | 5.1 | 7.9 | 4.4 |
|  | Higher than −20° C. and lower than 60° C. |  | 63.1 | 59.2 | 60.5 | 62.9 | 61.6 | 59.8 | 63.1 |
|  | 60° C. or higher and 150° C. or lower |  | 32.7 | 33.6 | 31.9 | 33.8 | 33.3 | 32.3 | 32.5 |

TABLE 11

|  |  |  | Comparative Example 5-1 | Comparative Example 5-2 | Comparative Example 5-3 | Comparative Example 5-4 | Comparative Example 5-5 | Comparative Example 5-6 | Comparative Example 5-7 |
|---|---|---|---|---|---|---|---|---|---|
| Single layer | Polypropylene | Type | PP-1 | PP-1 | PP-1 | PP-1 | PP-1 | PP-1 | PP-1 |
|  |  | Content | 35 | 35 | 35 | 35 | 35 | 35 | 35 |
|  | Hydrogenated block copolymer | Type | a-15 | a-16 | a-17 | a-18 | a-19 | a-20 | a-21 |
|  |  | Content | 65 | 65 | 65 | 65 | 65 | 65 | 65 |
|  | Thickness (μm) |  | Not moldable | 1000 | 1000 | 1000 | 1000 | 1000 | 1000 |
| Outside diameter | Tube outside diameter (mm) |  |  | 7 | 7 | 7 | 7 | 7 | 7 |
| Property of tube | Flexibility |  |  | X | X | ◎ | ◎ | X | X |
|  | Transparency |  |  | X | X | ◎ | ◎ | X | X |
|  | Low stickiness |  |  | ◎ | ◎ | X | Δ | ◎ | ◎ |
|  | 23° C. kink |  |  | X | X | Δ | ◎ | X | Δ |
|  | 4° C. kink |  |  | X | X | Δ | X | X | Δ |
|  | X ray intensity ratio |  |  | 1.41 | 2.21 | 0.93 | 0.92 | 1.55 | 1.25 |
| CFC area % | −20° C. or lower |  |  | 2.0 | 2.5 | 5.1 | 7.2 | 2.6 | 2.9 |
|  | Higher than −20° C. and lower than 60° C. |  |  | 63.9 | 63.2 | 63.3 | 61.1 | 63.1 | 63.5 |
|  | 60° C. or higher and 150° C. or lower |  |  | 34.1 | 34.3 | 31.6 | 31.7 | 34.3 | 33.6 |

|  |  |  | Comparative Example 5-8 | Comparative Example 5-9 | Comparative Example 5-10 | Comparative Example 5-11 | Comparative Example 5-12 | Comparative Example 5-13 | Comparative Example 5-14 |
|---|---|---|---|---|---|---|---|---|---|
| Single layer | Polypropylene | Type | PP-1 | PP-1 | PP-1 | PP-1 | PP-1 | PP-1 | PP-1 |
|  |  | Content | 35 | 35 | 35 | 35 | 35 | 35 | 35 |
|  | Hydrogenated block copolymer | Type | a-22 | a-23 | a-24 | a-25 | a-26 | a-27 | a-28 |
|  |  | Content | 65 | 65 | 65 | 65 | 65 | 65 | 65 |
|  | Thickness (μm) |  | 1000 | 1000 | 1000 | 1000 | 1000 | 1000 | 1000 |
| Outside diameter | Tube outside diameter (mm) |  | 7 | 7 | 7 | 7 | 7 | 7 | 7 |
| Property of tube | Flexibility |  | ○ | ◎ | X | Δ | X | ○ | Δ |
|  | Transparency |  | ◎ | ◎ | X | Δ | X | ○ | Δ |
|  | Low stickiness |  | X | Δ | ○ | X | ◎ | X | X |
|  | 23° C. kink |  | Δ | ◎ | X | X | X | Δ | Δ |
|  | 4° C. kink |  | X | X | X | X | X | ○ | Δ |
|  | X ray intensity ratio |  | 1.14 | 1.13 | 1.21 | 1.42 | 2.21 | 1.10 | 1.21 |
| CFC area % | −20° C. or lower |  | 63.5 | 6.3 | 4.2 | 61.3 | 61.9 | 4.5 | 4.8 |
|  | Higher than −20° C. and lower than 60° C. |  | 4.4 | 61.8 | 62.7 | 4.8 | 3.9 | 62.1 | 62.5 |
|  | 60° C. or higher and 150° C. or lower |  | 32.1 | 31.9 | 33.1 | 33.9 | 34.2 | 33.4 | 32.7 |

The results of Tables 10 and 11 demonstrated that the tube-shaped molded bodies obtained in Examples 5-1 to 5-14 are practically good in terms of all of flexibility, transparency, low stickiness, and kink resistance and have a good balance among properties.

Three-Layer Tube-Shaped Molded Body [Examples 6-1 to 6-7 and Comparative Examples 6-1 to 6-11]

(Hydrogenated Block Copolymer (a2))

A hydrogenated block copolymer (a2) was produced in the same way as in (a-1) except that: before step 1, 0.070 parts by mass of Bu-Li based on 100 parts by mass in total of monomers and 1.8 mol of TMEDA based on 1 mol of Bu-Li were added to the reactor; in step 1, 4.5 parts by mass of butadiene were charged into the reactor over 5 minutes, followed by polymerization for 10 minutes (the polymerization temperature was controlled to 70° C.); in step 2, 8.3 parts by mass of styrene were charged into the reactor over 10 minutes, followed by polymerization for 10 minutes (the polymerization temperature was controlled to 70° C.); in step 3, 80.5 parts by mass of butadiene were charged into the reactor over 60 minutes, followed by polymerization for 10 minutes (the polymerization temperature was controlled to 70° C.); and in step 4, 6.7 parts by mass of styrene were charged into the reactor over 10 minutes, followed by polymerization for 10 minutes (the polymerization temperature was controlled to 70° C.).

The obtained hydrogenated block copolymer (a2) had a degree of hydrogenation of 98%, MFR of 7.2 g/10 minutes, a weight average molecular weight (Mw) of 167,000, and a molecular weight distribution of 1.08.

The hydrogenated block copolymer was dry-blended with the polypropylene resin at the blending ratio shown in Table 12 according to the layer configuration shown in Table 12, and the blend was extrusion-molded at 190° C. at an extrusion rate of 10 m/min using a single-screw extruder (20 mmφ) for an outer layer, a single-screw extruder (25 mmφ) for an intermediate layer, and a single-screw extruder (30 mmφ) for an inner layer and a tube die for three layers having an outside diameter of 15 mm and an inside diameter of 12 mm to prepare a tube-shaped molded body having an outside diameter of 7.0 mm and an inside diameter of 5.0 mm. The outside diameter, the inside diameter, and the thickness of each layer were each adjusted by changing the number of screw revolutions.

TABLE 12

| | | | Example 6-1 | Example 6-2 | Example 6-3 | Example 6-4 | Example 6-5 | Example 6-6 | Example 6-7 | Comparative Example 6-1 |
|---|---|---|---|---|---|---|---|---|---|---|
| Outer layer | Polypropylene | Type | PP-1 | PP-1 | PP-1 | PP-1 | PP-1 | PP-1 | PP-1 | PP-1 |
| | | Content (wt %) | 100 | 100 | 100 | 100 | 100 | 80 | 80 | 100 |
| | Hydrogenated block copolymer | Type | — | — | — | — | — | a2 | a2 | — |
| | | Content (wt %) | — | — | — | — | — | 20 | 20 | — |
| | | Thickness (μm) | 50 | 50 | 50 | 50 | 50 | 50 | 50 | 50 |
| Intermediate layer | Polypropylene | Type | PP-1 | PP-1 | PP-1 | PP-1 | PP-1 | PP-1 | PP-1 | PP-1 |
| | | Content | — | — | — | — | — | — | — | — |
| | Hydrogenated block copolymer | Type | a-1 | a-10 | a-12 | a-13 | a-14 | a-1 | a-10 | a-16 |
| | | Content | 100 | 100 | 100 | 100 | 100 | 100 | 100 | 100 |
| | | Thickness (μm) | 50 | 50 | 50 | 50 | 50 | 50 | 50 | 50 |
| Inner layer | Polypropylene | Type | PP-1 | PP-1 | PP-1 | PP-1 | PP-1 | PP-1 | PP-1 | PP-1 |
| | | Content | 30 | 30 | 30 | 30 | 30 | 30 | 30 | 30 |
| | Hydrogenated block copolymer | Type | a-1 | a-10 | a-12 | a-13 | a-14 | a-1 | a-10 | a-16 |
| | | Content | 70 | 70 | 70 | 70 | 70 | 70 | 70 | 70 |
| | | Thickness (μm) | 900 | 900 | 900 | 900 | 900 | 900 | 900 | 900 |
| Outside diameter | | Tube outside diameter (mm) | 7 | 7 | 7 | 7 | 7 | 7 | 7 | 7 |
| Property of tube | | Flexibility | ○ | ◎ | ○ | ◎ | Δ | ○ | ◎ | X |
| | | Transparency | ○ | ◎ | ○ | ◎ | Δ | ○ | ○ | X |
| | | Low stickiness | ◎ | ◎ | ◎ | ○ | ◎ | ○ | ◎ | ◎ |
| | | 23° C. kink | ○ | ◎ | Δ | ◎ | Δ | ○ | ◎ | X |
| | | 4° C. kink | ○ | Δ | Δ | Δ | Δ | ○ | ○ | X |
| | | X ray intensity ratio | 1.11 | 0.95 | 1.02 | 0.85 | 1.21 | 1.04 | 0.92 | 1.39 |
| | CFC area % | −20° C. or lower | 4.6 | 7.5 | 5.1 | 6.8 | 4.1 | 5.6 | 8.4 | 2.0 |
| | | Higher than −20° C. and lower than 60° C. | 65.3 | 63.3 | 64.4 | 64.7 | 65.5 | 65.3 | 63.3 | 66.8 |
| | | 60° C. or higher and 150° C. or lower | 30.1 | 29.2 | 30.5 | 28.5 | 30.4 | 29.1 | 28.3 | 31.2 |

| | | | Comparative Example 6-2 | Comparative Example 6-3 | Comparative Example 6-4 | Comparative Example 6-5 | Comparative Example 6-6 |
|---|---|---|---|---|---|---|---|
| Outer layer | Polypropylene | Type | PP-1 | PP-1 | PP-1 | PP-1 | PP-1 |
| | | Content (wt %) | 100 | 100 | 100 | 100 | 100 |
| | Hydrogenated block copolymer | Type | — | — | — | — | — |
| | | Content (wt %) | — | — | — | — | — |
| | | Thickness (μm) | 50 | 50 | 50 | 50 | 50 |
| Intermediate layer | Polypropylene | Type | PP-1 | PP-1 | PP-1 | PP-1 | PP-1 |
| | | Content | — | — | — | — | — |

TABLE 12-continued

|  |  |  |  |  |  |  |  |
|---|---|---|---|---|---|---|---|
| Inner layer | Hydrogenated block copolymer | Type | a-17 | a-19 | a-20 | a-21 | a-22 |
|  |  | Content | 100 | 100 | 100 | 100 | 100 |
|  |  | Thickness (μm) | 50 | 50 | 50 | 50 | 50 |
|  | Polypropylene | Type | PP-1 | PP-1 | PP-1 | PP-1 | PP-1 |
|  |  | Content | 30 | 30 | 30 | 30 | 30 |
|  | Hydrogenated block copolymer | Type | a-17 | a-19 | a-20 | a-21 | a-22 |
|  |  | Content | 70 | 70 | 70 | 70 | 70 |
|  |  | Thickness (μm) | 900 | 900 | 900 | 900 | 900 |
| Outside diameter | Tube outside diameter (mm) |  | 7 | 7 | 7 | 7 | 7 |
| Property of tube |  | Flexibility | X | ◎ | X | X | ○ |
|  |  | Transparency | X | ◎ | X | X | ◎ |
|  |  | Low stickiness | ○ | ○ | ◎ | ◎ | Δ |
|  |  | 23° C. kink | X | ◎ | X | Δ | Δ |
|  |  | 4° C. kink | X | X | X | Δ | X |
|  | X ray intensity ratio |  | 2.16 | 0.91 | 1.5 | 1.22 | 1.11 |
| CFC area % |  | −20° C. or lower | 2.5 | 7.1 | 4.2 | 2.9 | 66.1 |
|  |  | Higher than −20° C. and lower than 60° C. | 66.1 | 63.9 | 65.0 | 66.4 | 4.6 |
|  |  | 60° C. or higher and 150° C. or lower | 31.4 | 29.0 | 30.8 | 30.7 | 29.3 |

|  |  |  | Comparative Example 6-7 | Comparative Example 6-8 | Comparative Example 6-9 | Comparative Example 6-10 | Comparative Example 6-11 |
|---|---|---|---|---|---|---|---|
| Outer layer | Polypropylene | Type | PP-1 | PP-1 | PP-1 | PP-1 | PP-1 |
|  |  | Content (wt %) | 100 | 100 | 100 | 100 | 100 |
|  | Hydrogenated block copolymer | Type | — | — | — | — | — |
|  |  | Content (wt %) | — | — | — | — | — |
|  |  | Thickness (μm) | 50 | 50 | 50 | 50 | 50 |
| Intermediate layer | Polypropylene | Type | PP-1 | PP-1 | PP-1 | PP-1 | PP-1 |
|  |  | Content | — | — | — | — | — |
|  | Hydrogenated block copolymer | Type | a-24 | a-25 | a-26 | a-27 | a-28 |
|  |  | Content | 100 | 100 | 100 | 100 | 100 |
|  |  | Thickness (μm) | 50 | 50 | 50 | 50 | 50 |
| Inner layer | Polypropylene | Type | PP-1 | PP-1 | PP-1 | PP-1 | PP-1 |
|  |  | Content | 30 | 30 | 30 | 30 | 30 |
|  | Hydrogenated block copolymer | Type | a-24 | a-25 | a-26 | a-27 | a-28 |
|  |  | Content | 70 | 70 | 70 | 70 | 70 |
|  |  | Thickness (μm) | 900 | 900 | 900 | 900 | 900 |
| Outside diameter | Tube outside diameter (mm) |  | 7 | 7 | 7 | 7 | 7 |
| Property of tube |  | Flexibility | X | Δ | X | ○ | Δ |
|  |  | Transparency | X | Δ | X | ○ | Δ |
|  |  | Low stickiness | ◎ | Δ | ◎ | X | X |
|  |  | 23° C. kink | X | X | Δ | ◎ | Δ |
|  |  | 4° C. kink | X | X | X | ○ | Δ |
|  | X ray intensity ratio |  | 1.19 | 1.41 | 2.14 | 1.06 | 1.17 |
| CFC area % |  | −20° C. or lower | 4.1 | 64.0 | 64.6 | 4.4 | 4.0 |
|  |  | Higher than −20° C. and lower than 60° C. | 65.6 | 5.0 | 4.1 | 65.3 | 65.1 |
|  |  | 60° C. or higher and 150° C. or lower | 30.3 | 31.0 | 31.3 | 30.3 | 30.9 |

The results of Table 12 demonstrated that the tube-shaped molded bodies obtained in Examples 6-1 to 6-7 are practically good in terms of all of flexibility, transparency, low stickiness, and kink resistance and have a good balance among properties.

Tacky Film [Examples 7-1 to 7-14 and Comparative Examples 7-1 to 7-13]

The hydrogenated block copolymer forming a tacky layer and polypropylene (manufactured by SunAllomer Ltd., trade name "PC684S", MFR (230° C., a load of 2.16 kg)=7.5 g/10 minutes) forming a substrate layer were supplied to an extruder and integrally coextruded by the T-die coextrusion method to produce a tacky film having a substrate layer thickness of 40 μm and a tacky layer thickness of 10 μm.

Tacky films having tacky layers made of the hydrogenated block copolymers (a-1) to (a-28) shown in Tables 1 and 2 were used to evaluate the initial tackiness, the low temperature tackiness, the feeding properties, and the tack increasing properties mentioned above.

TABLE 13

|  |  | Example 7-1 | Example 7-2 | Example 7-3 | Example 7-4 | Example 7-5 | Example 7-6 | Example 7-7 |
|---|---|---|---|---|---|---|---|---|
| Blend of tacky layer | Hydrogenated block copolymer | a-1 | a-2 | a-3 | a-4 | a-5 | a-6 | a-7 |
|  | Blending ratio of tacky layer (mass %) | 100 | 100 | 100 | 100 | 100 | 100 | 100 |
| Physical property | Low temperature tack | ○ | ○ | ○ | ○ | ○ | ○ | ○ |
|  | Initial tack (23° C.) | ○ | Δ | ○ | Δ | ○ | ○ | ○ |
|  | Feeding property | ○ | ○ | Δ | ○ | Δ | Δ | Δ |
|  | Tack increasing property | ○ | ○ | ○ | ○ | ○ | ○ | Δ |

|  |  | Example 7-8 | Example 7-9 | Example 7-10 | Example 7-11 | Example 7-12 | Example 7-13 | Example 7-14 |
|---|---|---|---|---|---|---|---|---|
| Blend of tacky layer | Hydrogenated block copolymer | a-8 | a-9 | a-10 | a-11 | a-12 | a-13 | a-14 |
|  | Blending ratio of tacky layer (mass %) | 100 | 100 | 100 | 100 | 100 | 100 | 100 |
| Physical property | Low temperature tack | ○ | ○ | Δ | ○ | ○ | Δ | ○ |
|  | Initial tack (23° C.) | Δ | Δ | ○ | Δ | Δ | ○ | Δ |
|  | Feeding property | ○ | ○ | ○ | ○ | ○ | Δ | ○ |
|  | Tack increasing property | ○ | ○ | ○ | ○ | ○ | Δ | ○ |

TABLE 14

|  |  | Comparative Example 7-1 | Comparative Example 7-2 | Comparative Example 7-3 | Comparative Example 7-4 | Comparative Example 7-5 | Comparative Example 7-6 | Comparative Example 7-7 |
|---|---|---|---|---|---|---|---|---|
| Blend of tacky layer | Hydrogenated block copolymer | a-15 | a-16 | a-17 | a-18 | a-19 | a-20 | a-21 |
|  | Blending ratio of tacky layer (mass %) | 100 | 100 | 100 | 100 | 100 | 100 | 100 |
| Physical property | Low temperature tack | ○ | ○ | ○ | ○ | X | ○ | ○ |
|  | Initial tack (23° C.) | ○ | X | X | ○ | ○ | X | X |
|  | Feeding property | X | ○ | ○ | X | ○ | ○ | ○ |
|  | Tack increasing property | X | ○ | ○ | X | ○ | ○ | ○ |

|  |  | Comparative Example 7-8 | Comparative Example 7-9 | Comparative Example 7-10 | Comparative Example 7-11 | Comparative Example 7-12 | Comparative Example 7-13 |
|---|---|---|---|---|---|---|---|
| Blend of tacky layer | Hydrogenated block copolymer | a-22 | a-23 | a-24 | a-25 | a-26 | a-27 |
|  | Blending ratio of tacky layer (mass %) | 100 | 100 | 100 | 100 | 100 | 100 |
| Physical property | Low temperature tack | ○ | X | ○ | ○ | ○ | ○ |
|  | Initial tack (23° C.) | Δ | Δ | X | Δ | ○ | Δ |
|  | Feeding property | X | ○ | Δ | X | X | X |
|  | Tack increasing property | X | ○ | Δ | X | X | X |

The results of Tables 13 and 14 demonstrated that the tacky film-shaped molded bodies obtained in Examples 7-1 to 7-14 are practically good in terms of all of low temperature tack, initial tackiness, feeding properties, and tack increasing properties and have a good balance among properties.

Tacky Film [Examples 8-1 to 8-13 and Comparative Examples 8-1 to 8-5]

(Hydrogenated Block Copolymer (b))

Production Example 19: Hydrogenated Block Copolymer (b), Table 15

A hydrogenated block copolymer (b) of Production Example 19 was produced in the same way as in Example 1 except that: before step 1, 0.070 parts by mass of Bu-Li based on 100 parts by mass in total of monomers and 1.8 mol of TMEDA based on 1 mol of Bu-Li were added to the reactor; in step 1, 4.5 parts by mass of butadiene were charged into the reactor over 5 minutes, followed by polymerization for 10 minutes (the polymerization temperature was controlled to 70° C.); in step 2, 8.3 parts by mass of styrene were charged into the reactor over 10 minutes, followed by polymerization for 10 minutes (the polymerization temperature was controlled to 70° C.); in step 3, 80.5 parts by mass of butadiene were charged into the reactor over 60 minutes, followed by polymerization for 10 minutes (the polymerization temperature was controlled to 70° C.); and in step 4, 6.7 parts by mass of styrene were charged into the reactor over 10 minutes, followed by polymerization for 10 minutes (the polymerization temperature was controlled to 70° C.).

The obtained hydrogenated block copolymer (b) of Production Example 19 had a degree of hydrogenation of 98%, MFR of 7.2 g/10 minutes, a weight average molecular weight (Mw) of 167,000, and a molecular weight distribution of 1.08.

(Hydrogenated Block Copolymer (c))

Production Example 20: Hydrogenated Block Copolymer (c-1), Table 15

A hydrogenated block copolymer (c-1) of Production Example 20 was produced in the same way as in Example 1 except that: before step 1, 0.050 parts by mass of Bu-Li based on 100 parts by mass in total of monomers and 0.4 mol of TMEDA based on 1 mol of Bu-Li were added to the reactor; in step 1, 5 parts by mass of styrene were charged into the reactor over 10 minutes, followed by polymerization for 10 minutes (the polymerization temperature was controlled to 70° C.); in step 2, 42 parts by mass of styrene and 48 parts by mass of butadiene were continuously charged into the reactor at a constant rate over 60 minutes, followed by polymerization for 10 minutes (the polymerization temperature was controlled to 70° C.); and in step 3, 5 parts by mass of styrene were charged into the reactor over 10 minutes, followed by polymerization for 10 minutes (the polymerization temperature was controlled to 70° C.)

The obtained hydrogenated block copolymer (c-1) of Production Example 20 had a degree of hydrogenation of 98%, MFR of 4.8 g/10 minutes, a weight average molecular weight (Mw) of 163,000, and a molecular weight distribution of 1.08.

Production Example 21: Hydrogenated Block Copolymer (c-2), Table 15

A hydrogenated block copolymer (c-2) of Production Example 21 was produced in the same way as in Example 1 except that: before step 1, 0.085 parts by mass of Bu-Li based on 100 parts by mass in total of monomers and 0.7 mol of TMEDA based on 1 mol of Bu-Li were added to the reactor; in step 1, 10 parts by mass of styrene were charged into the reactor over 10 minutes, followed by polymerization for 10 minutes (the polymerization temperature was controlled to 70° C.); in step 2, 57 parts by mass of styrene and 33 parts by mass of butadiene were continuously charged into the reactor at a constant rate over 60 minutes, followed by polymerization for 10 minutes (the polymerization temperature was controlled to 70° C.); and then, 0.5 mol of ethyl benzoate based on 1 mol of Bu-Li was added to the reactor and reacted for 10 minutes for coupling reaction (the reaction temperature was controlled to 70° C.).

The obtained hydrogenated block copolymer (c-2) of Production Example 21 had a degree of hydrogenation of 98%, MFR of 6.1 g/10 minutes, and polymer ratios before and after coupling of 47 mass % of a polymer having a weight average molecular weight (Mw) of 95,000 and 53 mass % of a polymer having a weight average molecular weight (Mw) of 190,000.

TABLE 15

| | | Content of each block (mass %) | | | | Amount of vinyl bond (mol %) | Degree of hydrogenation (mol %) |
|---|---|---|---|---|---|---|---|
| | | B-1 | S1 | B-2 | S2 | | |
| Production Example 19 | b | 85 | 15 | 0 | 0 | 75 | 98 |
| Production Example 20 | c-1 | 0 | 0 | 90 | 10 | 26 | 98 |
| Production Example 21 | c-2 | 0 | 0 | 90 | 10 | 29 | 98 |

The tackifiers used were tackifier-1 to tackifier-4 given below.

Tackifier-1: CLEARON P125 (hydrogenated terpene resin/manufactured by Yasuhara Chemical Co., Ltd.)

Tackifier-2: YS POLYSTER G150 (terpene phenol resin/manufactured by Yasuhara Chemical Co., Ltd.)

Tackifier-3: CLEARON M (aromatic modified terpene resin/manufactured by Yasuhara Chemical Co., Ltd.)

Tackifier-4: YS POLYSTER UH (hydrogenated terpene phenol resin/manufactured by Yasuhara Chemical Co., Ltd.)

SEBS-1: Tuftec H1051 (styrene content=42%, manufactured by Asahi Kasei Corp.)

The hydrogenated block copolymer and the tackifier forming a tacky layer were dry-blended at the ratio shown in Table 16, and the blend was melt-kneaded under conditions involving 180° C. and 75 to 150 rpm using a twin-screw extruder (L/D=42, 32 mmφ) to produce pellets for use in the tacky layer. The pellets and polypropylene (manufactured by SunAllomer Ltd., trade name "PC684S", MFR (230° C., a load of 2.16 kg)=7.5 g/10 minutes) forming a substrate layer were supplied to an extruder and integrally coextruded by the T-die coextrusion method to produce a tacky film having a substrate layer thickness of 40 μm and a tacky layer thickness of 10 μm.

The obtained tacky films having tacky layers were used to evaluate the initial tackiness, the low temperature tackiness, the feeding properties, and the tack increasing properties mentioned above. The results are shown in Table 16.

TABLE 16

| | | Example 8-1 | Example 8-2 | Example 8-3 | Example 8-4 | Example 8-5 | Example 8-6 | Example 8-7 | Example 8-8 | Example 8-9 | Example 8-10 |
|---|---|---|---|---|---|---|---|---|---|---|---|
| Blending ratio of tacky layer (mass %) | a-1 | 90 | 70 | 10 | 70 | 70 | 95 | 90 | 70 | 90 | 90 |
| | a-13 | | | | | | | | | | |
| | a-19 | | | | | | | | | | |
| | a-21 | | | | | | | | | | |
| | a-18 | | | | | | | | | | |
| | b | 10 | 30 | 90 | | | | | | | |
| | c-1 | | | | 30 | | | | | | |
| | c-2 | | | | | 30 | | | | | |
| | Tackifier-1 | | | | | | 5 | 10 | 30 | | |
| | Tackifier-2 | | | | | | | | | 10 | |
| | Tackifier-3 | | | | | | | | | | 10 |
| | Tackifier-4 | | | | | | | | | | |
| | SEBS-1 | | | | | | | | | | |
| Physical property | Low temperature tack | ◯ | ◯ | ◯ | ◯ | ◯ | ◯ | ◯ | ◯ | ◯ | ◯ |
| | Initial tack (23° C.) | ◯ | ◯ | ◯ | ◯ | ◯ | ◯ | ◯ | ◯ | ◯ | ◯ |

TABLE 16-continued

|  |  | | | | | | | | | |
|---|---|---|---|---|---|---|---|---|---|---|
| Feeding property | | ○ | ○ | ○ | ○ | ○ | ○ | ○ | ○ | ○ | ○ |
| Tack increasing property | | ○ | ○ | ○ | ○ | ○ | ○ | ○ | ○ | ○ | ○ |

|  |  | Example 8-11 | Example 8-12 | Example 8-13 | Comparative Example 8-1 | Comparative Example 8-2 | Comparative Example 8-3 | Comparative Example 8-4 | Comparative Example 8-5 |
|---|---|---|---|---|---|---|---|---|---|
| Blending ratio of tacky layer (mass %) | a-1 | 90 | | | | | | | |
| | a-13 | | 70 | 70 | | | 30 | | |
| | a-19 | | | | 70 | 70 | | | |
| | a-21 | | | | | | | 70 | |
| | a-18 | | | | | | | | 70 |
| | b | | 30 | | 30 | | | | |
| | c-1 | | | 30 | | 30 | | 30 | 30 |
| | c-2 | | | | | | | | |
| | Tackifier-1 | | | | | | | | |
| | Tackifier-2 | | | | | | | | |
| | Tackifier-3 | | | | | | | | |
| | Tackifier-4 | 10 | | | | | | | |
| | SEBS-1 | | | | | | 70 | | |
| Physical property | Low temperature tack | ○ | Δ | Δ | X | X | X | ○ | X |
| | Initial tack (23° C.) | ○ | ○ | ○ | ○ | ○ | X | X | Δ |
| | Feeding property | ○ | Δ | Δ | ○ | ○ | ○ | ○ | Δ |
| | Tack increasing property | ○ | Δ | Δ | ○ | ○ | ○ | ○ | X |

The results of Table 16 demonstrated that the tacky film-shaped molded bodies obtained in Examples 8-1 to 8-13 are practically good in terms of all of low temperature tack, initial tackiness, feeding properties, and increase in tack and have a good balance among properties.

INDUSTRIAL APPLICABILITY

The film of the present embodiment has industrial applicability as, for example, various apparel packages, various food packages, household sundries packages, industrial material packages, laminates for various rubber products, resin products, leather products, and the like, elastic tapes for use in paper diapers and the like, industrial products such as dicing films, protective films for use in the protection of building materials or steel plates, substrates for tacky films, trays for meat and fish, packs for vegetables and fruits, sheet products such as frozen food containers, applications for home appliances such as televisions, stereos, and cleaners, applications for automobile interior or exterior parts such as bumper parts, body panels, and side seals, road paving materials, waterproof materials, water-shielding sheets, packings for civil engineering, daily goods, leisure goods, toys and games, industrial products, furniture supplies, stationery products such as writing utensils, clear pockets, folders, and file spines, and medical supplies such as transfusion bags. Particularly, the film of the present embodiment has industrial applicability as medical films and packaging materials, for example, food packaging materials and apparel packaging materials.

The tube of the present embodiment has industrial applicability as various tube-shaped molded products including automobile parts, applications for civil engineering or construction, home appliance parts, food processing parts, medical parts, sports goods, sundry articles, and stationery products.

The tacky film of the present embodiment is temporarily attached to the surface of an optical molded body such as a light guide plate or a prism sheet, a synthetic resin plate, a metal plate, decorated plywood, a coated steel plate, various nameplates, or the like, and has industrial applicability as a protecting film for preventing scratches or dirt during the processing, conveyance, or storage of these adherends.

The invention claimed is:

1. A hydrogenated block copolymer comprising, in its molecule, a polymer block (C) having a conjugated diene compound as a main component, a polymer block (B) having a conjugated diene compound as a main component, and a polymer block (S) having a vinyl aromatic compound as a main component, wherein:
   the polymer block (B) comprises polymer blocks (B1) and (B2);
   in the hydrogenated block copolymer, a content of the polymer block (C) is 1 to 20 mass %, a content of the polymer block (B) is 73 to 97 mass %, and a content of the polymer block (S) is 1 to 15 mass %;
   an amount of vinyl bond before hydrogenation of the polymer block (C) is 1 to 25 mol %, an amount of vinyl bond before hydrogenation of the polymer block (B1) is 40 mol % or more and 60 mol % or less, and an amount of vinyl bond before hydrogenation of the polymer block (B2) is more than 60 mol % and 100 mol % or less; and
   a degree of hydrogenation is 80 mol % or more.

2. The hydrogenated block copolymer according to claim 1, wherein a total content of the polymer block (C) and the polymer block (S) is 3 to 27 mass % based on 100 mass % of the hydrogenated block copolymer.

3. The hydrogenated block copolymer according to claim 1, wherein a content of the polymer block (B1) is 10 to 60 mass %, and a content of the polymer block (B2) is 30 to 80 mass %, based on 100 mass % of the hydrogenated block copolymer.

4. The hydrogenated block copolymer according to claim 1, wherein
the polymer block (B) further comprises a polymer block (B3) present at an end of the hydrogenated block copolymer, and
a content of the polymer block (B3) in the hydrogenated block copolymer is 1 to 10 mass %.

5. The hydrogenated block copolymer according to claim 1, wherein a microphase separated structure comprises a spherical structure.

6. The hydrogenated block copolymer according to claim 1, wherein the tan δ peak (Tg1), which is observed in the temperature-loss tangent (tan δ) curve obtained by the solid viscoelasticity measurement (1 Hz) of the hydrogenated block copolymer and indicates the glass transition of the hydrogenated block copolymer, is in a range of higher than −45° C. and −30° C. or lower, and difference ΔTg between the Tg1 and a tan δ peak (Tg2) observed by an addition of 30 mass % of the hydrogenated block copolymer to homopolypropylene, Tg1-Tg2, is 3 to 12° C.

7. The hydrogenated block copolymer according to claim 1, wherein
in 13C-NMR measurement, a ratio of an integrated value of 29.4 to 30.0 ppm to an integrated value of 9.0 to 14.0 ppm, integrated value of 29.4 to 30.0 ppm/integrated value of 9.0 to 14.0 ppm, is in a range of an integrated value ratio determined according to the following formula (1) to an integrated value ratio determined according to the following formula (2), and
the butylene content is 50 to 80 mol %:

$$\text{Integrated value ratio}=((1.23+((100-\text{Butylene content}\times0.97-0.3)/0.97)^3/10000\times0.97)/0.97)/(\text{Butylene content}/4) \quad \text{Formula (1), and}$$

$$\text{Integrated value ratio}=((12.28+((100-\text{Butylene content}\times0.97-0.3)/0.97)^3/10000\times0.97)/0.97)/(\text{Butylene content}/4) \quad \text{Formula (2).}$$

8. A molded body comprising the hydrogenated block copolymer according to claim 1.

9. A multi-layer film comprising a layer, the layer comprising a polypropylene resin and the hydrogenated block copolymer according to claim 1.

10. A tube comprising a layer, the layer comprising a polypropylene resin and the hydrogenated block copolymer according to claim 1.

11. A tacky film comprising:
a substrate film; and
a tacky layer comprising the hydrogenated block copolymer according to claim 1, the tacky layer being disposed on the substrate film.

12. A polypropylene resin composition comprising 1 to 99 mass % of the hydrogenated block copolymer according to claim 1, and 1 to 99 mass % of a polypropylene resin.

13. The polypropylene resin composition according to claim 12, wherein in wide angle X ray diffractometry, an intensity ratio of diffraction peak intensity (I(14)) at a scattering angle (2θ) of 14° to diffraction peak intensity (I(15)) at a scattering angle (2θ) of 15°, I(14)/I(15), is 0.1 or more and less than 1.4.

14. The polypropylene resin composition according to claim 12, wherein in measurement by cross fractionation chromatography, an integral elution volume at −20° C. or lower is 0.1% or more and less than 10% of a total volume, an integral elution volume in a range of higher than −20° C. and lower than 60° C. is 1% or more and less than 99% of the total volume, and an integral elution volume in a range of 60° C. or higher and 150° C. or lower is 1% or more and less than 99% of the total volume.

15. A molded body comprising the polypropylene resin composition according to claim 12.

16. A hydrogenated block copolymer comprising, in its molecule, a vinyl aromatic compound unit and a conjugated diene compound unit, wherein:
a content of the vinyl aromatic compound unit is 1 to 15 mass %;
a degree of hydrogenation of the hydrogenated block copolymer is 80 mol % or more;
a butylene content and/or a propylene content is 42 to 80 mol % based on 100 mol % in total of the conjugated diene compound unit;
the hydrogenated block copolymer has a crystallization peak at −20 to 80° C. and has a heat of crystallization of 0.1 to 10 J/g;
an elution volume peak obtained by a temperature gradient interaction chromatography measurement of the hydrogenated block copolymer is in a range of 0° C. or higher and 150° C. or lower, and a width at half height of the elution volume peak is in a range of 20 to 40° C.;
a tan δ peak (Tg1), which is observed in a temperature-loss tangent (tan δ) curve obtained by a solid viscoelasticity measurement (1 Hz) of the hydrogenated block copolymer and indicates the glass transition of the hydrogenated block copolymer, is in a range of −45° C. or higher and 0° C. or lower, and a height of the tan δ peak is less than 1.60; and
a Shore A hardness of the hydrogenated block copolymer is 15 to 60.

* * * * *